United States Patent [19]

Ohzu et al.

[11] Patent Number: 5,771,070

[45] Date of Patent: Jun. 23, 1998

[54] SOLID STATE IMAGE PICKUP APPARATUS REMOVING NOISE FROM THE PHOTOELECTRIC CONVERTED SIGNAL

[75] Inventors: Hayao Ohzu, Fuchu; Toshiji Suzuki, Machida; Akira Ishizaki; Seiji Hashimoto, both of Yokohama; Tadanori Harada; Tsuneo Suzuki, both of Hiratsuka, all of Japan

[73] Assignee: Canon Kabushiki Kaisha, Tokyo, Japan

[21] Appl. No.: 705,002

[22] Filed: Aug. 29, 1996

Related U.S. Application Data

[63] Continuation of Ser. No. 237,046, Jul. 15, 1994, abandoned, which is a continuation-in-part of Ser. No. 547,996, Jun. 13, 1990, Pat. No. 5,331,421, which is a continuation-in-part of Ser. No. 314,275, Feb. 23, 1989, abandoned, and Ser. No. 460,012, Jan. 2, 1990, abandoned, which is a continuation of Ser. No. 96,534, Sep. 14, 1987, Pat. No. 4,914,519, said Ser. No. 314,275, is a continuation of Ser. No. 929,892, Nov. 13, 1986, abandoned.

[30] Foreign Application Priority Data

| Nov. 15, 1985 | [JP] | Japan | 60-255027 |
| Nov. 29, 1985 | [JP] | Japan | 60-269882 |
| Sep. 19, 1986 | [JP] | Japan | 61-219666 |
| Sep. 20, 1986 | [JP] | Japan | 61-229625 |
| Oct. 8, 1986 | [JP] | Japan | 61-238017 |
| Dec. 16, 1986 | [JP] | Japan | 61-300802 |
| Dec. 16, 1986 | [JP] | Japan | 61-300803 |

[51] Int. Cl.$^6$ ....................................................... H04N 3/14
[52] U.S. Cl. ............................................ 348/241; 348/243
[58] Field of Search ..................................... 348/294, 302, 348/303, 304, 241, 243

[56] References Cited

U.S. PATENT DOCUMENTS

| 3,781,574 | 12/1973 | White et al. | 307/304 |
| 3,904,818 | 9/1975 | Kovac | 348/243 |
| 4,145,721 | 3/1979 | Beaudouin et al. | 348/241 |
| 4,216,503 | 8/1980 | Wiggins | 358/446 |
| 4,293,877 | 10/1981 | Tsunekawa et al. | 348/316 |
| 4,300,163 | 11/1981 | Wada et al. | 348/616 |
| 4,380,755 | 4/1983 | Endlicher et al. | 348/250 |
| 4,392,157 | 7/1983 | Garcia et al. | 348/243 |

(List continued on next page.)

FOREIGN PATENT DOCUMENTS

| 0027881 | 5/1981 | European Pat. Off. . |
| 0078038 | 5/1981 | European Pat. Off. . |
| 0082035 | 6/1983 | European Pat. Off. . |
| 0108308 | 5/1984 | European Pat. Off. . |
| 2551917 | 9/1984 | France . |

(List continued on next page.)

OTHER PUBLICATIONS

"100 ×100 CID Imager With Integrated Fixed Pattern Noise Suppression," by Koch and Herbst, 1979, pp. 92–97.

*Primary Examiner*—Wendy Garber
*Attorney, Agent, or Firm*—Fitzpatrick, Cella, Harper & Scinto

[57] ABSTRACT

A solid state image pickup apparatus for removing noise includes a plurality of photoelectric transducer cells, and first and second switch circuitry. Signal readout lines are provided for reading out signals from the plurality of transducer cells. A plurality of first capacitors, each connected to one of the signal readout lines through the first switch circuitry, are provided for selectively storing first signals read out through the signal lines and the first switch circuitry after a predetermined accumulation period. A plurality of second capacitors, each connected to one of the signal read out lines through the second switch circuitry, are provided for selectively storing second signals corresponding to dark current signals read out through the signal read out lines and the second switch circuitry. Output circuitry is provided for cancelling dark current signals included in all of the first signals by subtracting each second signal from a corresponding first signal, and for outputting all of the first signals from which the dark current signals are cancelled.

23 Claims, 33 Drawing Sheets

U.S. PATENT DOCUMENTS

| | | | |
|---|---|---|---|
| 4,463,383 | 7/1984 | Soneda et al. | 348/500 |
| 4,511,804 | 4/1985 | Ozawa | 348/250 |
| 4,518,863 | 5/1985 | Fukuoka et al. | 348/241 |
| 4,571,624 | 2/1986 | Nishizawa et al. | 348/307 |
| 4,573,077 | 2/1986 | Imai | 348/307 |
| 4,583,108 | 4/1986 | Sireix | 257/448 |
| 4,678,938 | 7/1987 | Nakamura | 348/307 |
| 4,686,554 | 8/1987 | Ohmi et al. | 348/294 |
| 4,742,392 | 5/1988 | Hashimoto | 348/695 |
| 4,768,085 | 8/1988 | Hashimoto | 348/237 |
| 4,831,454 | 5/1989 | Tanaka et al. | 348/307 |
| 4,847,668 | 7/1989 | Sugawa et al. | 257/462 |
| 4,914,519 | 4/1990 | Hashimoto et al. | 348/241 |
| 5,331,421 | 7/1994 | Ohzu et al. | 348/294 X |

FOREIGN PATENT DOCUMENTS

| | | |
|---|---|---|
| 3049130A1 | 7/1982 | Germany . |
| 53-078112 | 7/1978 | Japan . |
| 55-044226 | 3/1980 | Japan . |
| 55-068879 | 5/1980 | Japan . |
| 55-104174 | 8/1980 | Japan . |
| 56-046374 | 4/1981 | Japan . |
| 57-41081 | 3/1982 | Japan . |
| 57-140073 | 8/1982 | Japan . |
| 58-111579 | 7/1983 | Japan . |
| 59-023765 | 2/1984 | Japan . |
| 59-15167 | 5/1984 | Japan . |
| 59-144169 | 8/1984 | Japan . |
| 60-12759 | 1/1985 | Japan . |
| 60-12760 | 1/1985 | Japan . |
| 60-12761 | 1/1985 | Japan . |
| 60-12762 | 1/1985 | Japan . |
| 60-12763 | 1/1985 | Japan . |
| 60-12764 | 1/1985 | Japan . |
| 60-12765 | 1/1985 | Japan . |
| 60-100886 | 6/1985 | Japan . |
| 60-220674 | 11/1985 | Japan . |
| 62-185471 | 8/1987 | Japan . |
| 2071959 | 9/1981 | United Kingdom . |

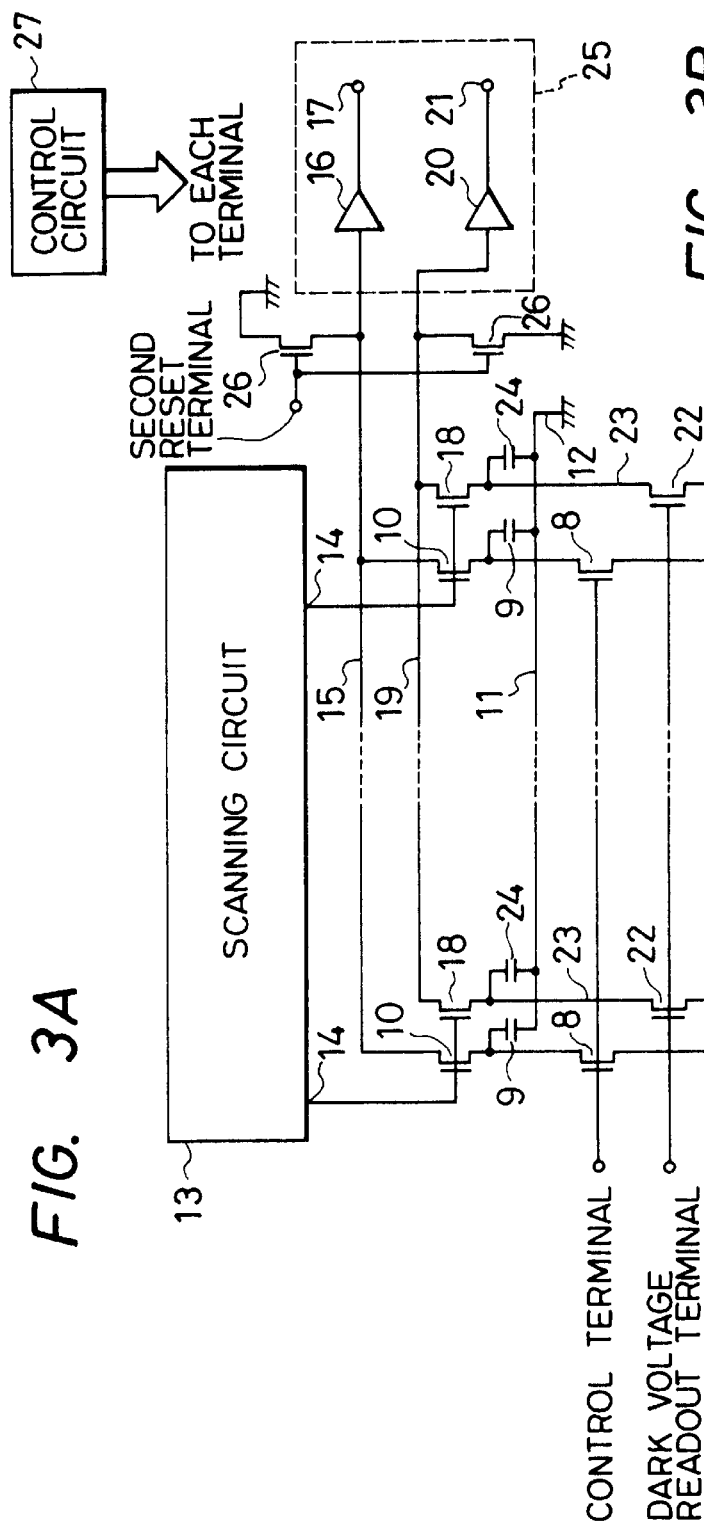
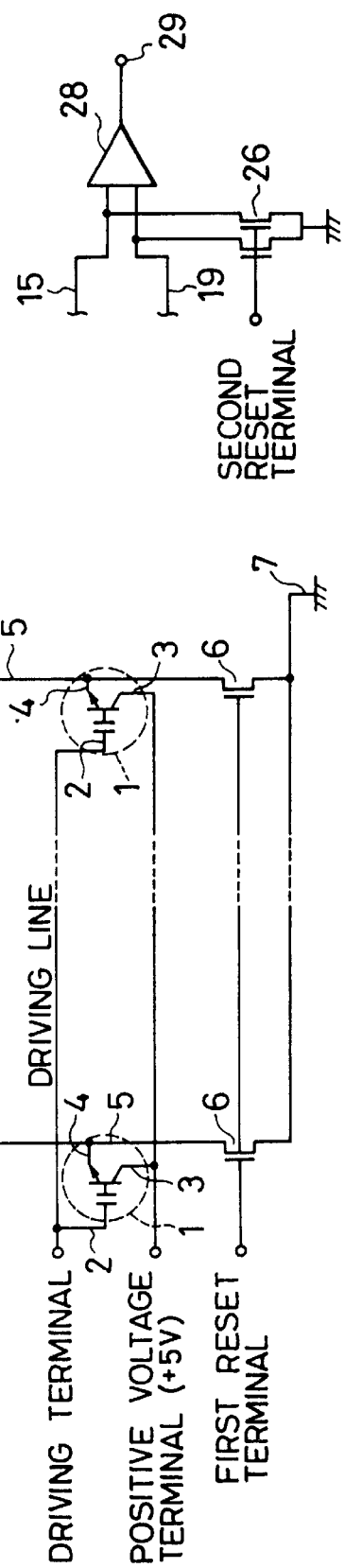
FIG. 3A
FIG. 3B

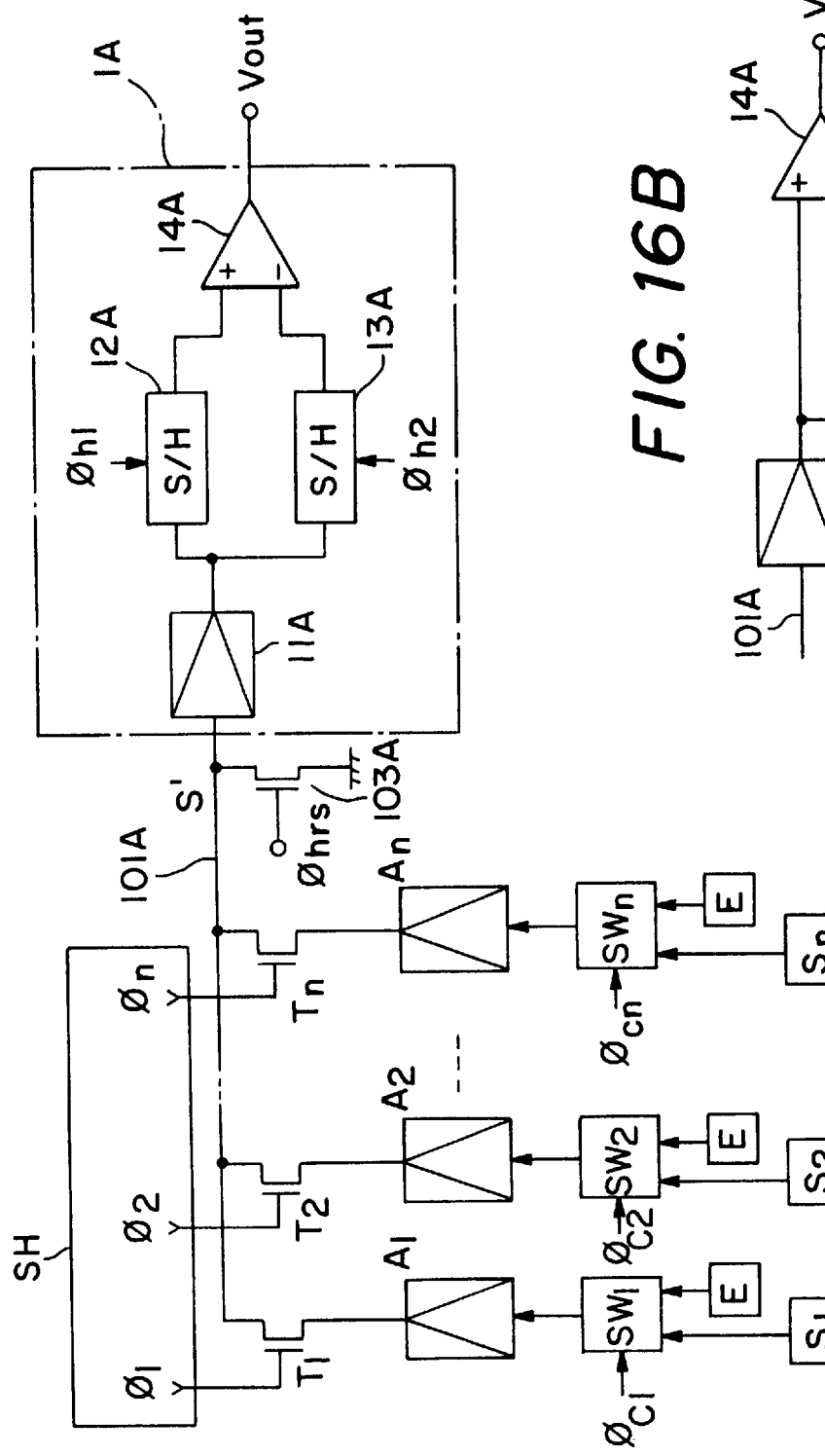
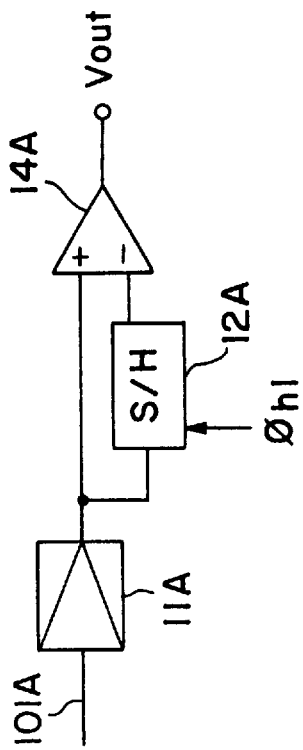

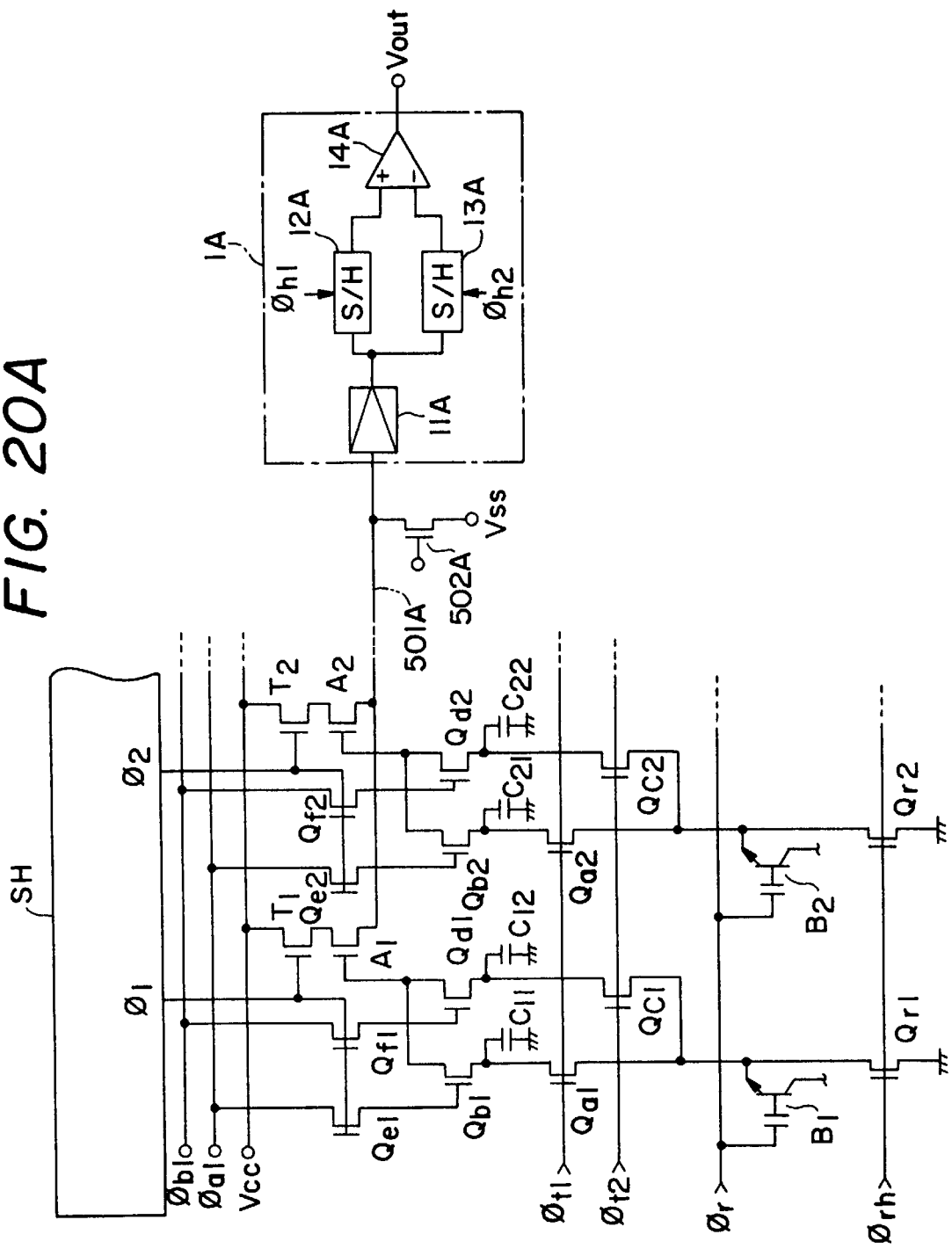

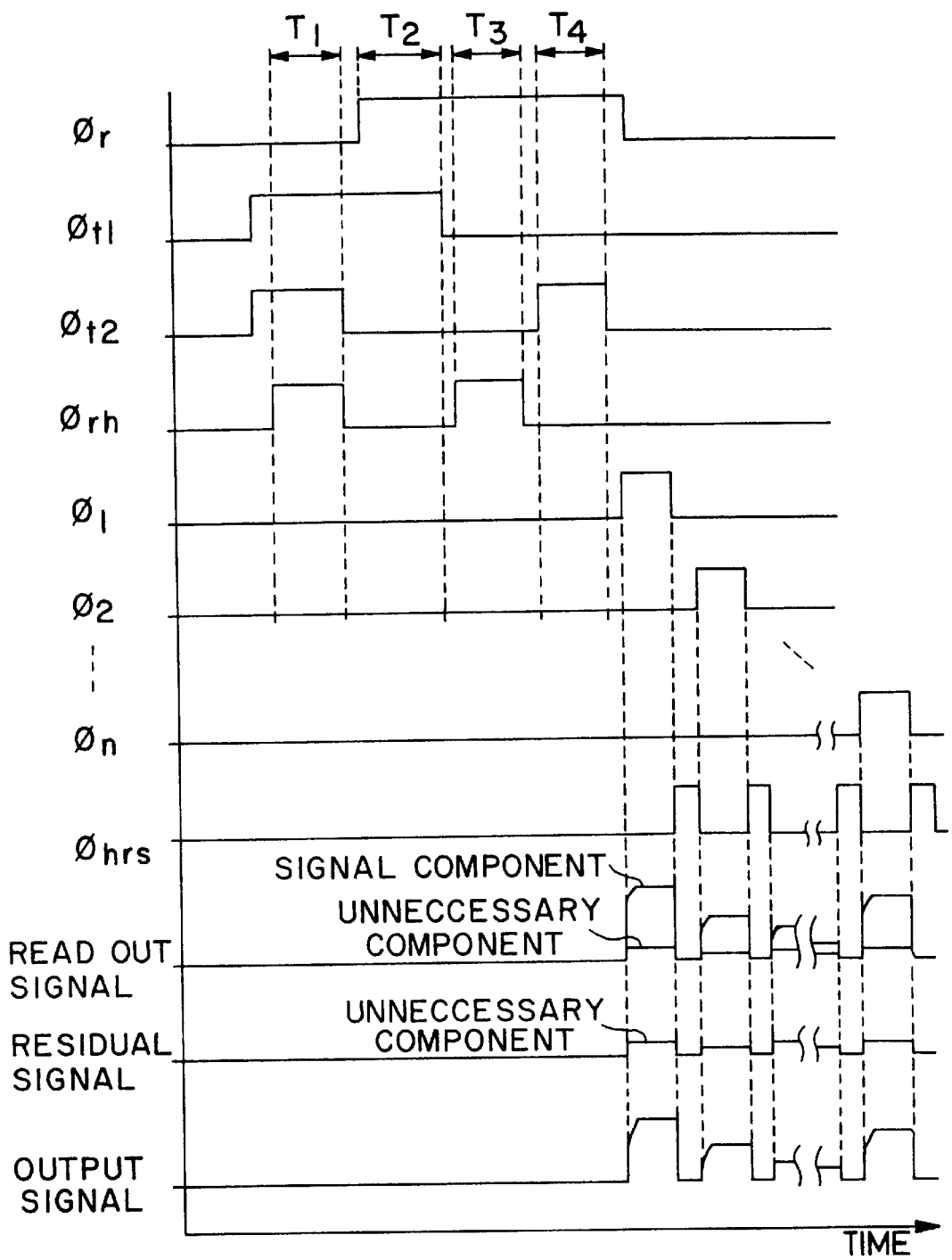

SOLID STATE IMAGE PICKUP APPARATUS REMOVING NOISE FROM THE PHOTOELECTRIC CONVERTED SIGNAL

This application is a continuation-in-part of application Ser. No. 07/547,996, filed Jun. 13, 1990, now U.S. Pat. No. 5,331,421, which is a continuation-in-part of (1) application Ser. No. 07/314,275, filed Feb. 23, 1989, which is a continuation of application Ser. No. 06/929,892, filed Nov. 13, 1986, both now abandoned; and (2) application Ser. No. 07/460,012, filed Jan. 2, 1990, now abandoned which is a continuation of application Ser. No. 07/096,534, filed Sep. 14, 1987, now U.S. Pat. No. 4,914,519, issued Apr. 3, 1990.

BACKGROUND OF THE INVENTION

1. Field of the Invention

The present invention relates to a solid state image pickup apparatus and, more particularly, to a solid state image pickup apparatus having a plurality of photoelectric transducer elements each having a capacitor electrode on a control electrode region of a corresponding semiconductor transistor.

The present invention also relates to a solid state image pickup apparatus for selectively reading out a plurality of sensor signals and, more particularly, to a solid state image pickup apparatus capable of eliminating unnecessary components such as variations in dark signals and drive noise.

2. Related Background Art

A TV or SV camera with an image sensor such as a CCD or MOS sensor has an aperture mechanism. Photoelectric transducer apparatuses each having a TV or SV camera with an automatic aperture mechanism are described in Japanese Patent Disclosure (Kokai) Nos. 12759/1985 to 12765/1985.

This photoelectric transducer apparatus includes a photosensor having a plurality of sensor cells each having a capacitor formed on a control electrode of a corresponding semiconductor transistor.

In the conventional photoelectric transducer apparatus described above, noise is often mixed in an output signal read out from the photosensor cells due to variations in dark voltage generated in the cells within an arbitrary store time.

An output signal corresponcdng to the dark current component genoratcd within the photoscensor cell is prestored as reference optical information in an external memory in a conventional apparatus. A reference output signal derived from the reference optical information and an output signal from the actual optical information read out from the photosensor cell are compared with each other, and the output signal of the actual optical information is corrected, thereby eliminating the noise component caused by the dark voltage.

In the conventional photoelectric transducer apparatus described above, in order to constitute a photoelectric transducer system, the resultant system is undesirably complicated since a separate external circuit including a noise removal memory is required.

When a conventional photoelectric transducer apparatus is applied to a video camera or the like, the following problem occurs. When photoelectric transducer cells are arranged in a two-dimensional matrix and scanned in the vertical and horizontal directions, holes are stored in the base of each photoelectric transducer cell in a store mode upon reception of strong light. The base potential is forward-biased with respect to the emitter potential. The potential of a vertical line connected to the emitter electrode of each photoelectric transducer cell receiving strong, light is increased to cause a blooming phenomenon. In order to prevent this, it is proposed that the vertical lines are grounded for a period excluding the readout operation, thereby refreshing the charge overflowing onto the vertical line. However, the vertical line can be grounded for only the horizontal blanking period, i.e., about 10 $\mu$s. Therefore, the charge overflowing onto the vertical line during the horizontal scanning period still causes the blooming phenomenon.

In the readout mode, when imade signals are sequentially output by horizontal scanning after they are stored in a vertical line, a dummy signal As generated during the storage of the signal in the vertical line. In other words, a smear phenomenon occurs.

In addition, the period for performing the refresh operation in the conventional apparatus is about 10 $\mu$s in the horizontal blanking period. The refresh time is short and results in incomplete refreshing and hence an after image phenomenon.

Furthermore, assume that when the conventional photoelectric transducer apparatus is used as a single-plate type solid-state imaging device in a color television video camera, color filters are deposited or adhered onto the pixels. If an alignment scheme such as a Bayer alignment is used to form vertical lines in units of colors, i.e., R, G, and B, at least two vertical lines are recurred for the pixels of each column. In this case, since the vertical line portion does not serve as the photosensitive portion, the light-receiving area is reduced by the two vertical lines for each column. In other words, the opening of the aperture is undesirably reduced.

In a conventional photosensitive transducer apparatus, negative and positive voltages are required to bias an output amplifier, and the constitution is thus complicated. It is difficult to read out the signal component without degrading the frequency characteristics.

FIG. 15A is a schematic circuit diagrair of a conventional solid-state image pickup apparatus.

Referring to FIG. 15A, signals from sensors S1 to Sn are respectively amplified by amplifiers A1 and An, and transistors T1 to Tn are sequentially turned on. A dot sequential output appears on an output line 101A. The dot sequential signal is amplified by a buffer amplifier 102A, and the resultant signal appears as an output signal Vout.

In the conventional image pickup apparatus described above, variations in input/output characteristics of the amplifiers A1 to An are included in the sensor signals as the dot sequential output appearing on the output line 101A. As a result, steady pattern noise undesirably occurs.

FIG. 15B shows a schematic arrangement of another conventional photoelectric transducer apparatus.

Referring to FIG. 15B, signals read out from photosensors S1 to Sn are temporarily stored in storage capacitors C1 to Cn. Transistors T1 to Tn are sequentially turned on at timings of a scanning circuit SH, and the readout signals sequentially appear on an output line 101A and are output to an external device through an amplifier 102A.

In the above photoelectric transducer apparatus, however, unnecessary components such as dark signals and drive noise of the photosensors are undesirably included.

Drive noise is defined as noise generated when a photosensor is driven to read out a signal. The drive noise components are noise caused by manufacturing variations such as element shapes and smear caused by elementsisolation and depending on radiation amounts.

The dark signal is defined as a dark current of a photosensor and greatly depends on accumulation time and temperature of the photosensor.

This drive noise will be described in detail. Variations in drive capacity of a drive element for driving a photoelectric transducer element and variations in capacity of a photoelectric transducer element cause variations in a leakage component of drive pulses. These variation components as an information signal are superposed on a necessary photoelectric transducer signal and are read out. The cause of generation of drive noise will be described below.

FIG. 15C is a schematic view of a photoelectric transducer element described in Japanese Patent Laid-Open Gazette No. 12764/1985, FIG. 15D ia a timing chart of drive pulses for driving the photoelectric transducer element shown in FIG. 15C, and FIG. 15E is a chart showing the base potential of the photoelectric transducer element.

Referring to FIG. 15C, the photoelectric is transducer element includes a base accumulation type bipolar transistor B, a drive capacitor Cox for reverse- or forward-biasing the transistor B in response to a drive pulse φr, and a refresh transistor Qr. The transistor B has junction capacitances Cbc and Cbe. It should be noted that Cox, Cbc, and Cbe are referred to as capacitances or capacitors hereinafter, as needed. The capacitances Cox, Cbc, and Cbe are added to obtain a charge storage capacitance Ctot.

The operation of the photoelectric transducer element will be described below.

Assume that the initial value of a base potential VB is given as V0. When the drive pulse φr is set at a potential Vφr at time t1, a voltage Va is applied to the base of the transistor B through the drive capacitor Cox. In this case, the voltage Va can be represented as follows:

$$Va = Cox/(Cox + Cbc + Cbe) \times V\phi r \quad (1)$$
$$= (Cox/Ctot) \times V\phi r$$

When the drive pulse rh is set at a high potential at time t2, a transistor Qr is turned on.

When the transistor B is forward-biased, the base potential VB is abruptly decreased. A time interval TC between time t2 and time t3 is a so-called refresh time interval.

The drive pulse φr is set at zero at time t3, and a voltage −Va is added to the base voltage VB, so that the base voltage VB is set at V2. This reverse-biased state is the accumulation state.

The above description was confined to one photoelectric transducer element. However, a line or area sensor has a large number of photoelectric transducer elements. The capacitances of the capacitors Cox, Cbc, and Cbe between a large number of photoelectric transducer elements vary by a few fractions of 1%. For example, if the following conditions are given:

Cox=Cbc=Cbe≈0.014 pF, and Vφr=5 V and the capacitance variation is 0.2%, then a variation ΔVa in capacitance division voltage Va is about 3 mV.

The variation ΔVa can be reduced by refreshing. However, when the refresh mode is changed to an accumulation operation mode (time t3), the variation occurs again to produce ΔVb. The variation ΔVb does not satisfy the relation ΔVb=−ΔVa, and the correlation cannot be established therebetween according to test results.

The above fact is assumed to be derived from, different bias voltage dependencies of Cbc and Cbe.

In the next read cycle, when the transistor B is forward-biased, the variation in base potential thereof is approximated as follows:

$$\Delta V^2 = \Delta Va^2 + \Delta Vb^2 + 2K\Delta Va\Delta b \quad (2)$$

for K equal to −1 or more. As a result, the variation ΔV becomes steady drive noise of about 4 to 5 mV.

The variation in leakage component of such a drive pulse (to be referred to as drive noise hereinafter) is eliminated according to the following conventional technique. That is, the above drive noise is stored in a memory means and is read out and subtracted from the signal read out from the sensor to obtain a true information signal.

The conventional drive noise correction technique described above causes a bulky, expensive photoelectric transducer element which does not have any industrial advantage.

In particular, in case of that the nurbers of elements arranged in the horizontal direction and vertical direction are five hundred respectively, an area sensor requires 250,000 photoelectric elements arranged in a matrix form. In addition, when the resolution of the sensor is also taken into consideration, a memory of several megabits is required.

The unnecessary signals such as drive noise and a dark signal pose serious problems when an image of a dark object is to be picked up, i.e., image pickup at a low intensity. In the low-intensity image pickup mode, an information signal level is low and accordingly the S/N ratio is degraded. As a result, image quality is degraded. In order to improve image quality, the unnecessary signals must be reduced.

As described above, however, the dark signal primarily depends on temperature and charge accumulation time, although the drive noise rarely depends thereon. If these unnecessary signals are to be eliminated, the dark signal must be separated from the drive noise and a correction coefficient must be determined, thus requiring a large-capacity memory. As a result, signal processing is complicated and expensive, and an image pickup apparatus is undesirably bulky.

SUMMARY OF THE INVENTION

It is an object of the present invention to provide a photoelectric transducer apparatus capable of solving the conventional drawbacks described above.

It is another object of the present invention to provide a simple photoelectric transducer apparatus capable of eliminating variations in dark voltage.

It is still another object of the present invention to provide a photoelectric transducer apparatus comprising optical information storing means for storing optical information (light or bright signals) read out from a photoelectric transducer element and dark voltage storing means for storing a voltage corresponding to a dark voltage component read out from the photoelectric transducer element, wherein actual optical information stored in the optical information storing means is simultaneously read out together with the dark voltage component stored in the dark voltage storing means onto separate output lines, thereby correcting the information corresponding to the dark voltage in units of optical sensor cells and hence removing noise caused by variations in dark voltage from the output signal from the photosensor cells.

In order to achieve the above object, accordinc to an aspect of the present invention, there is providea photoelectric transducer apparatus having a pluralitv of photoelectric transducer elements each having a capacitor electrode formed on a control electrode of a corresponding semiconductor transistor, the apparatus being adapted to sequentially select each element in units of lines, to control a potential of the control electrode of the selected photoelectric transducer element through the capacitor electrode, to store carriers in the control electrode region, and to read out a signal component corresponding to the amount of charge stored in the control electrode region, comprising: optical information storing means for storing optical information read out from the photoelectric transducer element; and dark voltage storing means for storing a voltage corresponding to a dark voltage read out from the photoelectric transducer element, wherein actual optical information stored in the optical information storing means and information corresponding to the dark voltage component stored in the dark voltage storing means are simultaneously read out onto different information output lines.

The information corresponding to the dark voltage component stored in the dark voltage storing means is read out onto the information output line therefor, and at the same time the information corresponding to the dark voltage is corrected in units of photosensor cells, thereby eliminating noise caused by variations in dark voltage.

The noise corresponding to the dark voltage component can, therefore, be processed within the sensor. An external circuit or the like need not be used to easily constitute a system configuration, thereby obtaining a low-cost photoelectric transducer apparatus.

It is still another object of the present invention to provide an imaging element and an apparatus using the same, wherein the after image, blooming, and smearing can be prevented with a simple construction.

It is still another object of the present invention to provide a color imaging element having a large aperture.

In order to achieve these objects, according to another aspect of the present invention, there is provided a photoelectric transducer apparatus comprising:

a plurality of photoelectric transducer cells;
a signal read line for reading out signals from the plurality of photoelectric transducer elements; and
a plurality of capacitors for selectively storing the signals read out through the signal read line.

According to this aspect of the present invention, since the plurality of capacitors for, selectively storing the signals read out through the signal read line are provided, the image signal appearing on the vertical line can be shortened, thereby reducing the frequency of occurrence of the blooming and smearing phenomena. Since the capacitor can be disconnected from the pixel after the image signal is stored in the capacitor, the refresh time can be prolonged to reduce the occurrence of the after image phenomenon. In addition, if the photoelectric transducer apparatus is used in a color video camera, the number of capacitors can be that of the color signals of the row pixels, and only one vertical line is used, thereby increasing the aperture.

It is still another object of the present invention to provide a photoelectric transducer apparatus wherein a single power source can be used without degrading the signal component of the read signal.

In order to achieve the above object, according to still another aspect of the present invention, there is provided a photoelectric transducer apparatus for reading output a read signal from a photoelectric transducer element through an amplifier after the read signal is temporarily stored in a storing means, comprising switching means for properly applying a bias voltage to the storing means.

With the above arrangement, the reference potential of the store capacitor can be properly changed to use a single power source without degradinc the signal component of the read signal.

It is still another object of the present invention to provide a photoelectric transducer apparatus little subjected to smearing or blooming.

In order to achieve the above object, according to still another aspect of the present invention, a capacitor is arranged in a vertical signal line through a switch to store the signal from the photoelectric transducer cell in the capacitor, thereby resetting the vertical signal line, so that the signal component in the capacitor is free from smearing or blooming.

It is another object of the present invention to eliminate variations in drive noise in units of sensor cells.

It is still another object of the present invention to compensate for variations in electrical characteristics of a plurality of amplifiers arranged for sensor cells.

In order to achieve the above objects according to an aspect of the present invention, there is provided a solid state image pickup apparatus having a selector for selecting a plurality of sensor signals through corresponding amplifiers, comprising a processing circuit for calculating a difference between a selected sensor signal and a reference signal selected through the same circuit for selecting the sensor signal.

The sensor signal selected by the selector, therefore, includes a noise component caused by variations in amplifier characteristics since the sensor signal is amplified by the corresponding amplifier. For this reason, the reference signal is selected through the same amplifier which has amplified the sensor signal, so that the amplifier noise is superposed on the reference signal. A difference between the selected sensor signal and the selected reference signal is calculated to eliminate the noise component.

According to another aspect of the present invention, there is provided a photoelectric transducer apparatus having storage means for storing a signal from a photoelectric transducer element, wherein the storage means comprises first storage means for storing the signal read out from the photoelectric transducer element and second storage means for storing a residual signal left after the photoelectric transducer element is refreshed, and further comprising difference processing means for calculating a difference between the readout and residual signals respectively stored in the first and second storage means.

Since the residual signal obtained upon completion of refreshing is subtracted from the readout signal, the unnecessary components such as a dark signal and drive noise of the photoelectric transducer element can be eliminated.

A MOS, electrostatic induction, or base accumulation type photosensor may be used as a photoelectric transducer element.

"Refreshing" of the photoelectric transducer element means erasure of optical information of the photoelectric transducer element. In some photosensors, optical information is erased simultaneously when the information is read out. However, in some photosensors, optical information is kept unerased even after the information is read out.

According to still another aspect of the present invention, in order to eliminate the conventional drawbacks described above, there is provided a solid state image pickup apparatus comprising a plurality of photoelectric transducer elements, first storage means, arranged in units of photoelectric transducer elements, for storing a video signal, second storage means, arranged in units of photoelectric transducer elements, for storing noise components, first readout means for simultaneously and independently reading out signals for photoelectric transducer elements of a plurality of horizontal lines from the first storage means, and second readout means for adding signals for the photoelectric transducer elements of the plurality of horizontal lines from the second storage means and for reading out a sum signal.

With the above arrangement, it is assumed that the drive noise is generated as a sum of noise components generated in the refresh, charge accumulation, and readout modes of the photoelectric transducer element and the drive noise level is substantially identical in each mode. A difference between the photoelectric transducer signal read out upon completion of exposure and drive noise read out in the photoelectric transducer signal readout mode is calculated to eliminate the drive noise. It should be noted that the noise components are read out after they are added, thereby reducing the number of read lines.

According to still another aspect of the present invention, in order to eliminate the conventional drawbacks described above, there is provided a solid state image pickup apparatus comprising photoelectric transducer elements, a plurality of storage capacitors for storing readout signals when the photoelectric transducer elements are read-accessed a plurality of times, dot sequential processing means for converting signals from the storage capacitors into a dot sequential signal, and clamping means for clamping some components of the dot sequential signal from the dot sequential processing means.

With the above arrangement, it is assumed that the drive noise is generated as a sum of noise components generated in the refresh, charge accumulation, and readout modes of the photoelectric transducer element and the drive noise level is substantially identical in each mode. The photoelectric transducer signal read out upon completion of exposure and drive noise read out in the photoelectric transducer signal readout mode are converted into a dot sequential signal, and the drive noise component is clamped, thereby eliminating the drive noise included in the photoelectric transducer signal components.

The above and other objects, features, and advantages of the present invention will be apparent from the following detailed description in conjunction with the accompanying drawings.

BRIEF DESCRIPTION OF THE DRAWINGS

FIG. 3A is a circuit diagram of a photoelectric transducer apparatus according to a second embodiment of the present invention;

FIG. 3B is a circuit diagram showing the main part of a third embodiment;

FIGS. 16A and 16B are schematic circuit diagrams showing a solid state image pickup apparatus according to an embodiment of the present invention;

FIG. 20A is a schematic circuit diagram showing a solid state image pickup apparatus according to another embodiment of the present invention;

FIGS. 27A and 27B are timing charts for explaining two operation modes of the apparatus shown in FIG. 24;

DETAILED DESCRIPTION OF THE PREFERRED EMBODIMENTS

Figure 1:
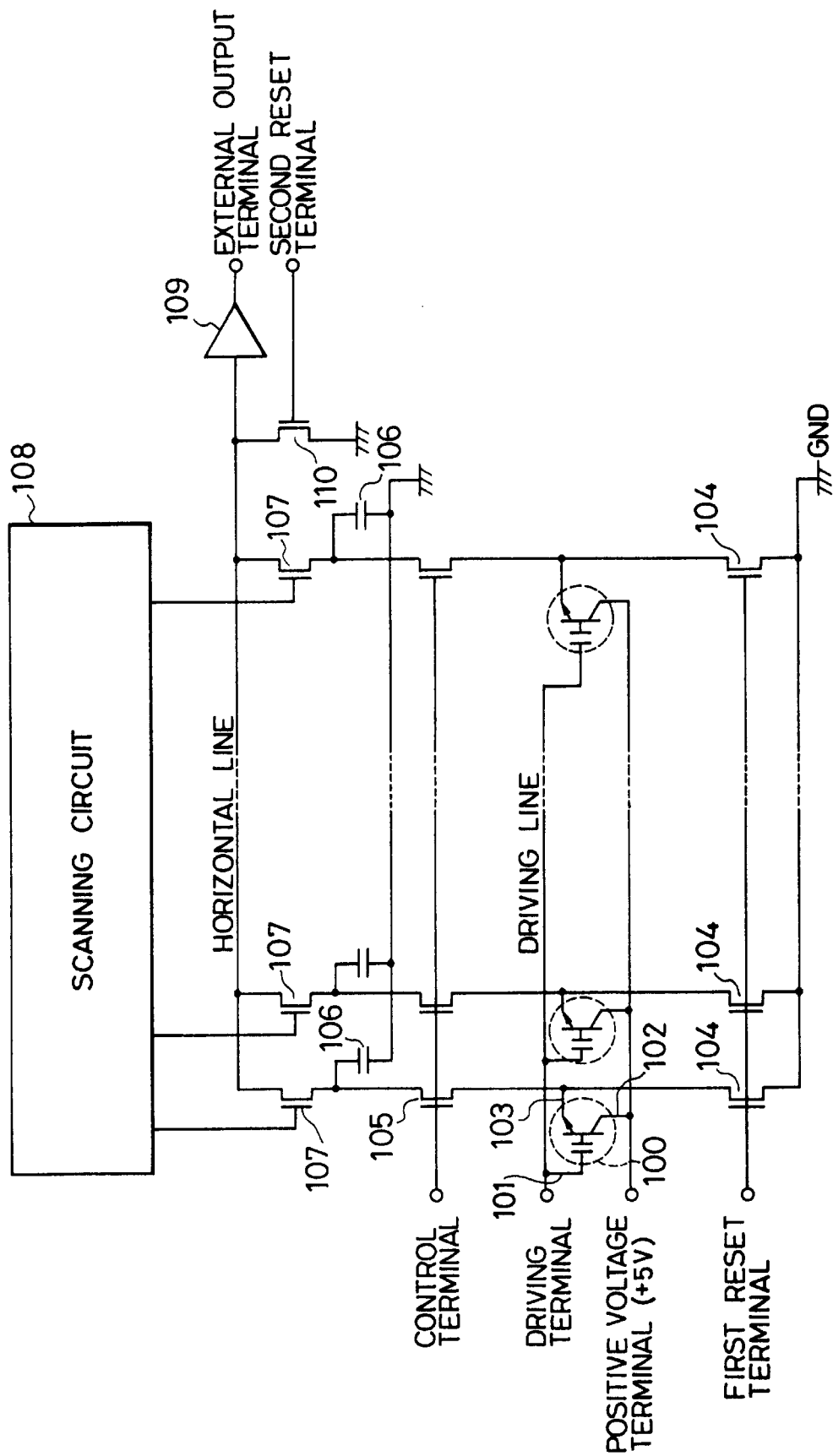
FIG. 1 is a circuit diagram of a photoelectric transducer apparatus according to a first embodiment of the present invention.
Figure 2:
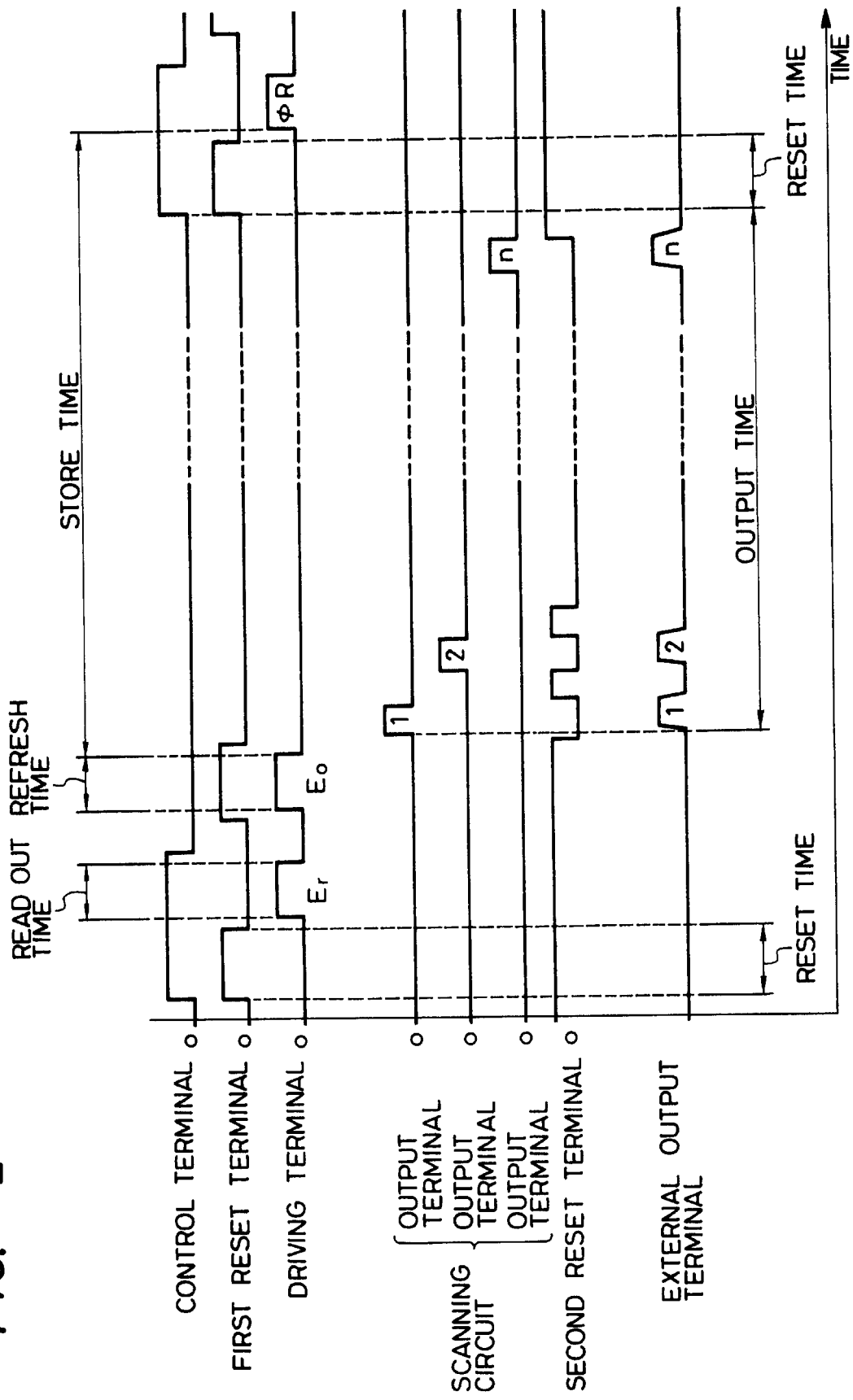
FIG. 2 is a timing chart for explaining the operation of the apparatus in FIG. 1.

FIG. 1 is a circuit diagram of a photoelectric transducer apparatus as a line sensor according to a first embodiment of the present invention, and FIG. 2 is a timing chart for explaining the operation thereof.

Referring to FIGS. 1 and 2, capacitor electrodes 101 of photosensor cells 100 are commonly connected to a driving line, and collector electrodes 102 thereof are commonly connected to a positive voltage terminal.

A driving terminal is connected to the driving line.

A pulse signal is applied to the driving terminal to drive the photosensor cells 100. Emitter terminals 103 of the photosensor cells 100 are connected to vertical signal lines and commonly connected to each other through reset FETs 104. The emitter terminals 103 are connected to a ground terminal GND.

The gate electrodes of the FETs 104 are commonly connected to a first reset terminal.

The FETs 104 are switching field effect transistors.

The vertical signal lines are connected to store capacitors 106 through FETs 105 and to the source electrodes of FETs 107. The drain electrodes of the FETs 107 are commonly connected to a horizontal signal line. The gate electrodes of the FETs 105 are commonly connected to a control terminal.

The gate electrodes of the FETs 107 are respectively connected to output terminals of a scanning circuit 108.

Horizontal signal lines are connected to an external output terminal through an output amplifier 109 and to the ground terminal GND through an FET 110.

The gate terminal of the FET 110 is connected to a second reset terminal.

The FET 110 is a field effect transistor for resetting the horizontal line.

The operation of the circuit in FIG. 1 will be described with reference to a timing chart in FIG. 2.

The control and first reset terminals are simultaneously set at H level during the reset time. During the reset time, the optical information stored in the store capacitors 106 is discharged through the FETs 104.

When the control terminal is set at H level and the first reset terminal is set at L level, the optical information stored in the photosensor cells 100 is read out onto the vertical signal lines by applying the readout pulse signal to the driving terminal. Therefore, the optical information is stored in the store capacitors 106.

In this manner, when the readout pulse signal is set at H level, readout operation of the photo-sensor cells 100 is started. After the lapse of a predetermined period of time, the readout pulse signal is set at L level, thereby terminating the readout operation.

When the control terminal is set at L level, and the first reset and driving terminals are set at H level, the refresh operation state is obtained. The optical information stored in the photosensor cells 100 is erased through the FETs 104.

When the refresh pulse signal is set at L level, the refresh operation is ended.

Thereafter, during the period until the readout operation state is obtained again, the store time for storing the carriers in the photosensor cells 100 is defined.

The signal pulses from the output terminals of the scanning circuit 108 are used to sequentially turn on the FETs 107 according to the shift timings.

The optical information signals stored in the store capacitors 106 are sequentially read out onto the horizontal lines by horizontal scanning of the scanning circuit 108. The readout signals are amplified by the output amplifier 109 and appear at the external output terminal.

When all optical information signals stored in the store capacitors 106 are read out completely, the reset time is initialized again.

The above operations are thus repeated.

With the above arrangement, the signal charge is not kept on the vertical signal line for a long period of time, thus reducing blooming and smearing.

A second embodiment of the present invention will be described with reference to the accompanying drawings.

FIG. 3A is a circuit diagram of a photoelectric transducer apparatus according to the second embodiment.

Referring to FIG. 3A, photosensor cells 1 as the photoelectric transducer elements are one-dimensionally arranged.

Capacitor electrodes 2 of the photosensor cells 1 are commonly connected to a driving line and to a driving terminal. Collector electrodes 3 of the photosensor cells 1 are commonly connected to a positive voltage terminal.

Emitter electrodes 4 of the photosensor cells 1 are respectively connected to vertical lines 5. The vertical lines 5 are commonly connected through FETs 6. The FETs 6 are connected to a ground terminal 7.

The gate electrodes of the FETs 6 are commonly connected to a first reset terminal.

The capacitors 9 and the source electrodes of the FETs 110 are respectively connected to the vertical lines 5 through FETs 8. The capacitors 9 are connected to a ground terminal 12 through a ground line 11.

The capacitors 9 are signal charge store capacitors, respectively.

The gate electrodes of the FETs 10 are respectively connected to output terminals 14 of the scanning circuit 13. The drain electrodes of the FETs 10 are connected to an output amplifier 16 through a horizontal line 15. The output terminal of the output amplifier 16 is connected to an external output terminal 17, so that an output voltage is extracted from the external output terminal 17.

The gate electrodes of the FETs 10 are respectively connected to the gate electrodes of FETs 18. The drain electrodes of the FETs 18 are connected to an output amplifier 20 through an output line 19.

The output terminal of the output amplifier 20 is connected to an external output terminal 21, so that an output voltage is extracted from the external output terminal 21.

The source electrodes of the FETs 18 are connected to the vertical lines 5 through FETs 22.

In the above embodiment, one electrode of each of capacitors 24 is connected between a corresponding one of the source electrodes of the FETs 18 and a corresponding one of the FETs 22 through a corresponding one of vertical lines 23. The other electrode of each of the capacitors 24 is connected to the ground line 11.

The capacitors 24 serve as dark voltage store capacitors, respectively. Reset FETs 26 are connected between the lines 15 and 19 and ground, respectively. The gate electrodes of the FETs 26 are connected to the second reset terminal. A control circuit 27 supplies timing pulses (FIG. 4) to the respective terminals.

Figure 4:
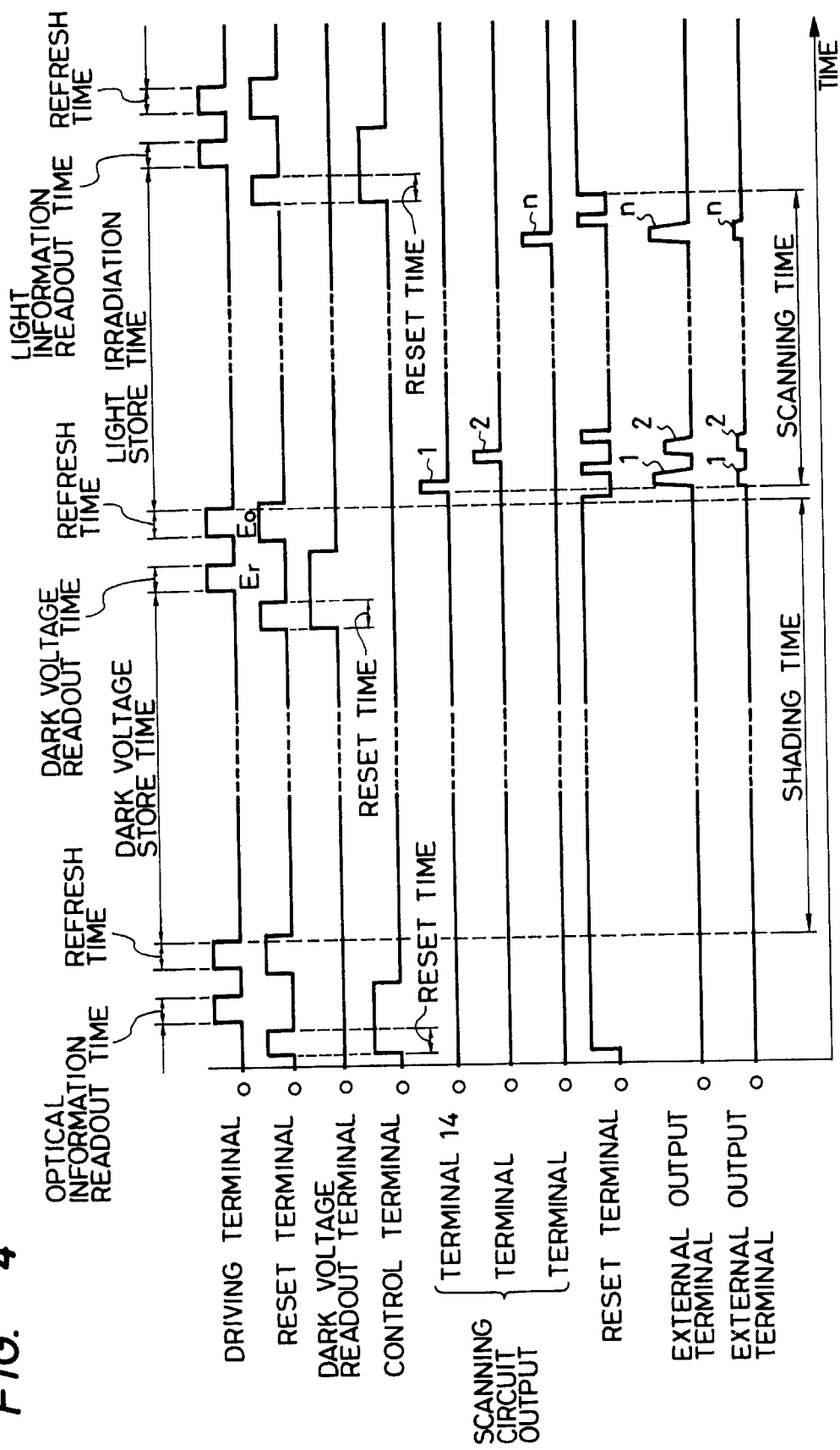
FIG. 4 is a timing chart for explaining the operation of the second and third embodiments of the present invention.

The operation of the above embodiment will be described below,

As shown in the timing chart of FIG. 4, the photosensor cells store optical information corresponding to the amounts of light received in a light store operation during the light irradiation store time.

During a predetermined period of time until the light information readout, the photosensor cells 1 perform store operations of carriers upon light irradiation. During the reset time, both the control and first reset terminals are set at H level, so that the charges stored in the capacitors 9 are reset through the corresponding FETs 6.

The control terminal is set at H level, and the first reset terminal is set at L level. When a readout pulse voltage is applied to the driving terminal, the optical or light information stored in the photosensor cells 1 is read out onto the vertical lines, and the light information is stored in the capacitors 9.

When the light information readout time has elapsed, the first reset terminal is set at H level and the control terminal is set at L level. In this state, when the refresh pulse voltage is applied to the driving terminal, the photosensor cells 1 are maintained in the refresh state. The light information stored in the photosensor cells 1 is erased through the FETs 6.

When the refrest time has elapsed, the photosensor cells 1 are temporarily shielded from light so that a shading time is started.

In this case, the photosensor cells 1 store the dark voltage generated in the dark state. It should be noted that the dark voltage store time is controlled to be ecual to the light irradiation store time.

Subsequently, both the dark voltage readout terminal and the first reset terminal are set at H level to reset through the FETs 6 the charges stored in the cepacitors 24 during the reset time.

The light information corresponding to the dark voltage components stored in the photosensor cells 1 is read out onto the vertical lines under the following conditions. The dark voltage readout terminal is set at H level, the first reset terminal is set at L level, and the readout pulse voltage Er is applied to the driving terminal. Therefore, the dark voltage signals are stored in the corresponding capacitors 24.

When the dark voltage readout time has elapsed, the dark voltage readout terminal is set at L level, and the first reset terminal is set at H level. The refresh pulse voltage EO is applied to the driving terminal to set the photosensor cells 1 in the refresh state.

When a predetermined period of time has elaspsed, the refresh pulse voltage applied to the driving terminal is set at L level. Therefore, the refresh time is terminated. Along with this, the shading time is ended, and the first reset terminal is set at L level.

Subsequently, clocks are supplied to the scanning circuit 13 to sequentially shift the output pulses from the output terminals 14 thereof. The FETs 10 and 18 are sequentially turned on in response to these timing pulses.

By this horizontal scanning, light information signals are sequentially read out from the capacitors 9 onto the horizontal line 15. In synchronism with the readout operation, the information signals corresponding to the dark voltage components stored in the capacitors 24 are read out onto the output line 19.

In this manner, the light information signals read out onto the horizontal line 15 are output to the external output terminal 17 through the output amplifier 16. The information signals corresponding to the dark voltage components read out onto the output line 19 are output to the external output terminal 21 through the output amplifier 20, so that the output voltage is thus extracted from this external output terminal.

For example, the readout operation for one horizontal scanning time is completed, and the reset time is started. Thereafter, the above operations will be repeated.

Since the photoelectric transducer apparatus of this embodiment is operated as described above, an additional external circuit which was required in the conventional photoelectric transducer apparatus to remove the noise component caused by the dark voltage need not be used, thereby simplifying the system configuration. Therefore, demand for a low-cost photoelectric transducer apparatus can be satisfied.

In the above embodiment, the actual light information signals simultaneously read out onto the corresponding lines and the information signals corresponding to the dark voltage components are amplified by the output amplifiers 16 and 20 in an output circuit 25, and the amplified signals are extracted through the external output terminals, respectively. However, the present invention is not limited to the above arrangement. As shown in FIG. 3B, (a third embodiment), the output circuit 25 may be replaced with a differential amplifier 28 to subtract the information corresponding to the dark voltage components from the actual light information. Light information representing a difference may be output from a terminal 29.

In the second and third embodiments, the dark voltage store time is set to be equal to the light irradiation time. However, such setting need not be performed.

For example, by effectively utilizing the relationship between the dark voltage store time and the amount of dark voltage components generated by the photosensor cells 1, i.e., a substantially proportional relationship, the dark voltage store time may be set to be shorter than the light irradiation time, and gains of the output amplifiers 16 and 20 in the output circuit 25 may be independently controlled. Alternatively, the capacitances of the store capacitors 9 and 24 are adjusted to obtain the a same effect as in the above embodiments.

In the second and third embodiments, the photosensor cells are one-dimensionally aligned. However, the arrangement of the cells is not limited to this.

As described above, the photoelectric transducer apparatus comprises light information storing means for storing light information read out from the photoelectric transducer element, and dark voltage storing means for storing a voltage corresponding to the dark voltage component read out from the photoelectric transducer element. The actual light information stored in the light information storing means and the information corresponding to the dark voltage component stored in the dark voltage storing means are simultaneously read out from the separate output lines. Therefore, the information corresponding to the dark voltage included in the output can be corrected in units of photosensor cells when the actual optical information read out from the photosensor cell is output, and noise caused by variations in dark voltage can be removed from the output signal. Unlike in the conventional photoelectric transducer apparatus, an additional external circuit is not required to simplify the system configuration. In addition, demand for an economical photoelectric transducer apparatus can be satisfied.

A fourth embodment of the present invention will be described in detail with reference to the accompanying drawings.

Figure 5:
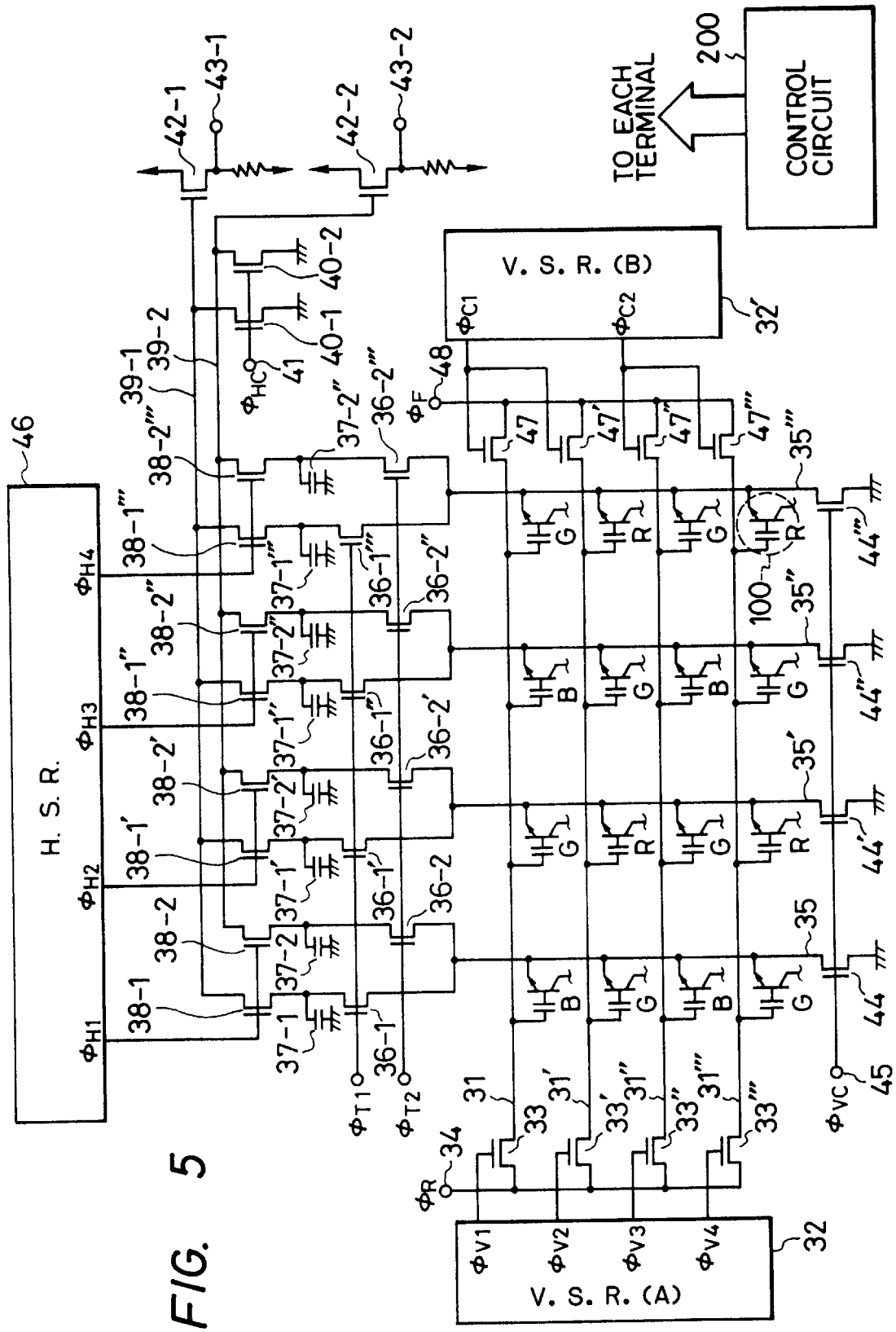
FIG. 5 is a circuit diagram of a photoelectric transducer apparatus according to a fourth embodiment of the present invention.

FIG. 5 is a circuit diagram of photoelectroc transducer elements arranged in a 4×4 matrix to constitute a photoelectric transducer apparatus.

The photoelectric transducer apparatus includes: basic photos-ensor cells 100 (the collector of each bipolar transistor is connected to the substrate and the substrate electrode), horizontal lines 31, 31', 31'', and 31''' serving as the readout-refresh pulse lines; a vertical shift register 32 for generating a readout pulse; buffer MOS transistors 33, 33', 33'', and 33''' arranged between the vertical shift register 32 and the horizontal lines 31, 31', 31'', 31'''; a terminal 34 for applying a pulse φR to the drains of the buffer MOS transistors 33, 33', 33'', and 33'''; a vertical shift register 32' for generating a refresh pulse; buffer MOS transistors, 47, 47', 47'', and 47''' formed between the vertical shift register 32' and the horizontal lines 31, 31', 31'', and 31'''; a terminal 48 for applying a pulse φT1 to the drains of the buffer MOS transistors 47, 47', 47'', and 47'''; vertical lines 35, 35', 35'', and 35''' serving as vertical readout lines for reading out signal charges from the basic photosensor cells 100; capacitors 37-1, 37-2, 37-1', 37-2', 37-1'', 37-2'', 37-1''', and 37-2''' for storing these signal charges; transfer MOS transistors 36-1, 36-2, 36-1', 36-2', 36-1'', 36-2'', 36-1''', and 36-2''' arranged between the vertical lines 35, 35', 35'', and 35''' and the capacitors 37-1, 37-2, 37-1', 37-2', 37-1'', 37-2'', 37-1''', and 37-2'''; a horizontal shift register 46 for generating a pulse for selecting each store capacitor; gate MOS transistors 38-1, 38-2, 38-1', 38-2', 38-1'', 38-2'', 38-1''', and 38-2''' for charging/discharging the store capacitors 37-1, 37-2, 37-1', 37-2', 37-1'', 37-2'', 37-1''', and 37-2'''; output lines 39-1 and 39-2 for reading out the store voltages and supplying them to an amplifier; MOS transistors 40-1 and 40-2 for refreshing the charges on the readout lines; a terminal 41 for applying the refresh pulse to the MOS transistors 40-1 and 40-2; transistors 42-1 and 42-2 such as bipolar transistors, MOSFETs or JFETs for amplifying the output signals; output terminals 43-1 and 43-2 of the transistors 42-1 and 42-2; MOS transistors 44, 44', 44'', and 44''' for refreshing the charges stored on the vertical lines 35, 35', 35'', and 35'''; a terminal 45 for supplying a pulse to the gates of the MOS transistors 44, 44', 44'', and 44'''; a horizontal shift recister 46 for turning on the MOS transistors 38-1, 38-2, 38-1', 38-2', 38-1'', 38-2'', 38-1''', and 38-2'''; and a control circuit 200 for supplying signals to the respective terminals.

Figure 6:
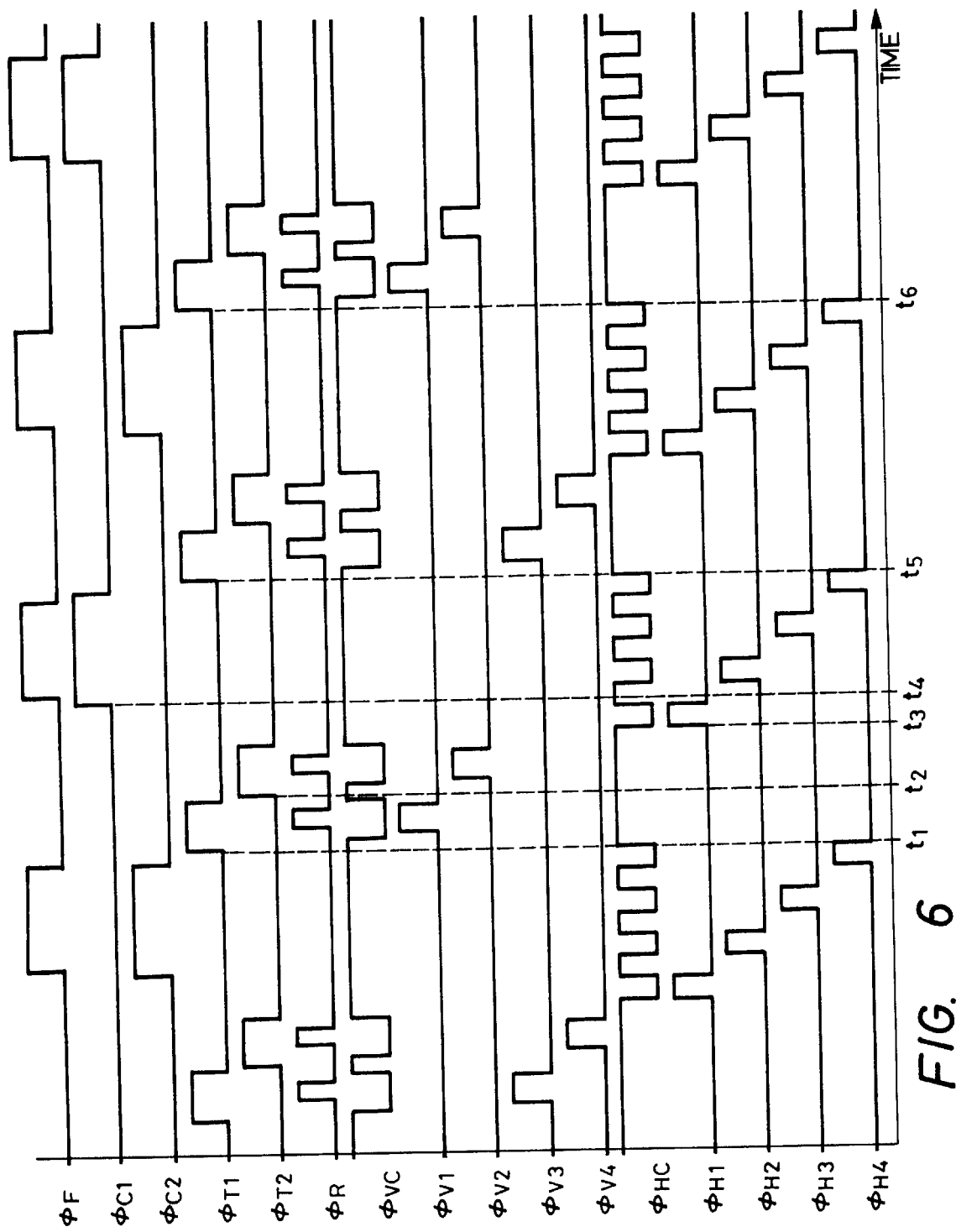
FIG. 6 is a timing chart for explaining the operation of the apparatus in FIG. 5.

The operation of the photoelectric transducer apparatus will be described with reference to FIG. 5 and a timing chart of FIG. 6.

Assume that the collector potential of the photosensor cells is kept at a positive potential in the following description.

The store operation is performed until time t1, and holes corresponding to the amounts of light incident on the photoelectric transducer cells 100 are respectively stored in their p-type base regions.

At time t1, a pulse signal φvc rises to turn on the transistors 44, 44', 44'', and 44'''. A pulse signal φT1 rises to turn the transistors 36-1, 36-1', 36-1'', and 36-1''' to refresh the store capacitors 37-1, 37-1', 37-1'', and 37-1'''. A pulse signal φHc rises to turn on the transistors 40-1 and 40-2 to refresh the residual charges on the output lines 39-1 and 39-2. Subsequently, the pulse signal φvc falls to turn off the transistors 44, 44', 44'', and 44''', and the vertical lines 35, 35', 35'', and 35''' and the capacitors 37-1, 37-1', 37-1'', and 37-1''' are set in the floating state. A pulse signal φv1 is output from the vertical shift register 32 to turn on the transistor 33. When a readout pulse signal φR is then applied to the terminal 34 and to the horizontal line 31 through the transistor 33, the readout operation of the photoelectric transducer cells 100 of the first row is started. By this readout operation, the readout signals from the cells of the first row appear on the vertical lines 35, 35', 35'', and 35''' and in the store capacitors 37-1, 37-1', 37-1'', and 37-1'''. When the readout operation is completed, the pulse signal φT1 falls to turn off the transistors 36-1, 36-1', 36-1'', and 36-1'''. The capacitors 37-1, 37-1', 37-1'', and 37-1''' and the vertical lines 35, 35', 35'', and 35''' are disconnected, and then the residual charges on the vertical lines 35, 35', 35'', and 35''' are refreshed.

At time t2, a pulse signal φT2 rises to turn on the transistors 36-2, 36-2', 36-2'', and 36-2''' so that the charges in the store capacitors 37-2, 37-2', 37-2'', and 37-2''' are refreshed. Subsequently, the pulse signal φvc falls to turn off the transistors 44, 44', 44'', and 44'''. A pulse signal φv2 is output from the vertical shift register 33', and the readout pulse signal φR is supplied to the horizontal line 31' through the terminal 34. In this state, the readout operation of the photoelectric transducer cells 100 of the second row is started. By this readout operation, the readout signals from the cells 100 of the second row appear on the vertical lines 35, 35', 35'', and 35''' and in the store capacitors 37-2, 37-2', 37-2'', and 37-2'''. Upon completion of the readout operation for the second row, the pulse signal φT2 falls to turn off the transistors 36-2, 36-2', 36-2'', and 36-2''', and the capacitors 37-2, 37-2', 37-2'', and 37-2''' and the lines 35, 35', 35'', and 35''' are disconnected. The pulse signal φvc rises to refresh the residual charges from the vertical lines 35, 35', 35'', and 35'''.

At time t3, the pulse signal φHc falls to turn off the transistors 40-1 and 40-2. The pulse signal φH1 is output from the horizontal shift register 46 to turn on the transistors 38-1 and 38-2. The charges in the capacitors 37-1 and 37-2 are amplified by the transistors 42-1 and 42-2 through the transistors 38-1 and 38-2 and the output lanes 39-1 and 39-2. Tne amplified signals appear at the terminals 43-1 and 43-2. When this output operation is completed, the pulse signal φHc rises to refresh the output lines 39-1 and 39-2. Subsequently, the pulse signals φH2 and φH3 are sequentially output from the horizontal shift register 46. In the same manner as described above, the readout signals from the cell of the first row and the second column and the cell of the second row and the second column and the readout signals from the cell of the first row and the third column and the cell of the second row and the third column are sequentially output from the terminals 43-1 and 43-2. Every time the readout signals appear, the output lines 39-1 and 39-2 are refreshed.

At time t4, a pulse signal φc1 is output from the vertical shift register 32' to turn on the transsistors 47 and 47'. A pulse signal φF is applied to the terminal 48 so that the refresh pulse is applied to the horizontal lines 31 and 31' through the transistors 31 and 31'. As a result, the refresh operation of the photoelectric transducer cells 100 of the first and second rows is performed.

The readout and refresh operations for the cells 100 of the third and fourth rows are performed at time t5 in the same manner as in the cells of the first and second rows. The readout and refresh operations are repeated for the cells 100 of the first and second rows at time t6. The above operations are repeated.

In the above operation, the time required for sending the readout signal onto the vertical line is the period between rising of the pulse signal φR and falling of the pulse signal φT1, i.e., between the times t1 and t2 when the output from the photoelectric transducer cell 100 of the first row and the first column is assumed. This time interval apparently has a large margin. In the conventional photoelectric transducer apparatus applied in the video camera, the vertical line selected last by horizontal scanning stores the signal charge for about 52.5 μs. For example, if the time interval between rising of the pulse signal φR and falling of the pulse signal φT1 is set to be 0.5 μs, the apparatus of this embodiment can be improved by about 105 times (40 dB) for blooming and smearing, as compared with the conventional apparatus.

Since the store capacitors are arranged, the photosensitive transducer cells are disconnected from the store capacitors by turning off the transistors 36-1, 36-2, 36-1', 36-2', 36-1'', 36-2'', 36-1''', and 36-2''' after the signal charges are stored in the store capacitors, the photoelectric transducer cells 100 can be sufficiently refreshed. For example, the refresh time may be a time interval between times t3 and t5, i.e., one horizontal scanning cycle. Therefore, the after image phenomenon can be reduced as compared with the conventional case.

If the photoelectric transducer apparatus is applied to a color video camera and color filters are formed on the sensor cells, the number of capacitors is that of the colors of column cells, and the operation as described above is performed. In this case, only one vertical line is used for each column, and the aperture of the sensor cells is not reduced. For example, as shown in FIG. 5, the color filters R, G, and B are arranged according to the Bayer's scheme, and the cells are operated at the timings shown in FIG. 6. B signals are stored in the capacitors 37-1 and 37-1'', G signals are stored in the capacitors 37-2, 37-1', 37-2'', and 37-1''', and R signals are stored in the capacitors 37-2' and 37-2''', respectively.

In the above embodiment, the two vertical lines are simultaneously accessed. However, the number of lines is not limited to two, but can be extended to three or more. In this case, the number of store capacitors is that of vertical pixels which are simultaneously accessed.

Figure 7:
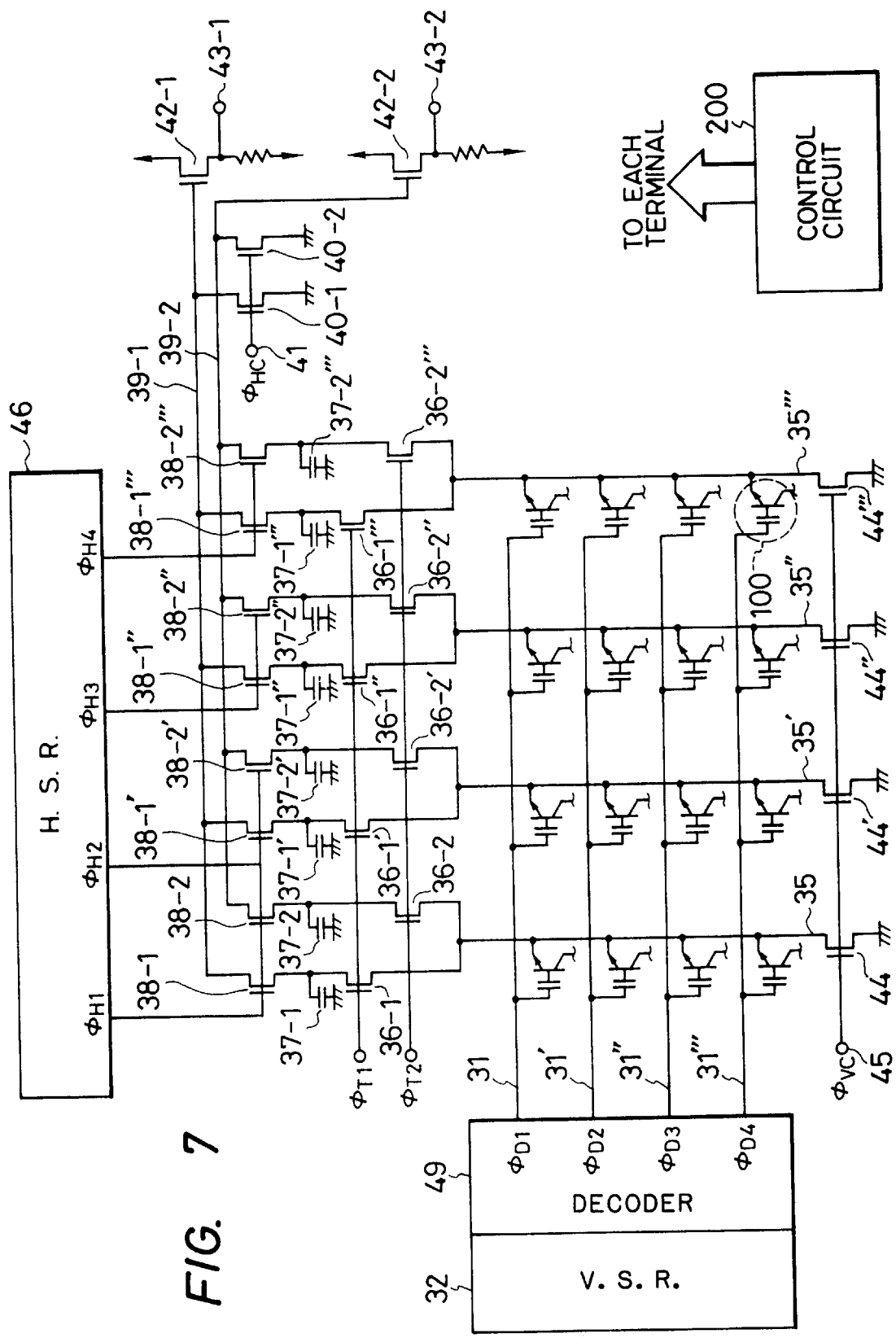
FIG. 7 is a circuit diagram of a photoelectric transducer apparatus according to a fifth embodiment of the present invention.

FIG. 7 is a circuit diagram showing a fifth embodiment of the present invention. A decoder 49 is arranged between a vertical shift register 32 and horizontal lines 31, 31', 31'', and 31''', and a control circuit 200 is operated at timings shown in FIG. 8.

In this embodiment, the decoder 49 also serves the function of the photoelectric transducer cell refresh vertical register 46 of the fourth embodiment (FIG. 5), thereby further simplifying the system configuration.

Figure 8:
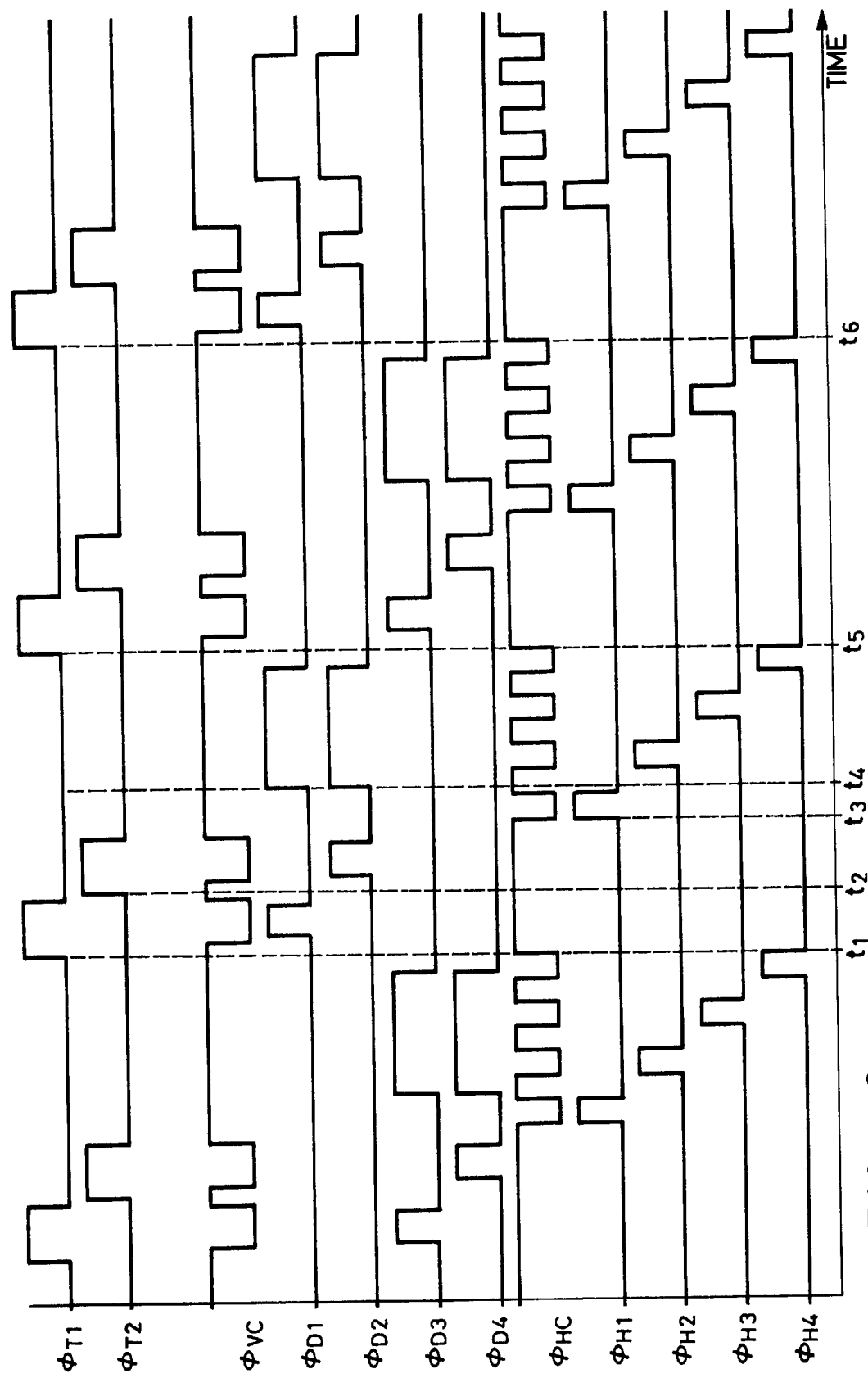
FIG. 8 is a timing chart for explaining the operation of the apparatus in FIG. 7.

The operation of the fifth embodiment will be described with reference to the timing chart of FIG. 8. Assure that the store operaiton is performed until time t1, and that the holes corresponding to the amounts of light incident on the photoelectric transducer cells 100 are respectively stored in their p-type base regions.

At time t1, a pulse signal φvc has already risen, the vertical lines have already been grounded, and a pulse signal φT1 rises to refresh the charges of the capacitors 37-1, 37-1', 37-1'', and 37-1'''. Thereafter, when the pulse signal φvc falls to set the vertical lines and the capacitors in the floating state, the decoder 49 outputs a pulse φD1.

The signals from the photoelectric transducer cells 100 of the first row appear on the vertical lines and in the capacitors 37-1, 37-1', 37-1'', and 37-1'''. After the readout operation is completed, the pulse signal φT1 falls to disconnect the capacitors 37-1, 37-1', 37-1'', and 37-1''' from the vertical lines, and the pulse signal φvc rises again to refresh the vertical lines. The pulse signal φT2 rises to refresh the capacitors 37-2, 37-2', 37-2'', and 37-2''', and the pulse signal φvc then falls. When the pulse signal φD2 rises again, the signals from the photoelectric transducer cells of the second row appear on the vertical lines and the capacitors 37-2, 37-2', 37-2'', and 37-2'''. Thereafter, the pulse signal φT2 falls and the pulse signal φvc rises to refresh the vertical lines. In this state, the signals from the first row are stored in the capacitors 37-1, 37-1', 37-1'', and 37-1''', and the signals from the second row are stored in the capacitors 37-2, 37-2', 37-2'', and 37-2'''.

In the same manner as in the first embodiment, these stored signals are sequentially read out from time t3 to time t5. In this case, during the time interval from time t4 to a time immediately before time t5, the pulse signals φD1 and φD2 are set at high level, so that the photoelectric transducer cells 100 of the first and second rows are refreshed.

The readout and refresh operations of the photoelectric transducer cells of the third and fourth rows are performed in the same manner as described above.

According to this embodiment, the refresh and readout operations of the photoelectric transducer cells of each cell are performed by using a single vertical shift register, thereby simplifying the system configuration.

In the above embodiment, the two output lines are used. However, the number of output lines may be three or more. For example, as shown in a sixth embodiment of FIG. 9, four output lines are used in units of colors of filters. In this case, the load of the output lines can be reduced to ½ of that of the two output lines. In addition, an image processing circuit can also be simplified.

Figure 9:
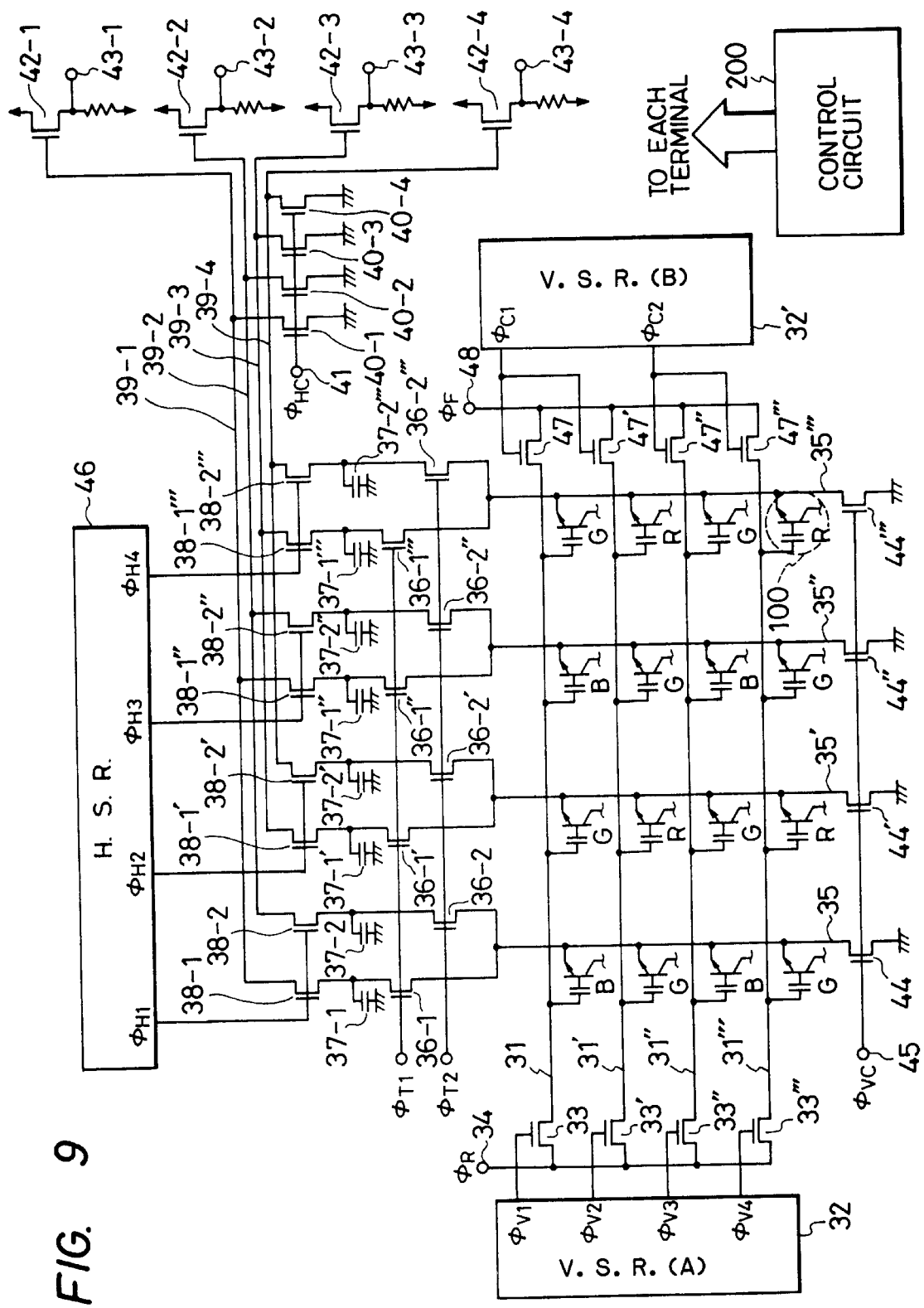
FIG. 9 is a circuit diagram of a photoelectric transducer apparatus according to a sixth embodiment of the present invention.

The arrangement of FIG. 9 is different from that of FIG. 5 in the following points. Output lines 39-3 and 39-4 are added. Transistors 38-1 and 38-1''' are connected to a transistor 39-3 instead of the transistor 39-1. Transistors 38-2' and 38-2''' are connected to a transistor 39-4 instead of the transistor 39-2. Transistors 40-3 and 40-4, the gates of which are commonly connected to the gates of transistors 40-1 and 40-2, are added to refresh the output lines 39-3 and 39-4. A transistor 42-3 for outputting a signal from the output signal 39-3, an output terminal 43-4, a transistor 42-4 for outputting a signal from the output line 39-4, and an output terminal 43-4 are added.

Other arrangements of FIG. 9 are the same as those of FIG. 5, and the same reference numerals as in FIG. 5 denote the same parts in FIG. 9.

In the photoelectric transducer apparatuses in the foruth to sixth embodiments as described above in detail, a plurality of capacitors are arranged for each readout line of the photoelectric transducer cells. The signal charges can be stored in the capacitors in a short period of time, and then the readout lines can be disconnected therefrom. Therefore, blooming and smearing caused by the presence of the signal charges on the readout lines can be completely prevented.

Furthermore, since the refresh time can be sufficiently prolonged, the after image phenomenon can be effectively prevented.

Many lines are often simultaneously accessed when the photoelectric transducer apparatus is applied to a color video camera or the like. The capacitors corresponding to the pixels to be accessed are arranged for each readout line. The number of readout lines need not be increased, and thus the aperture can be increased.

A seventh embodiment of the present invention will be described below.

Figure 10:
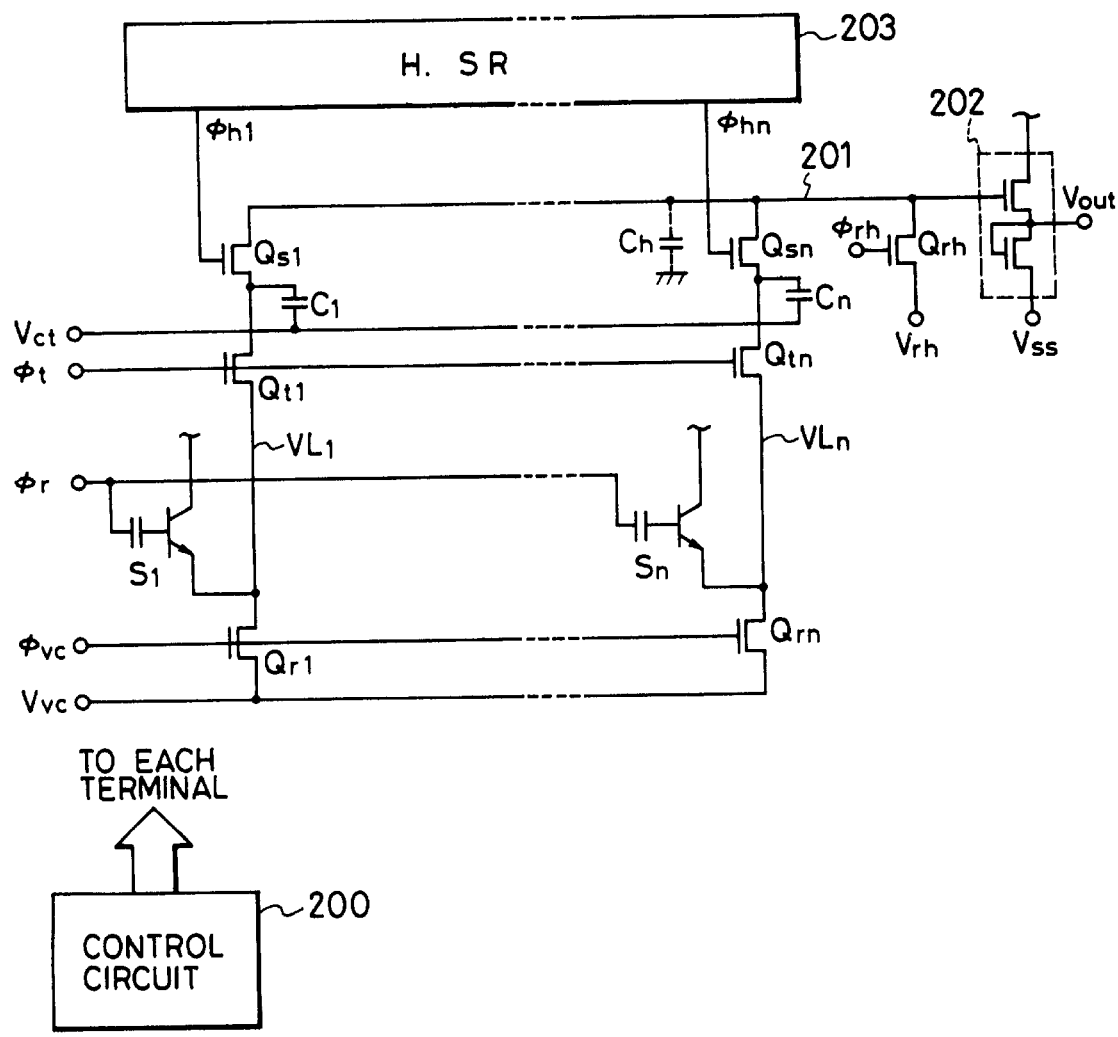
FIG. 10 is a circuit diagram of a photoelectric transducer apparatus according to a seventh embodiment of the present invention.

FIG. 10 is a circuit diagram of a photoelectric transducer aapparatus according to the seventh embodiment of the present invention.

Referring to FIG. 10, a driving pulse $\phi R$ is applied from a control circuit 200 to capacitor electrodes of photoelectric transducer cells S1 to Sn. A predetermined positive voltage is applied to the collector electrodes of the cells S1 to Sn. The emitter electrodes of the cells S1 to Sn are respectively connected to vertical lines VL1 to VLn. Each of these vertical lines is connected to one terminal of a corresponding one of store capacitors C1 to Cn (each having a capacitance Ct) through a corresponding one of transistors Qtl to Qtn. The other terminal of each of the capacitors C1 to Cn properly receives a bias voltace Vct in a manner to be described later.

One terminal of each of the capacitors C1 to Cn is connected to an output line 201 through a corresponding one of transistors QS1 and QSn. The output line 201 has a stray capacitance Ch equal to the capacitance Ct of each of the store capacitors C1 to Cn.

The input terminal of an output amplifier 202 is connected to the output line 201 and to a transistor Qrh for properly applying a reset voltage Vrh. The value of the reset voltage Vrh is selected within the range wherein the linearity of the output amplifier 202 is not degraded. In this embodiment, the range is 1.5 to 3.5 V. The output amplifier 202 is connected to a single power source and is driven thereby.

Pulses $\phi h1$ to $\phi hn$ are sequentially applied from a scanning circuit 103 to the gate electrodes of the transistors QS1 and QSn. A pulse $\phi t$ is applied to the gate electrodes of the transistors Qtl to Qtn.

Figure 11:
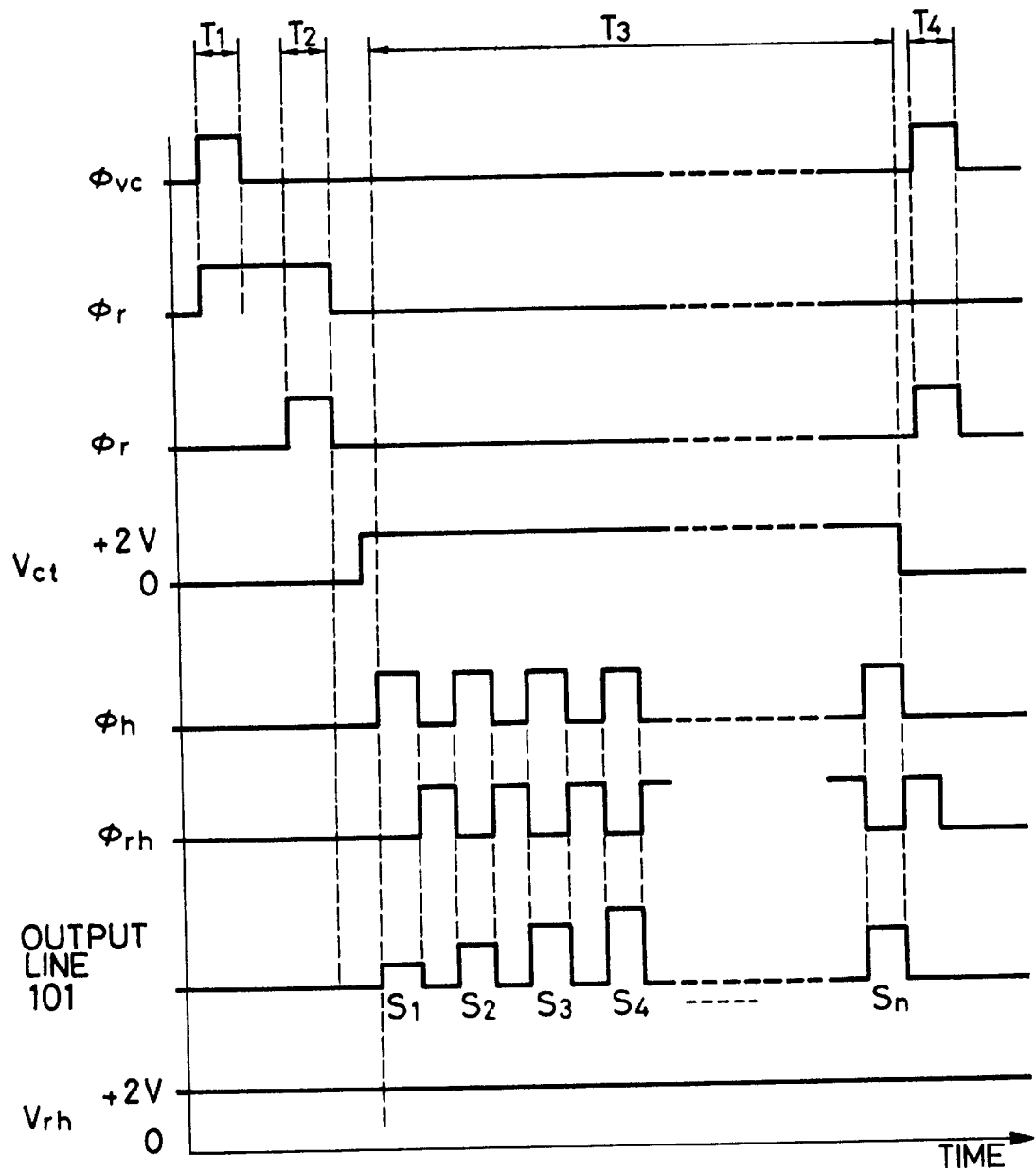
FIG. 11 is a timing chart for explaining the apparatus in FIG. 10.

A voltage Vvc is applied to the respective vertical lines through transistors Qr1 to Qrn. The gate electrodes of these transistors receive a pulse $\phi vc$. A control circuit 200 supplies a driving pulse to each terminal. FIG. 11 is a timing chart for explaining the operation of the control circuit.

The transistors Qr1 to Qrn and the transistors Qtl to Qtn are turned on in response to the pulses $\phi vc$ and $\phi t$, respectively, to clear (duration T1) the capacitors C1 to Cn. Subsequently, the pulse $\phi vc$ is set at L level, and the capacitors C1 to Cn are charged (duration T2) with the readout signals from the photoelectric transducer cells in response to the driving pulse $\phi r$. In this case, the bias voltage Vct is the ground potential.

After the bias voltage Vct is set to be +2 V, the signals from the capacitors C1 to Cn are output at timings of the shift pulses $\phi h1$ to $\phi hn$.

More specifically, the transistor QS1 is turned on in response to the pulse $\phi hl$. As described above, the signal read out from the photoelectric transducer cell S1 and stored in the capacitor C1 is read out onto the output line 201.

Subsequently, the transistor Qrh is turned on in response to the pulse $\phi rh$, and the output line 201 is reset to the reset voltage Vrh (e.g., +2 V). In the same manner as described above, the readout signals stored in the capacitors C2 to Cn are sequentially read out onto the output line 101 and are output through the output amplifier 102 (a duration T3).

When the output operation is completed, the refresh operation is performed in response to the pulse $\phi vc$ and the driving pulse $\phi r$ (a duration T4).

The basic operation of the circuit in FIG. 10 will be described below.

Figure 12A:
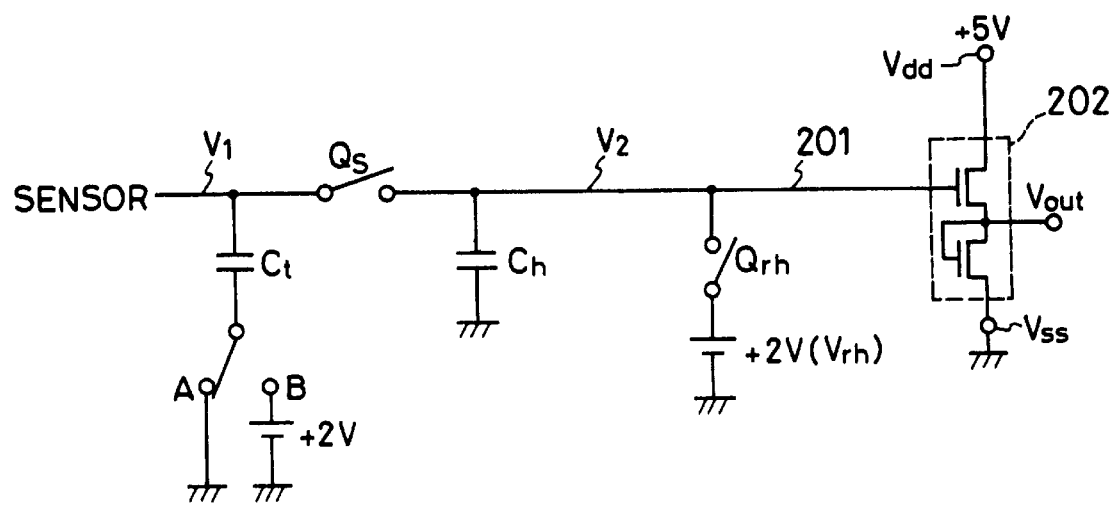
FIG. 12A is a circuit diagram for explaining a basic operation of the seventh embodiment of the present invention.
Figure 12B:
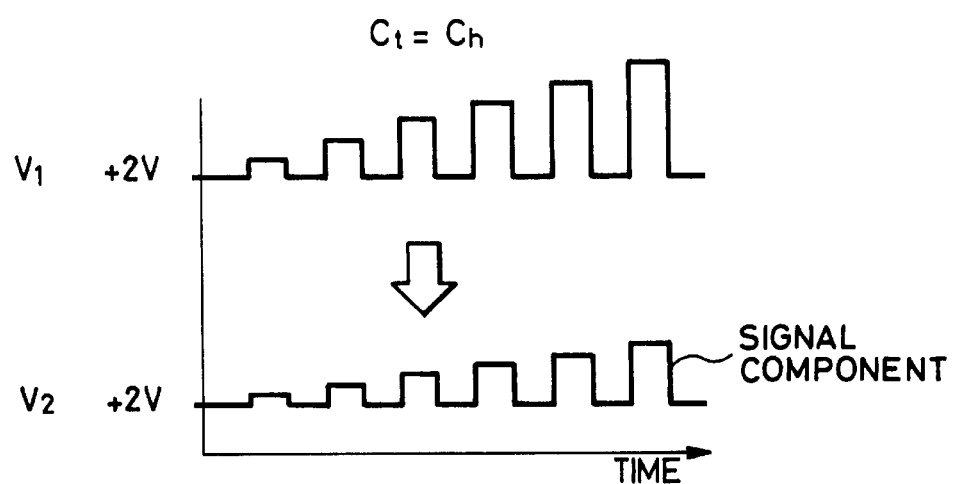
FIG. 12B is a timing chart showing the voltage waveforms in the seventh embodiment.

FIG. 12A is a circuit diagram for explaining the basic operation of the circuit in FIG. 10, and FIG. 12B is a timing chart showing the voltage waveforms.

Referring to FIG. 12A, a switch for selecting the ground voltage (contact A) or the bias voltage of +2 V (contact B) is equivalently connected to the store capacitor Ct. A switch Qrh for applying the reset voltage Vrh (+2 V) is equivalently connected to the output line 201. Also assume that the voltage of the capacitor Ct is vl, and that the voltage of the ouput line 201 is v2.

The capacitor Ct is connected to the contact A and grounded, and the readout signal from the sensor is stored in the capacitor Ct. The capacitor Ct is then connected to the contact B and receives the bias voltage of +2 V. The voltage of the capacitor Ct at the time of zero level of the readout signal is set to be equal to the reset voltage of the output line.

Subsequently, when the switch Qs is closed, the ½ component of the signal of the voltage vl appears on the output line 201 since Ct=Ch. This voltage is input as a voltage V2 to the output amplifier 202. Closing of the switch Qrh causes resetting of the output line 201 at the voltage of +2 V (FIG. 12B).

According to this embodiment, only the signal component is input to the output amplifier 202, and the input voltage does not greatly vary upon resetting. The dynamic range of the output amplifier 202 can therefore be increased. The amplitude of the voltage Vrh or Vct can have a large margin.

By setting the potential of the output line 201 connected to the input terminal of the output amplifier 202 at a low potential excluding the ground potential, the Vss terminal of the output amplifier 202 can be grounded and a positive voltage (+5 V in this case) can be applied to the Vdd terminal thereof by a single power source. (For example, if the reset potential is zero, the negative and positive potentials are respectively applied to the Vss and Vdd terminals, and thus two power sources are required).

If the bias voltage of the capacitor Ct is not changed, the potential of the output line 201 greatly varies between the reset potential Vrh and the signal component potential of the readout signal. The sensor signal is normally amplified to a proper signal level by a signal processor (to be described later). If the above unnecessary component is generated, the circuit system is saturated since the unnecessary component has a magnitude larger than that of the signal component, thereby degrading the signal component. However, according to the above embodiment, the above problem does not occur. If an output amplifier having a wide dynamic range is arranged, it prevents use of a low-level driving source and design of a compact imaging device. However, according this embodiment, the wide dynamic range of the amplifier 202 is not required, so that a compact imaging device can be provided.

Now consider the charge/discharge time. A reset potential portion of the output signal Vout can sufficiently drive a load capacitance (a bonding capacitance, a wiring capacitance, an input transistor capacitance, and the like) by a source current of a source follower circuit. However, the signal component portion of the output signal becomes a sink current of the source follower circuit. If an output resistance is not sufficiently small, a discharge time constant is increased to degrade linearity of a small signal. A decrease in output resistance causes current consumption loss. According to this embodiment, since the dynamic range of the output amplifier can be narrowed, this problem does not occur.

In order to eliminate the unnecessary voltage variation component, a sample/hold (S/H) circuit is required. The relationship between a timing pulse for the S/H circuit and the signal component is very important. It is desirable not to arrange the S/H circuit to obtain good temperature characteristics and the power source voltage characteristics. However, if the S/H circuit is not arranged, the blocking characteristic curve of a low-pass filter becomes steep when the output signal is band-limited thereby, and hence image quality is degraded. However, according to this embodiment, since the S/H circuit need not be used, the apparatus of this embodiment can be stably operated against temperature and voltage variations.

Figure 13:
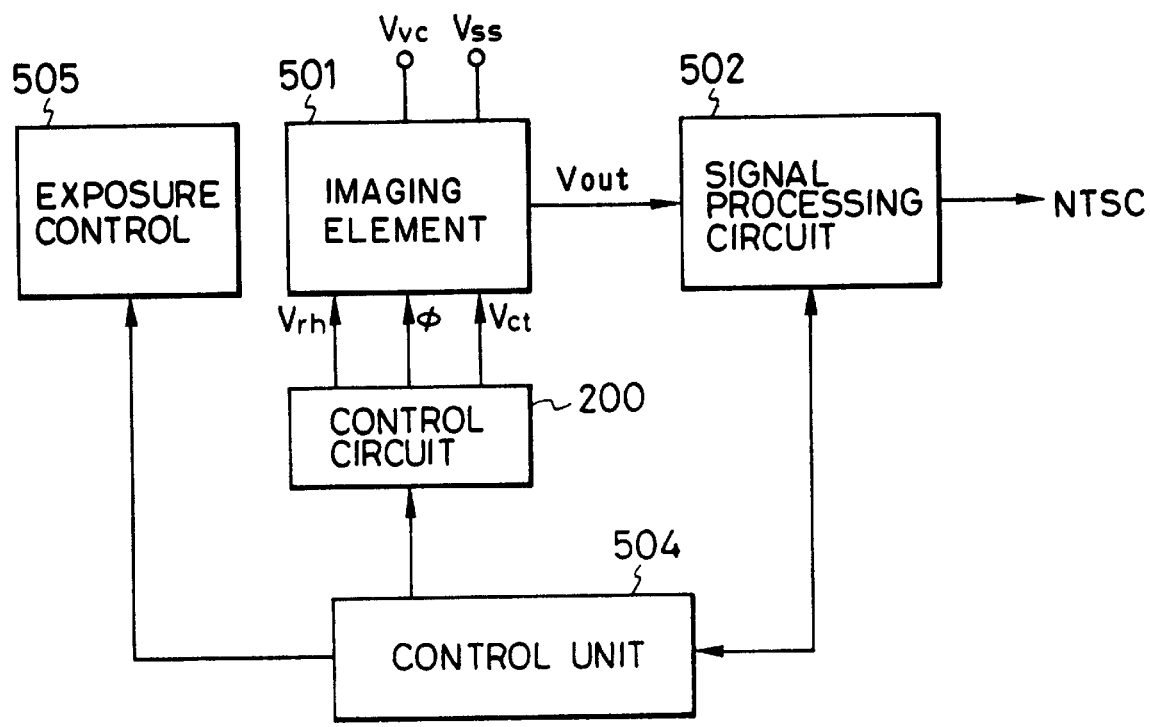
FIG. 13 is a block diagram of an imaging device on the basis of the above embodiments of the present invention.

FIG. 13 shows a schematic arrangement of an imaging device using the above embodiment.

Referring to FIG. 13, an imaging element 501 has the same arrangement as in the embodiment of FIG. 10. An output signal Vout from the imaging element 501 is gain-controlled by a signal processing circuit 502 and is output as a standard NTSC signal or the like.

Various pulses φ and the bias voltage Vct for driving the imaging element 501 are generated by a control circuit 200. The control circuit 200 is operated under the control of the control unit 504. In this case, the control circuit 200 also serves as the switching means for properly applying the bias voltage Vct. The control unit 504 controls the gain or the like of the signal processing circuit 502 on the basis of the output from the imaging element 501 to control the amount of light incident on the imaging element 501.

Figure 14:
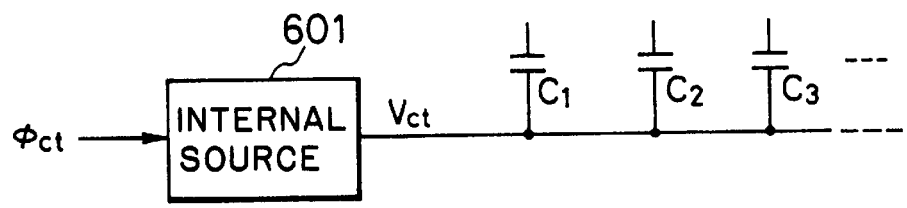
FIG. 14 is a circuit diagram showing part of an eighth embodiment of the present invention.

The bias voltage Vct applied to the store capacitors C1 to Cn is supplied from the control circuit 200. However, an internal power source 601 shown in FIG. 14, may be arranged. In this case, the internal power source 601 is operated in response to a control pulse φct from the control unit 504 to generate the bias voltage Vct.

In the photoelectric transducer apparatus as described in detail, a simple method of temporarily changing the reference potential of the capacitors in the readout mode is employed, so that only a single power source for the imaging driving voltage can be used. As a result, the imaging device can be made more compact at lower power consumption.

FIG. 16A is a schematic circuit diagram of a solid state image pickup apparatus according to an embodiment of the present invention.

Referring to FIG. 16A, switches SW1 to SWn are arranged to select corresponding inputs in response to pulses φc1 to φcn. The switches SW1 to SWn respectively receive sensor signals S1 to Sn from photosensors S1 to Sn arranged in a line or a matrix form. The switches Sw1 to SWn also receive signals E from reference signal sources E, respectively.

The output terminals of the switches SW1 to Swn are respectively connected to the input terminals of amplifiers A1 to An. The output terminals of the amplifiers A1 to An are connected to an output line 101A through corresponding transistors T1 to Tn. Pulses φ1 to φn from a scanning circuit SH such as a shift register are respectively supplied to the gate electrodes of the transistors T1 to Tn. The transistors T1 to Tn are turned on in response to the pulses φ1 to φn.

The output line 101A is grounded through a transistor 103A. A pulse φhrs is applied to the gate electrode of the transistor 103A. The output line 101A is also connected to a difference processing circuit 1A. An output signal Vout free from noise components is output from the difference processing circuit 1A.

In the difference processing circuit 1A in this embodiment, the output line 101A is connected to an amplifier 11A. The input terminals of sample/hold (S/H) circuits 12A and 13A are connected to the output terminal of the amplifier 11A. Pulses φh1 and φh2 as control signals are respectively supplied to the S/H circuits 12A and 13A so that the S/H circuits 12A and 13A hold the inputs at the input timings of these pulses, respectively. The output terminals of the S/H circuits 12A and 13A are respectively connected to the noninverting and inverting input terminals of a differential amplifier 14A. The output signal Vout is output from the differential amplifier 14A.

The operation of this embodiment will be described below.

When the reference signal E is input to the amplifier A1 upon operation of the switch SW1, the reference signal E is amplified by the amplifier A1, and an amplified signal E1' is output to the transistor T1. In this case, only the transistor T1 is kept on in response to the pulse φ1, and other transistors T2 to Tn are kept off. The reference signal E1' is selected by the transistor T1 and appears on the output line 101A. The reference signal E1' is held in the S/H circuit 12A through the amplifier 11A More specifically, the pulse φh1 is supplied to the S/H circuit 12A when it holds the reference signal E1'.

The reference signal E1' held by the S/H circuit 12A is a signal reflecting variation characteristics of the amplifier A1, i.e., a signal including a noise component N1 which becomes a steady pattern noise. In other words, E1'=E+N1.

Subsequently, the transistor 103A is turned on in response to the pulse φhrs to remove the charge left on the output line 101A. An output signal from the sensor S1 is input to the amplifier A1 through the switch SW1. In the same manner as described above, a sensor signal S1' amplified by the amplifier A1 appears on the output line 101A through the ON transistor T1 and is held by the S/H circuit 13A through the amplifier 11A.

The sensor signal S1' held by the S/H circuit 13A also reflects variation characteristics, i.e., a signal including the noise component N1 (S1'=S1+N1).

When the reference signal E1' and the sensor signal S1' are respectively held by the S/H circuits 12A and 13A, the signals S1' and E1' are input to the differential amplifier 14A. The output Vout from the differential amplifier 14A is a difference (S1'−E1') between the sensor and reference signals S1' and E1', thereby obtaining a signal (S1−E) free from the noise component N1. In this case, the reference signal E represents the reference level of the sensor signal S1, so that E=0 is established. Therefore, the output signal Vout is the sensor signal S1 before being subjected to the influence of the amplifier A1.

When the sensor signal S1 is output in this manner, the residual charge on the output line 101A is eliminated by the transistor 103A. At the timings in the same manner as described above, the sensor signals S2 to Sn free from the noise components N2 to Nn are sequentially output from the differential amplifier 14A.

In the above description, the reference signal E is read out prior to the corresponding sensor signal. However, each sensor signal may be read out prior to the reference signal E.

In the above description, the reference and sensor signals E1' and S1' are held in the separate S/H circuits, respectively. However, one of the S/H circuits may be omitted, and the output terminal of the amplifier 11A may be directly connected to the amplifier 14A (FIG. 16B). In this case, one readout signal is held by the S/H circuit 12A in response to the pulse φhl, and the output signal Vout is output from the differential amplifier 14A at the read timing of the other readout signal.

Figure 17:
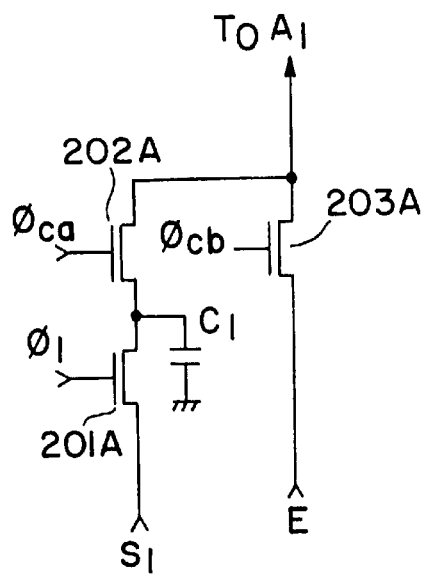
FIG. 17 is a circuit diagram showing an arrangement of switches SW1 to SWn in the apparatus of FIG. 16A.

FIG. 17 is a circuit diagram showing an arrangement of switches SW1 to SWn in the apparatus shown in FIG. 16A.

Referring to FIG. 17, a transistor 201A is turned on in response to a pulse φt to store the sensor signal S1 in a capacitor C1. Subsequently, a transistor 203A is turned on in response to a pulse φcb to output the reference signal E to the amplifier A1.

When the reference signal E1' is held as described above, the transistor 202A is turned on in response to a pulse φca to output the sensor signal S1 from the capacitor C1 to the amplifier A1.

The switches SW2 to SWn have the same arrangement as that of the switch SW1, and operations of the switches SW2 to Swn are also the same as that of the switch SW1.

Figure 18:
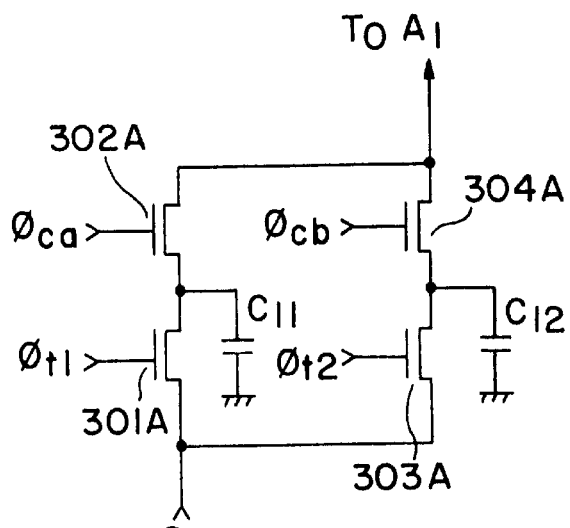
FIG. 18 is a circuit diagram showing another arrangement of switches SW1 to SWn in the apparatus of FIG. 16A.

FIG. 18 is a circuit diagram showing another arrangement of the switches SW1 to SWn in the apparatus of FIG. 16A.

In this arrangement, the reference signal E is generated by drive noise caused by variations in leakage component of the sensor.

Referring to FIG. 18, a transistor 301A is turned on in response to a pulse, φt1 to store the sensor signal S1 in a capacitor C11. Subsequently, a transistor 303A is turned on in response to a pulse φt2. A sensor signal representing absence of optical information or the dark state thereof serves as the reference signal E. This reference signal E is stored in a capacitor C12. In this state, a drive noise component of the corresponding sensor is stored in the capacitor C12. In the same manner as described above, a transistor 304A is turned on to output the reference signal E from the capacitor C12 to an amplifier A1 and then a transistor 302A is turned on to output the sensor signal S1 from the capacitor C11 to the amplifier A1.

By using the sensor drive noise component as the reference signal E, the output Vout (=S1'-E1') from the differential amplifier 14A is free from the sensor drive noise component as well as the noise component N1 of the amplifier A1.

Figure 19A:
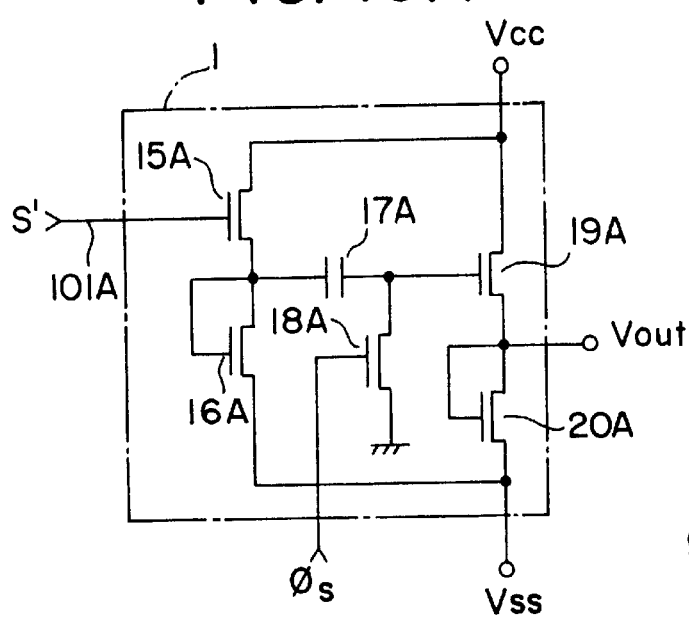
FIG. 19A is a circuit diagram showing another arrangement of a difference processing circuit in the apparatus of FIG. 16A.
Figure 19B:
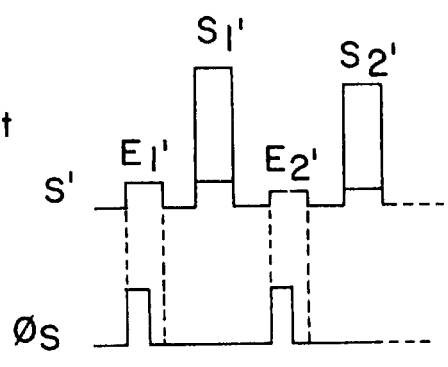
FIG. 19B is a timing chart for explaining the operation of the difference processing circuit shown in FIG. 19A.

FIG. 19A is a circuit diagram showing another arrangement of the difference processing circuit in the apparatus shown in FIG. 16A, and FIG. 19B is a timing chart for explaining the operation thereof.

Difference processing is performed by a clamping circuit in this arrangement.

Referring to FIGS. 19A and 19B, the reference signal E1' amplified by the amplifier A1 appears on the output line 101A and is input to a clamp circuit through an amplifier comprising transistors 15A and 16A. In this case, the clamp circuit comprises a capacitor 17A and a transistor 18A. Since the transistor 18A in the clamp circuit is kept on in response to a clamp pulse φs, the level of the reference signal E1' is clamped as the reference level. As a result, the sensor signal S1' subsequently appearing on the output line 101A is amplified by an amplifier of transistors 19A and 20A using the reference signal E1' as a reference level. In the same manner as in FIG. 15, the output signal Vout obtained by removing the reference signal E1' from the sensor signal S1' is obtained. Similarly, the clamp pulse φs is generated at a read timing of the reference signal E1', and the sensor signals S1 to Sn free from the noise components are sequentially output.

Figure 20B:
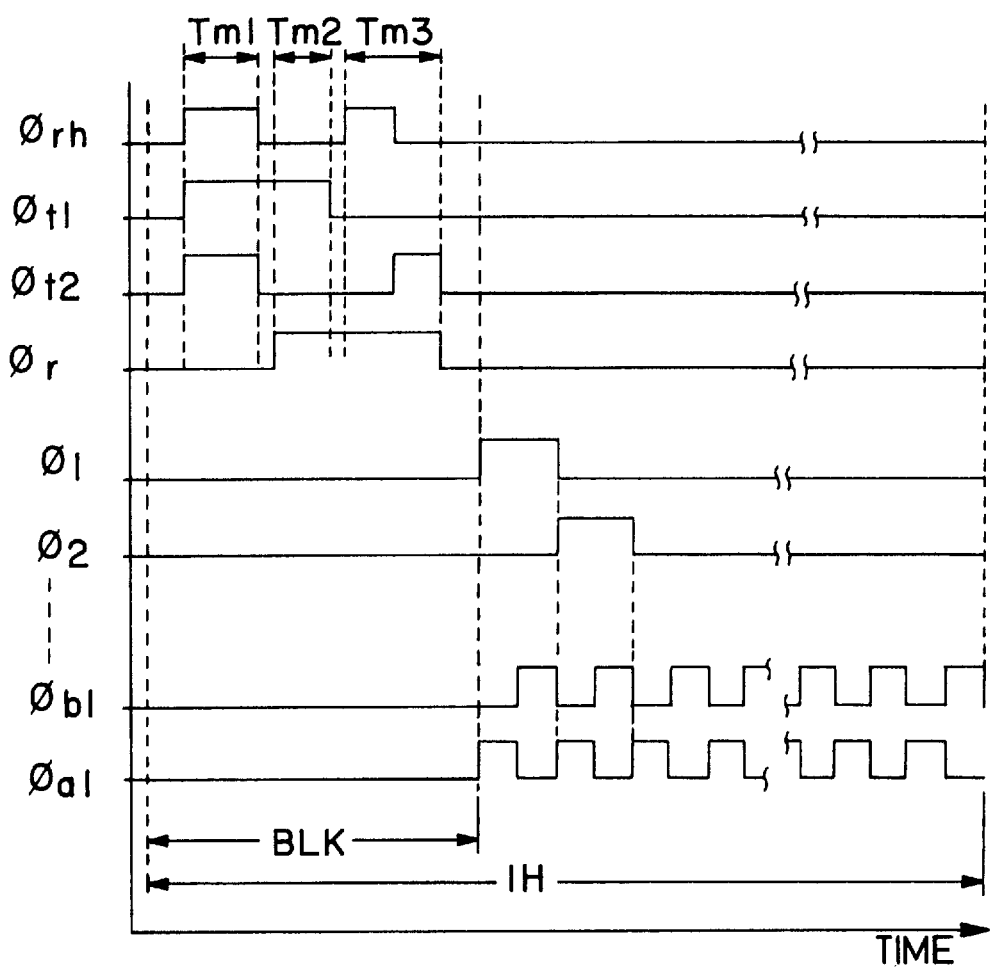
FIG. 20B is a timing chart for explaining the operation of the apparatus shown in FIG. 20A.

FIG. 20A is a schematic circuit diagram of a solid state image pickup apparatus according to another embodiment of the present invention, and FIG. 20B is a timing chart for explaining the operation thereof.

Referring to FIG. 20A, sensors B1 to Bn (to be referred to as B hereinafter) are base accumulation type phototransistors. A base potential of each transistor is controlled through a capacitor, and the carriers excited upon incidence of light are accumulated in the base region of the transistor. The accumulated voltage is read out as a sensor signal, or the accumulated carriers are removed.

A read or refresh pulse φr is applied to the capacitor electrodes of the sensors B. The emitter electrodes of the sensors B which are adapted to read out sensor signals S1 to Sn (to be referred to as S hereinafter) are grounded through transistors Qr1 to Qrn (to be referred to as Qr hereinafter), respectively. The emitter electrodes are connected to temporary storage capacitors C11 to Cn1 through transistors Qa1 to Qan (to be referred to as Qa hereinafter) and to temporary storage capacitors C12 to Cn2 through transistors Qc1 to Qcn (to be referred to as Qc hereinafter), respectively.

The capacitors C11 to Cn1 are connected to the gate electrodes of amplifiers A1 to An through transistors Qb1 to Qbn, respectively. The capacitors C12 to Cn2 are connected to the gate electrodes of the amplifiers A1 to An through transistors Qd1 to Qdn, respectively.

A voltage Vcc is applied to the first terminals of the amplifiers A1 to An, and an output line 501A is commonly connected to the second input terminals thereof.

A pulse φal is applied to the gate electrodes of the transistors Qb1 to Qbn through transistors Qe1 to Qen. A pulse φb1 is applied to the gate electrodes of the transistors Qd1 to Qdn through transistors Qf1 to Qfn.

Pulses φ1 to φn from a scanning circuit SH are sequentially supplied to the gate electrodes of the transistors Qe1 to Qen, Qf1 to Qfn, and T1 to Tn, respectively.

A transistor 502A is connected to the output line 501A, and a voltage Vss is applied to the output line 501A through the transistor 502A. A signal S' amplified by each amplifier and appearing on the output line 501A is input to the difference processing circuit 1A, and difference processing as described above is performed. It should be noted that the difference processing circuit 1A in this embodiment is of a differential type using the S/H circuit shown in FIG. 16A.

The operation of the apparatus of this embodiment will be described with reference to FIG. 20B.

Assume that carriers corresponding to the intensity levels of the incident light are stored in the base regions of the sensors B, respectively.

For a time interval Tm1, the transistors Qr are kept on in response to the pulse φrh, and the emitter electrodes of the sensors B and the vertical lines are grounded. At the same time, the transistors Qa and Qc are turned on in response to the pulses φt1 and φt2 to clear the carriers from the capacitors C11 to Cn1 and C12 to Cn2, respectively.

For a time interval Tm2, the transistors Qa are kept on in response to the pulse φt1 to supply the read pulse φr to the sensors B. Therefore, the sensor signals S from the sensors B are stored in the capacitors C11 to Cn1, respectively. These sensor signals include the drive noise components of the corresponding sensors.

For a time interval Tm3, the transistors Qr are kept on in response to the pulse φrh to ground the emitters of the sensors B. The sensors B are refreshed in response to the refresh pulse φr. Upon completion of refreshing, the transistors Qrh are turned off, and the transistors Qc are turned on in response to the pulse φt2. During this period, the read pulse φr is applied to read out the signals S from the sensors B. Their drive noise components, i.e., the above-mentioned reference signals E1 to En are respectively stored in the capacitors C12 to Cn2. Thereafter, the pulse φr falls to cause the sensors B to start charge accumulation.

The above operations are performed during a blanking period BLK, and the signals temporarily stored in the corresponding capacitors are sequentially read out onto the output line 501A.

The transistors T1, Qe1, and Qf1 are turned on in response to the pulse φ1. The voltage Vcc is applied to the amplifier A1, and the amplifier A1 is rendered operative (other amplifiers A2 to An are rendered inoperative). The pulse φa1 rises in synchronism with the pulse φ1 and the transistor Qb1 is turned on through the ON transistor Qe1. The sensor signal S1 stored in the capacitor C11 is amplified by the amplifier A1, and the amplified signal appears on the output line 501A and is then held in an S/H circuit 12A in a difference processing circuit 1A.

Subsequently, the pulse φb1 rises and then the transistor Qd1 is turned on through the transistor Qf1. The reference signal E1 stored in the capacitor C12 is amplified by the amplifier A1, and the amplified signal appears on the output line 501A and then held by an S/H circuit 13A.

It can be assumed that a potential of an input to the amplifier A1 can be reset to a reference potential for a period from the time when the sensor signal S1 is output from the capacitor C11 to the amplifier A1 and to the time when the reference signal E1 is output from the capacitor C12.

However, most of the input capacitance of the amplifier A1 is an overlap capacitance of the transistors. The input capacitance is sufficiently smaller than the capacitances of the capacitors C11 and C12, and the residual charge can be neglected. Steady pattern noise caused by variations in amplifier characteristics is typical when the image signal is small. In this case, the residual charge is further decreased.

From the above reasons, a means for resetting the input terminals of the amplifiers A1 to An is omitted. However, in an application wherein the residual charge cannot be neglected, a reset means must be connected to the inputs of the amplifiers A.

When the sensor and reference signals S1' and E1' are respectively held by the S/H circuits 12A and 13A, the above-mentioned difference processing is performed to cause the differential amplifier 14A to produce the sensor signal S1 as the output signal Vout free from the drive noise component and the noise component N1. Similarly, the sensor outputs S1 to Sn are sequentially output.

When all sensor signals are output, the next sensor signals corresponding to the incident light are stored in the sensors B. In the same manner as described above, sensor read access and refreshing are performed for the blanking period BLK. Charge accumulation of the sensors B and dot sequential operation of the sensor signals temporarily stored in the capacitors are simultaneously performed.

When the clamp circuit shown in FIG. 19 is used in the difference processing circuit 1A, the capacitor C12 for charging the reference signal E1 and then the capacitor C11 for charging the sensor signal S1 must be discharged. This applies to the signal readout operations of the sensor signals S2 to Sn.

Figure 21:
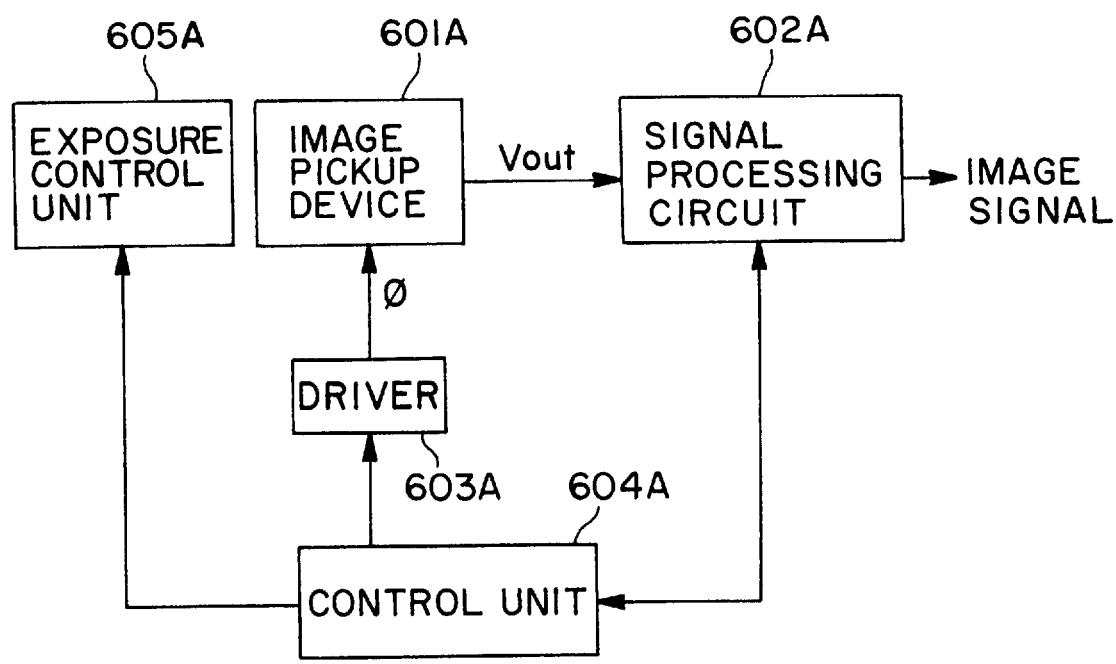
FIG. 21 a is a block diagram showing an image pickup system using the apparatus (of any embodiment of FIGS. 15–20 described above) as an image pickup device.

FIG. 21 shows a schematic arrangement of an image pickup system using any one of the image pickup apparatuses of the embodiments as an image pickup device.

Referring to FIG. 21 an image pickup device 601A comprises an image pickup apparatus of any one of the above embodiments. The gain or the like of the output signal Vout is controlled by a signal processing circuit 602A, and the resultant signal is output as an image signal.

Various pulses φ for driving the image pickup device 601A are supplied from a driver 603A. The driver 603A is operated under the control of a control unit 604A. The control unit 604A controls the gain or the like of the signal processing circuit 602A on the basis of the output from the image pickup device 601A and also controls an exposure control unit 605A to adjust an amount of light incident on the image pickup device 301A.

As described above, in the solid state image pickup apparatus according to the above embodiments, a difference between the selected sensor signal and the selected reference signal is calculated to obtain an output signal free from the noise components. Therefore, the variations in readout signal depending on the potential variations of the input/output characteristics of the selector can be corrected. The steady pattern noise caused by the variations in amplifier characteristics can be eliminated.

Figure 15A:
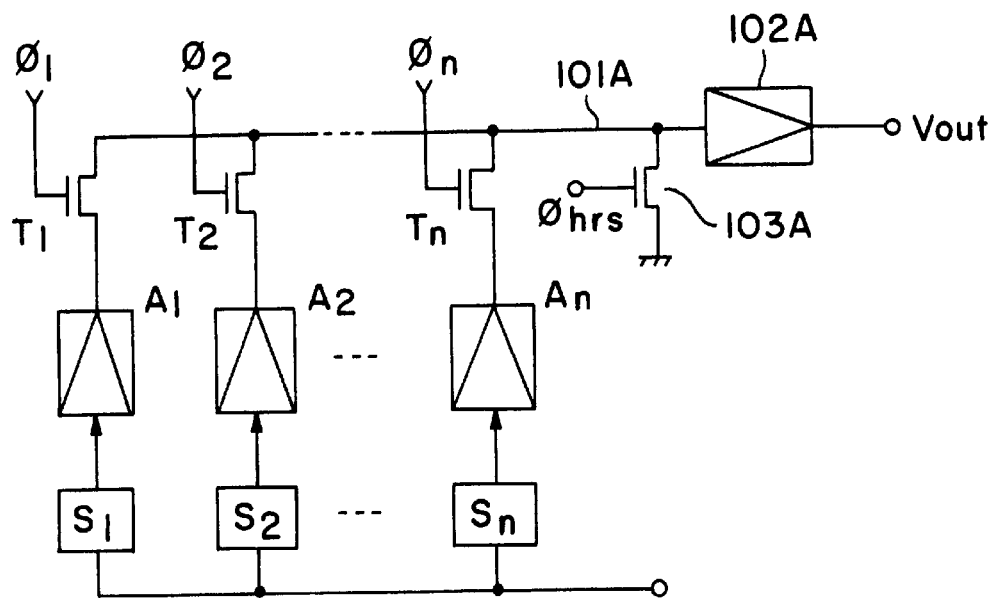
FIG. 15A is a schematic circuit diagram of a conventional solid state image pickup apparatus.
Figure 15B:
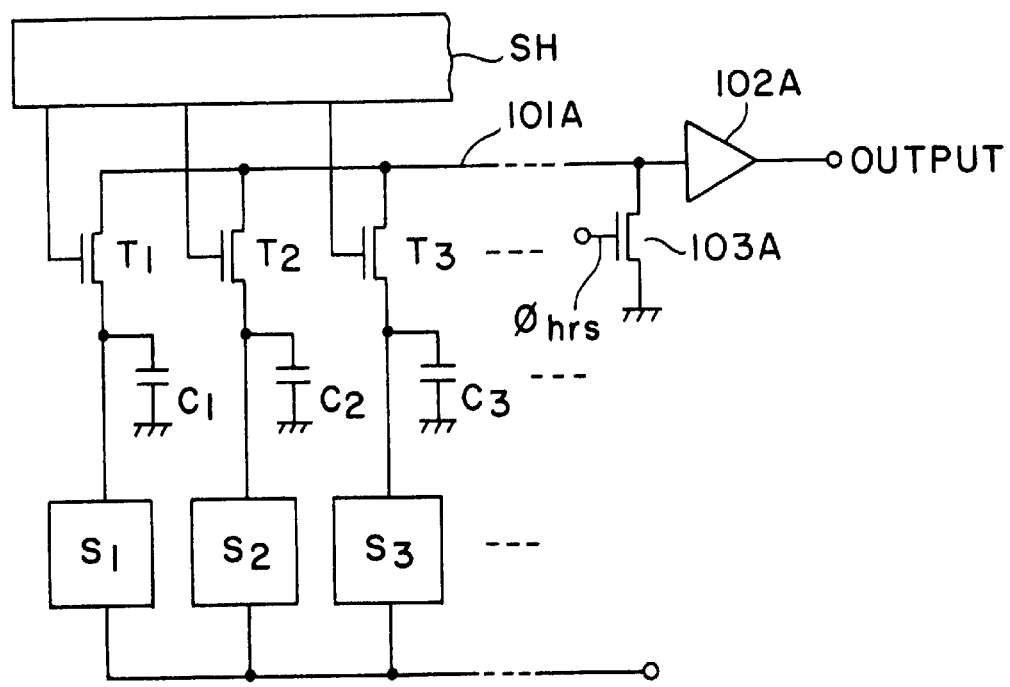
FIG. 15B is a schematic view of another conventional solid state image pickup apparatus.
Figure 15C:
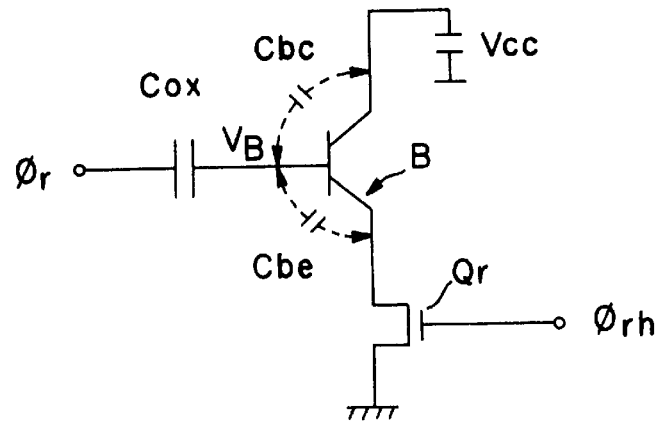
FIGS. 15C to 15E are views for explaining the principle of generation of drive noise of a photoelectric transducer element.
Figure 15D:
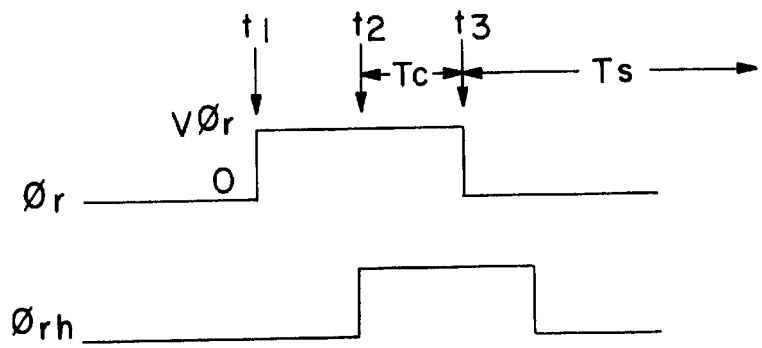
Figure 15E:
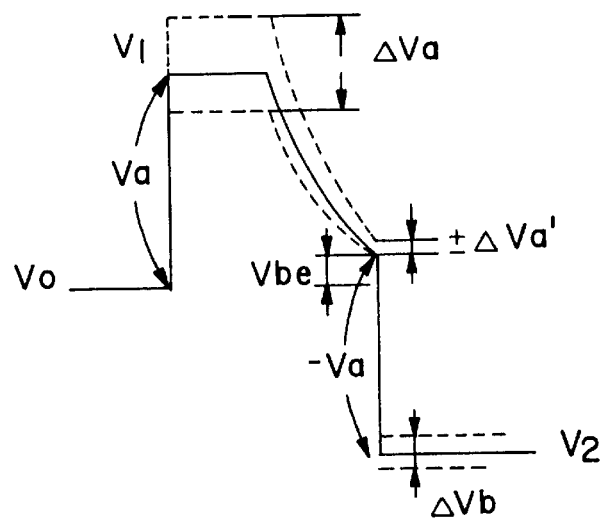

A photoelectric transducer element used in FIGS. 16A to 21 will be described as a supplementary explanation of FIGS. 15C to 15E.

Figure 22A:
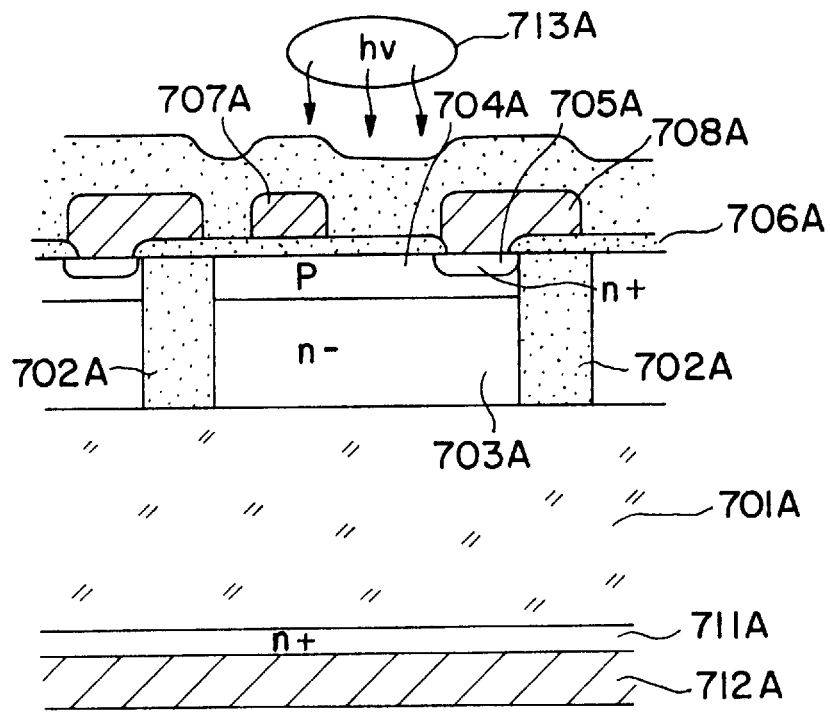
FIG. 22A is a schematic sectional view of a photoelectric transducer cell described in Japanese Patent Laid-Open Gazettes Nos. 12759/1985 to 12765/1985.
Figure 22B:
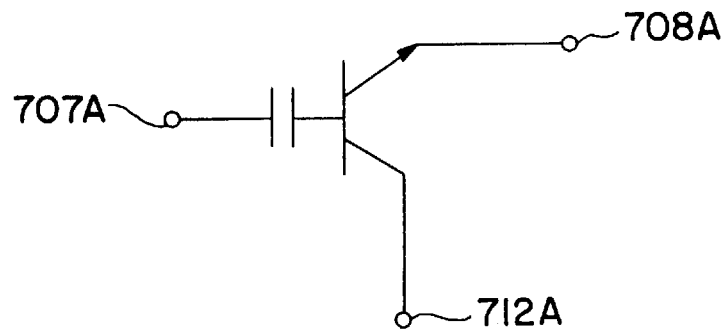
FIG. 22B is an equivalent circuit diagram thereof.

FIG. 22A is a schematic sectional view of a photoelectric transducer cell described in Japanese Patent Laid-Open Gazettes No. 12759/1985 to 12765/1985, and FIG. 22B is an equivalent circuit diagram of the cell.

Referring to FIGS. 22A and 22B, photoelectric transducer cells are formed on an $n^+$-type silicon substrate 701A, and each photoelectric transducer cell is electrically insulated from adjacent photoelectric transducer cells by an element isolation region 702A made of $SiO_2$, $SiH_3N_4$, or polysilicon.

Each photoelectric transducer cell has the following structure.

A p-type region 704A doped with a p-type impurity is formed on an $n^-$-type region 703A formed by an epitaxial technique and having a low impurity concentration. An $n^+$-type region 705A is formed in the p-type region 704A by impurity diffusion or ion implantation. The p-type region 704A and the $n^+$-type region 705A respectively serve as the base and emitter of a bipolar transistor.

An oxide film 706A is formed on the $n^-$-type region 703A, and a capacitor electrode 707A having a predetermined area is formed on the oxide film 706A. The capacitor electrode 707A opposes the p-type region 704A through the oxide film 706A and controls a potential of the p-type region 704A floating upon application of a pulse voltage to the capacitor electrode 707A.

In addition, an emitter electrode 708A is connected to the $n^+$-type region 705A, an $n^+$-type region 711A having a high impurity concentration is formed on the lower surface of the substrate 701A, and a collector electrode 712A is formed to apply a potential to the collector of the bipolar transistor.

The basic operation of the above arrangement will be described. Assume that the p-type region 704A serving as the base of the bipolar transistor is set at a negative potential.

Light 713A is incident from the side of the p-type region 704A. Holes in the electron-hole pairs generated upon radiation are accumulated in the p-type region 714A and the potential at the p-type region 714A is increased by the accumulated holes in the positive direction (charge accumulation).

Subsequently, a positive read voltage is applied to the capacitor electrode 707A, and a read signal corresponding to a change in base potential during charge accumulation is output from the floating emitter electrode 708A (read operation). It should be noted that the amount of accumulated charge is rarely reduced in the p-type region 704A serving as the base of the bipolar transistor, so that read access can be repeated.

In order to remove the holes from the p-type region 704A, the emitter electrode 708A is grounded, and a refresh pulse of a positive voltage is applied to the capacitor electrode 708A. Upon application of the refresh pulse, the p-type region 704A is forward-biased with respect to the $n^+$-type region 705A, thereby removing the holes. When the refresh pulse falls, the p-type region 704A restores the initial state of the negative potential (refresh operation). Charge accumulation, read access, and refreshing are repeated as described above.

In order to restore the initial potential state of the p-type region 704A by refreshing, a refresh pulse having a sufficient pulse width is required. To the contrary, the refresh pulse width must be shortened to achieve high-speed operation. In this case, when the refresh pulse width is short, satisfactory refreshing cannot be performed. Unnecessary components such as a dark signal and drive noise are added to the after image.

Figure 23:
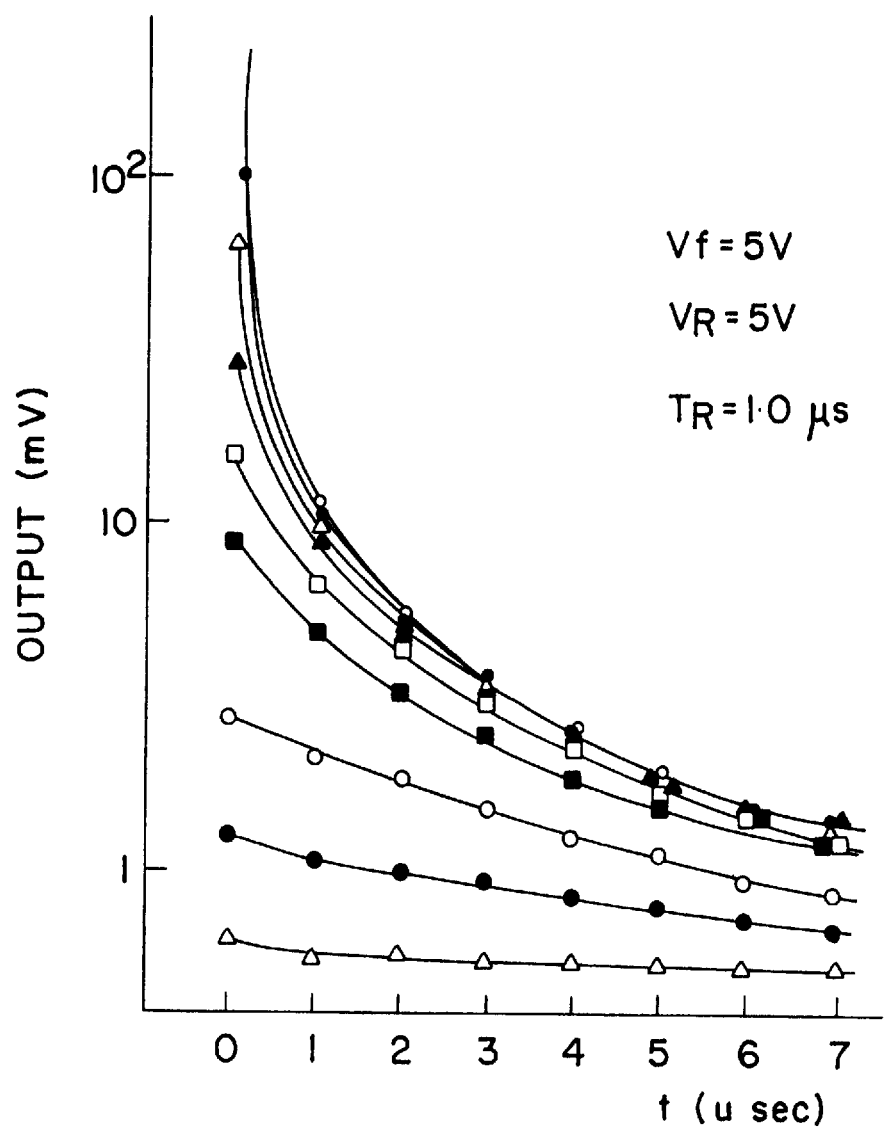
FIG. 23 is a graph showing the relationship between a width t of a refresh pulse applied to the photoelectric transducer cell and a photoelectric transducer cell output after refreshing.

FIG. 23 is a graph showing the relationship between a refresh pulse width t applied to the photoelectric transducer cell and the photoelectric transducer cell output.

Referring to FIG. 23, an output at t=0 is a read signal after charge accumulation and represents a read signal having a level corresponding to the intensity of the incident light.

The output level of such a photoelectric transducer is reduced by refreshing. However, the rate of change in output level and the level of the residual image upon refreshing vary depending on the intensity of the incident light.

When identical refreshing is performed, the levels of the residual signals are not constant. When the intensity of the incident light is high, the level of the residual signal is high. In other words, the after image is typically formed.

The residual signal level of high-intensity incident light is higher than that of low-intensity incident light but is greatly lowered as compared with the initial read signal level. The ratio of the unnecessary components contained in the read signal is substantially low. On the contrary, the residual signal level of the low-intensity incident light is low. A decrease in the residual signal level is small as compared with the initial read signal level. Therefore, the ratio of the unnecessary components included in the read signal is high.

Even in the photoelectric transducer cell having the above characteristics, by subtracting the residual signal obtained upon refreshing from the initial read signal, the above-mentioned specific after image components as well as the unnecessary components such as a dark signal and drive noise can be simultaneously removed.

Another embodiment of the present invention will be described below.

Figure 24:
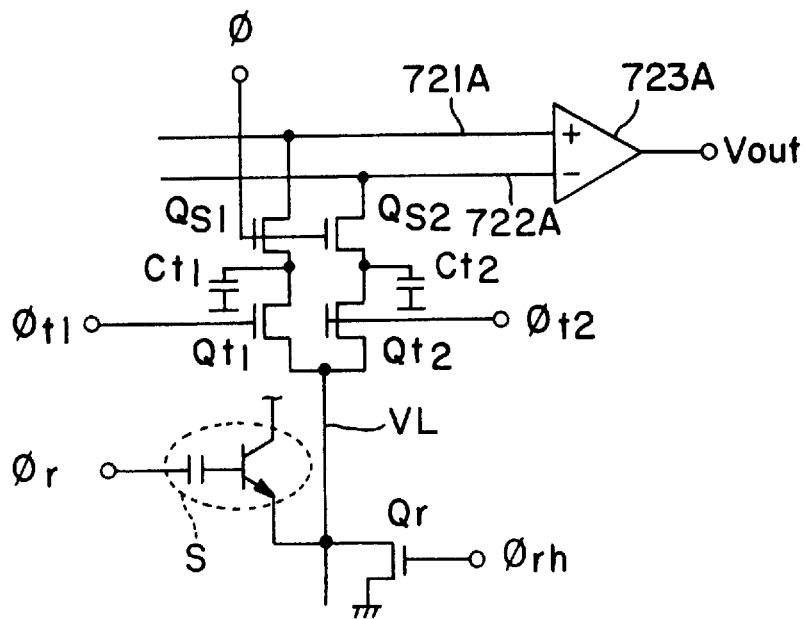
FIG. 24 is a circuit diagram for explaining a basic arrangement of a solid state image pickup apparatus according to still another embodiment of the present invention.

FIG. 24 is a circuit diagram for explaining the basic arrangement of an image pickup element according to another embodiment of the present invention.

Referring to FIG. 24, an emitter electrode 708A of a photoelectric transducer cell S is connected to a vertical line VL and is grounded through a transistor Qr. The vertical line VL is connected to storage capacitors Ct1 and Ct2 through corresponding transistors Qt1 and Qt2. The capacitors Ct1 and Ct2 are connected to output lines 721A and 722A through transistors Qs1 and Qs2, respectively. The output lines 721A and 722A are connected to the input terminals of a differential amplifier 721A, respectively.

A pulse φ from a scanning circuit SH is applied to the gate electrodes of the transistors Qs1 and Qs2. Pulses φt1 and φt2 are applied to the gate electrodes of the transistors Qt1 and Qt2, respectively. A pulse φrh is applied to the gate electrode of the transistor Qr. A read or refresh pulse φr is applied to a capacitor electrode 707A of the photoelectric transducer cell S.

The operation of the above arrangement will be described below.

Figure 25:
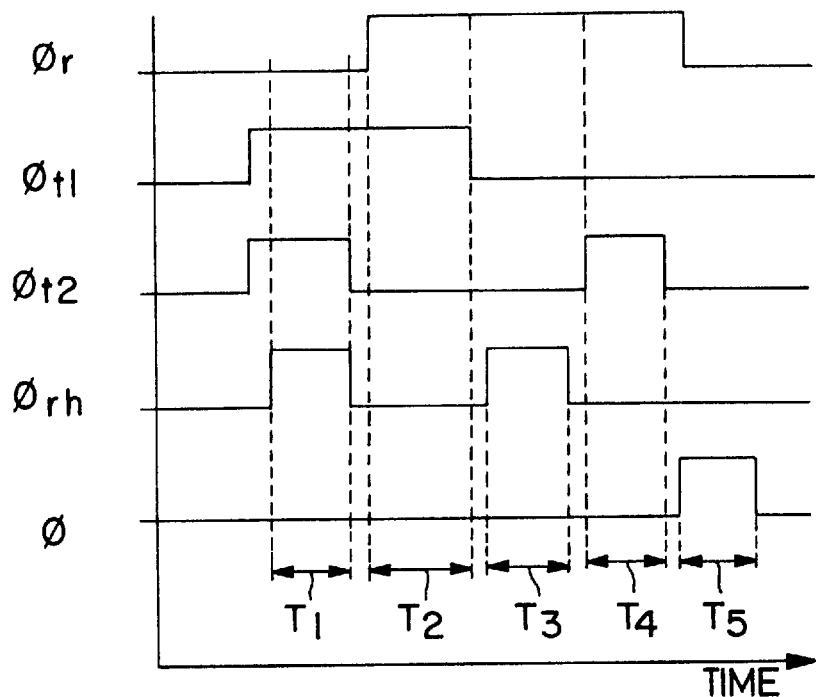
FIG. 25 is a timing chart for explaining the operation of the apparatus shown in FIG. 24.

FIG. 25 is a timing chart for explaining the operation of the circuit shown in FIG. 24.

The transistors Qt1, Qt2, and Qr are turned on in response to the pulses φt1, φt2, and φrh, respectively, to clear the capacitors Ct1 and Ct2 (time interval T1)

Subsequently, the pulse φr is supplied to the capacitor electrode 707A while the transistor Qt1 is kept on. The read signal from the photoelectric transducer cell S is stored in the capacitor Ct1 (time interval T2).

The transistor Qt1 is turned off while the pulse φr is kept applied to the capacitor electrode 707A. The transistor Qr is turned on in response to the pulse φrh. The photoelectric transducer cell S is refreshed in response to the pulse φrh (time interval T3).

Upon completion of refreshing, the transistor Qt2 is turned on in response to the pulse φt2 while the pulse φr is kept applied to the capacitor electrode 7074. The residual signal of the photoelectric transducer cell S is stored in the capacitor Ct2 (time interval T4).

When the read and residual signals are stored in the capacitors Ct1 and Ct2, respectively, the transistors Qs1 and Qs2 are turned on in response to the pulse φ. The read and residual signals are input to the differential amplifier 723A through the corresponding output lines 721A and 722A. A signal Vout proportional to the difference between the read and the residual signals is output from the differential amplifier 723A (time interval T5).

As described above, the signal Vout is a signal free from the after image component and the unnecessary components such as a dark signal and drive noise and accurately corresponds to the intensity of the incident light. In particular, unnecessary component removal on the low-intensity side is effective, and an S/N ratio can be greatly increased.

Figure 26:
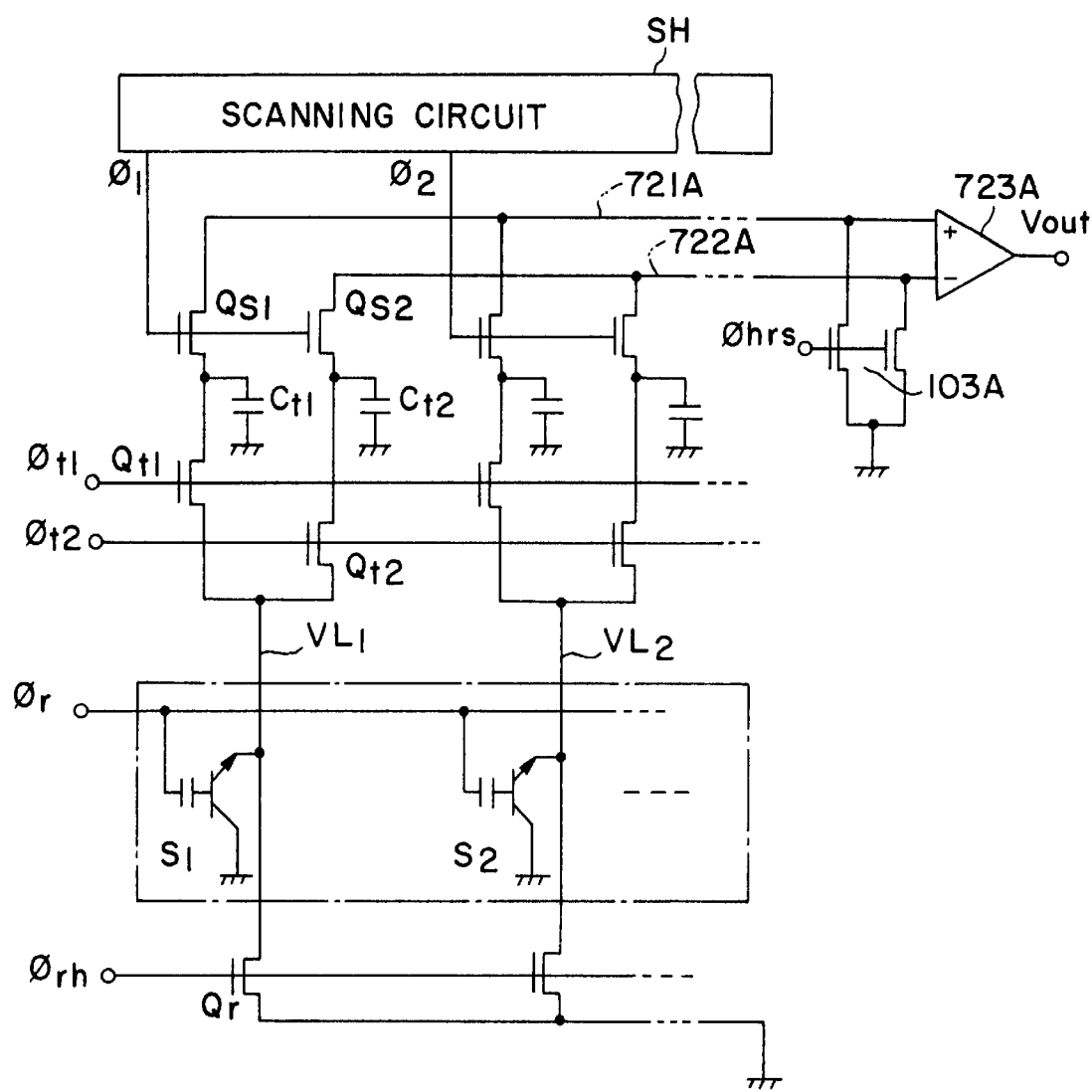
FIG. 26 is a circuit diagram showing the overall arrangement of the apparatus shown in FIG. 24.

FIG. 26 is a circuit diagram of an image pickup system of this embodiment. The circuit in FIG. 26 has n circuits of FIG. 24

Referring to FIG. 26, the emitter electrodes 708A of photoelectric transducer cells S1 to Sn are respectively connected to vertical lines VL1 to VLn. The same circuits as in FIG. 24 are connected to the vertical lines. The gate electrodes of the transistors Qr are commonly connected, and the pulse φrh is applied thereto. The gate electrodes of the transistors Qt1 and the gate electrodes of the transistor Qt2 are also commonly connected, and the pulses φt1 and φt2 are supplied to the common gate electrodes, respectively.

The gate electrodes of the transistors Qs1 and Qs2 corresponding to the photoelectric transducer cells S1 to Sn are connected to the parallel output terminals of the scanning circuit SH and receive the pulses φ1 to φn, respectively. The transistors Qs1 are commonly connected to the output line 721A and the transistors Qs2 are commonly connected to the output line 722A. These output lines are grounded through corresponding transistors 103A. A reset pulse φhrs is supplied to the gate electrodes of the transistors 103A.

A mode of operation of the arrangement described above will be briefly described with reference to FIG. 27A.

FIG. 27 is a timing chart for explaining the operation of the above arrangement.

As already described above; the capacitors Ct1 and Ct2 corresponding to each photoelectric transducer cell are cleared during the time interval T1. During the time interval T2, the read signal from each photoelectric transducer cell is stored in the corresponding capacitor Ct1. During the time interval T3, each photoelectric transducer cell is refreshed. During the time interval T4, the residual signal of each refreshed photoelectric transducer cell is stored in the corresponding capacitor Ct2.

After the read and residual signals of each photoelectric transducer cell are accumulated in the manner described above, the pulse φ1 from the scanning circuit SH is supplied to the gate electrodes of the transistors Qs1 and Qs2. The read and residual signals stored in the capacitors Ct1 and Ct2 of the photoelectric transducer cell S1 are read out and appear on the output lines 721A and 722A. A difference between these signals is calculated by the differential amplifier 723A, thereby removing the unnecessary components and hence obtaining the output signal Vout.

When a signal is output from the photoelectric transducer cell S1, the transistor 103A is turned on in response to the pulse φhrs, and the charges left on the output lines 721A and 722A are removed.

In the same manner as described above, the read and residual signals of the photoelectric transducer cells S2 to Sn are output from the capacitors Ct1 and Ct2 and appear on the output lines 721A and 722A and are subjected to subtractions by the differential amplifier 723A, thereby sequentially outputting signals Vout.

Figure 27B:
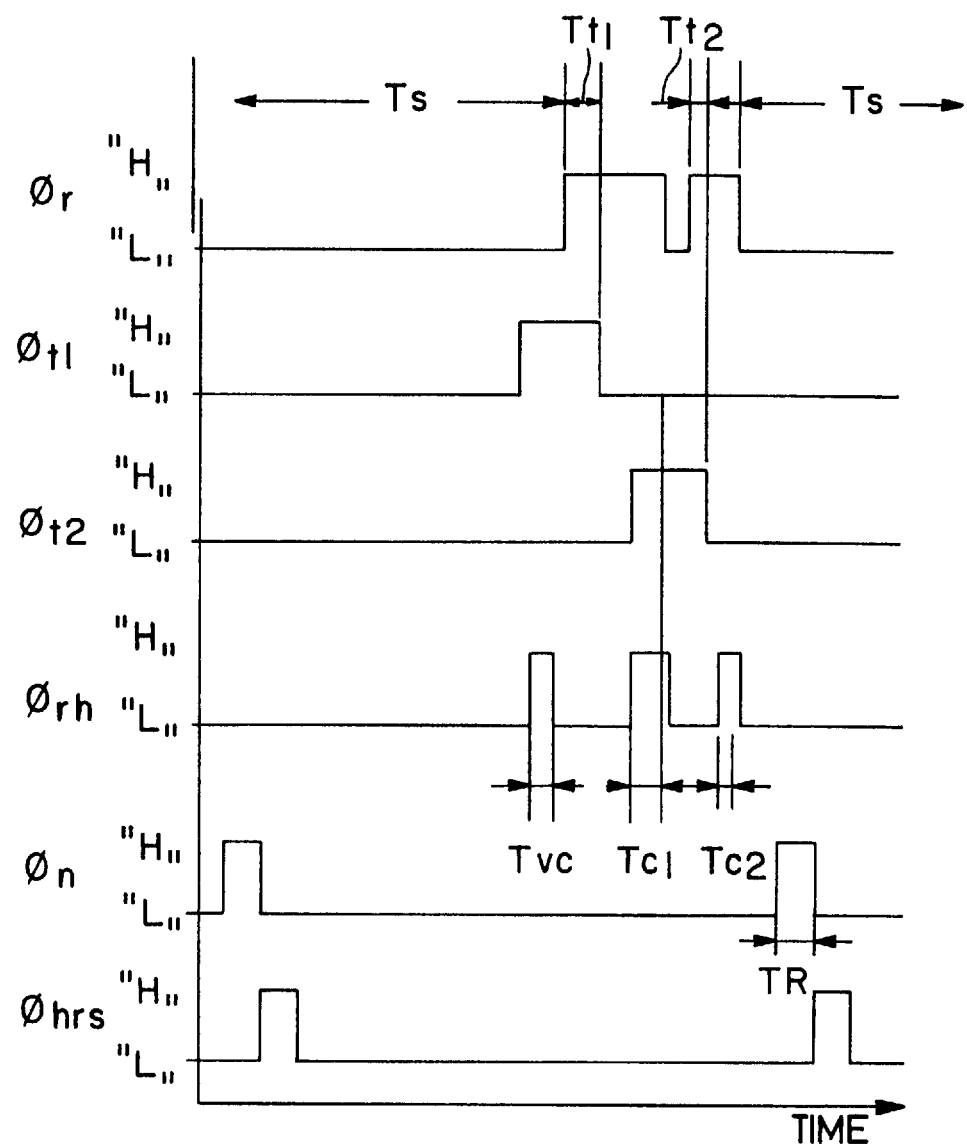

FIG. 27B shows another mode of operation of the above arrangement.

During a time interval Ts, the base electrodes of the cells S are reverse-biased to perform charge accumulation. Upon completion of charge accumulation, unnecessary charges on the vertical transfer line VL and the storage capacitor Ct1 are removed before the photoelectric transducer signals are transferred to the storage capacitor Ct1 within a time interval Tvc.

Refreshing is performed again during a time interval Tc1, and drive noise is transferred to the storage capacitor Ct2 during a time interval Tt2. Thereafter, the cell S is refreshed during a time interval Tc2, and the next charge accumulation cycle is initiated. The photoelectric transducer signal and drive noise which are stored in the storage capacitors Ct1 and Ct2 are output onto horizontal signal lines 721A and 722A, respectively.

In the above embodiment, the sensor shown in FIGS. 22A and 22B is exemplified. However, the present invention is not limited to any specific scheme of the photosensor.

The present invention can be applied to a color image pickup apparatus of a scheme for processing a plurality of horizontal line signals.

Figure 28:
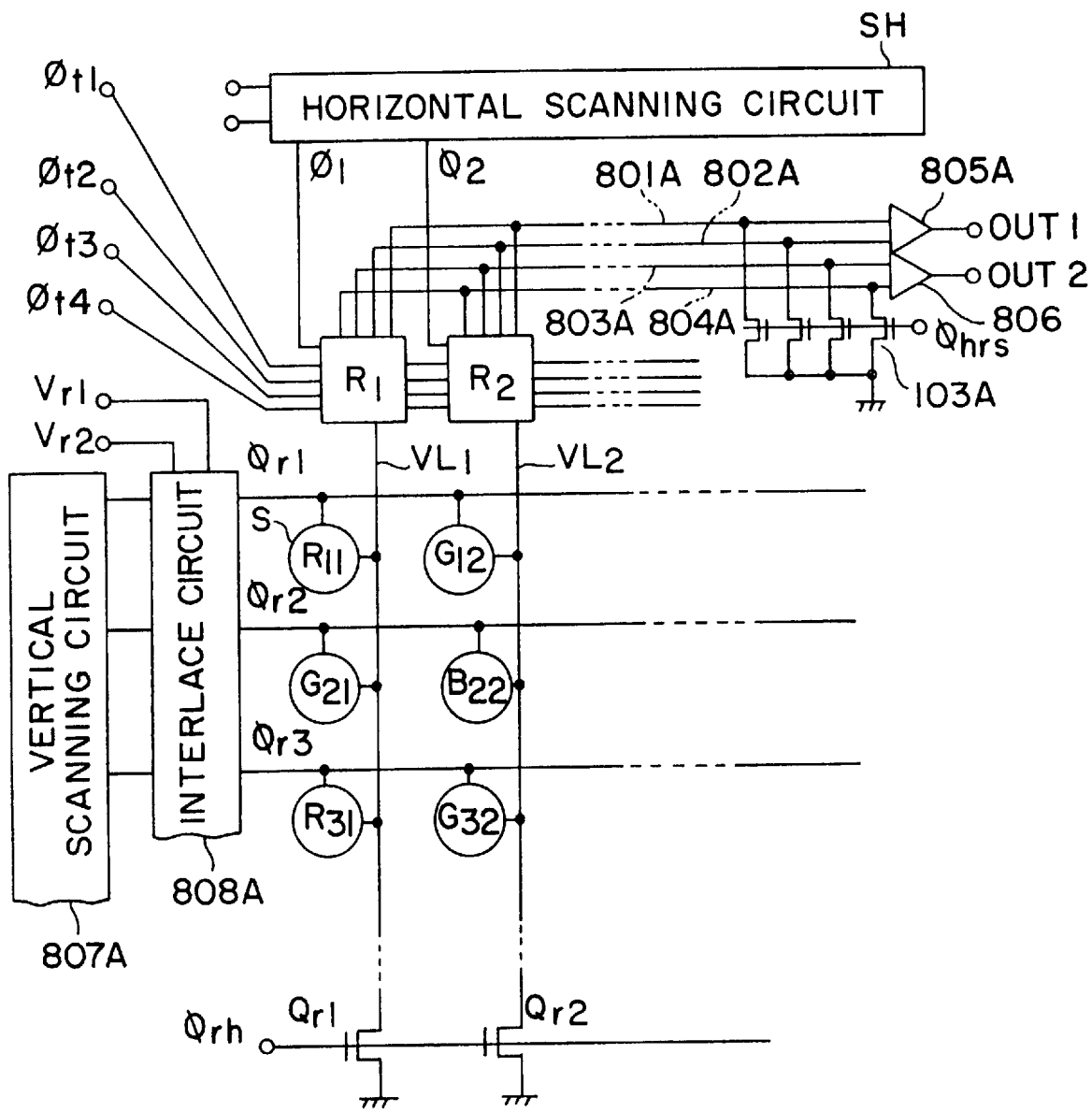
FIG. 28 is a circuit diagram of a solid state image pickup apparatus according to still another embodiment of the present invention.
Figure 29:
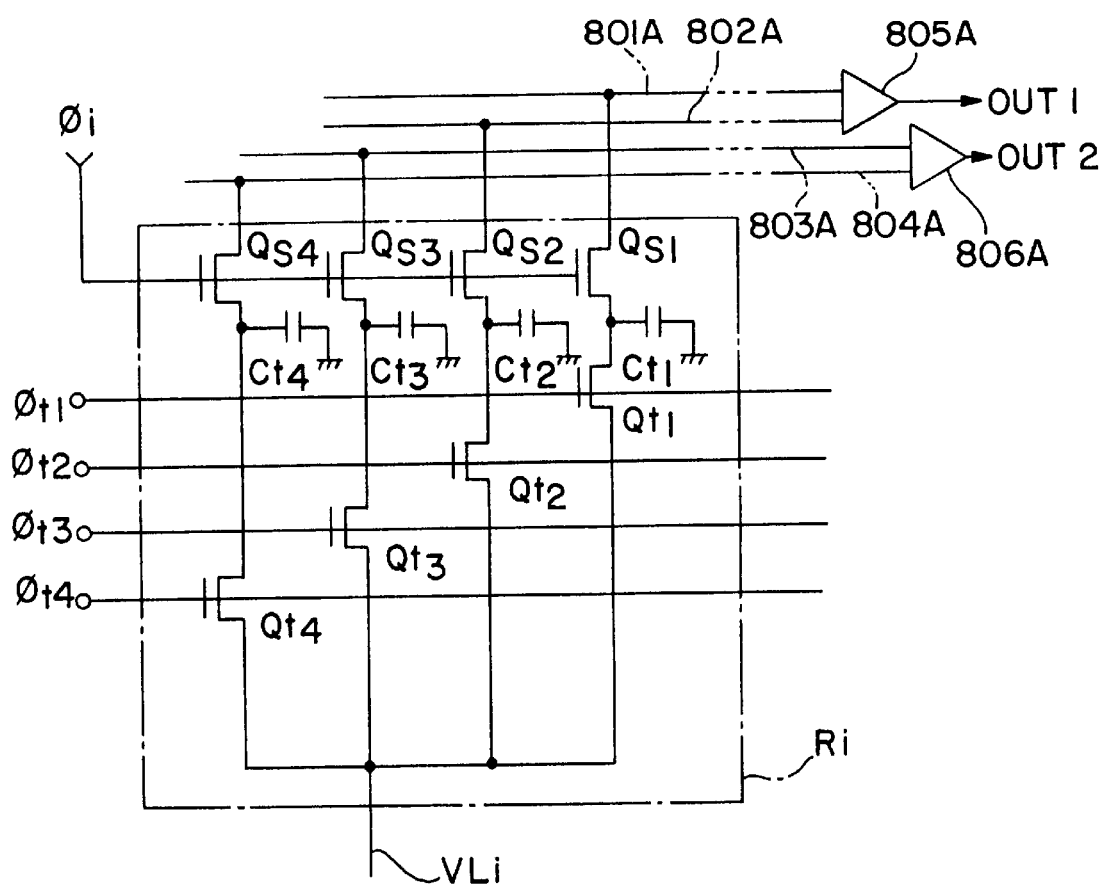
FIG. 29 is a detailed circuit diagram of a is readout circuit Ri in the apparatus shown in FIG. 28.

FIG. 28 is a circuit diagram of a third embodiment of the present invention, and FIG. 29 is a detailed circuit diagram of a readout circuit Ri in this embodiment. This embodiment exemplifies a scheme for processing a signal of two horizontal lines. This can apply to any scheme for processing a signal of three or more horizontal lines.

Referring to FIG. 28, photosensors S are arranged in an m×n area. Mosaic R, G. and B filters are arranged on the sensor surface.

Column photosensor outputs are respectively output to the readout circuits R1 to Rn through vertical lines VL1 to VLn.

Referring to FIG. 29, in any readout circuit Ri (i=1, 2, . . . n), the vertical lines VLi are connected to storage capacitors Ct1 to Ct4 through transistors Qt1 to Qt4, and the capacitors Ct1 to Ct4 are connected to output lines 801A to 804A through transistors Qs1 to Qs4, respectively. Since the scheme for processing a signal of two horizontal lines is used, two capacitors for storing the read signals and two other capacitors for storing residual signals are formed.

The gate electrodes of the transistors Qt1 to Qt4 are cormmonly connected through corresponding readout circuits R1 to R4. Pulses φ to φt/to φt4 are supplied to the gate circuits of the transistors Qt1 to Qt4.

A pulse hi from a horizontal scanning circuit SH is supplied to the transistors Qs1 to Qs4 of the readout circuit Ri. The transistors Qs1 to Qs4 are simultaneously turned on/off.

The output lines 801A and 802A are connected to the input terminals of a differential amplifier 805A, and the output lines 803A and 804A are connected to the input terminals of a differential amplifier 806. Signals OUT1 and OUT2 are output from the differential amplifiers 805A and 806A, respectively.

Two lines per field are selected by a vertical scanning circuit 807A and an interlace circuit 808A (FIG. 28) Pairs of two horizontal scanning lines in units of fields are selected in response to pulses Vr1 and Vr2.

The operation of the above circuit will be described with reference to FIG. 30.

Figure 30:
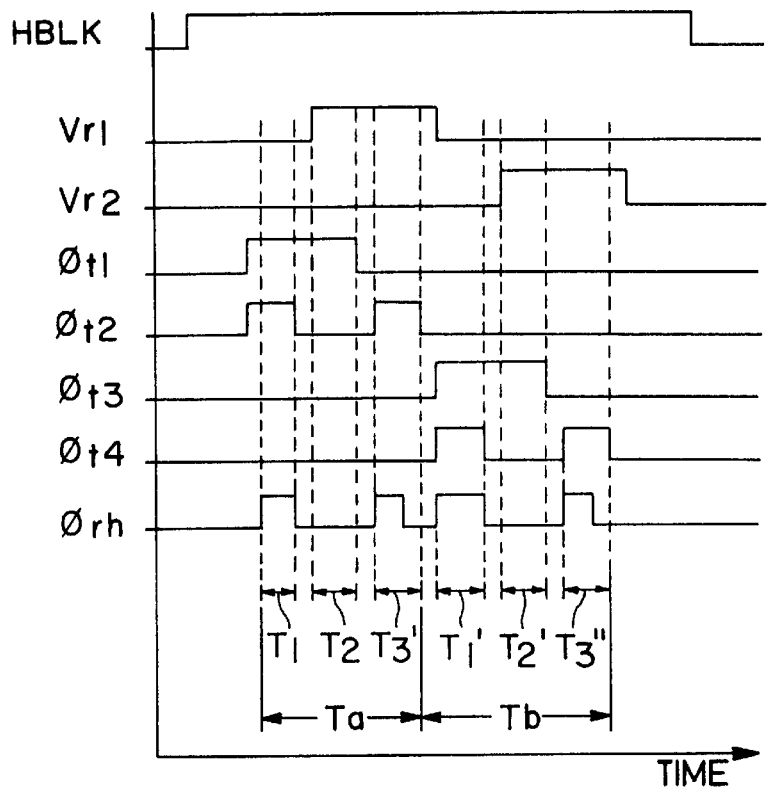
FIG. 30 is a timing chart for explaining the operation of the apparatus shown in FIG. 28.

FIG. 30 is a timing chart for explaining the operation of the above circuit.

Each photosensor read signal and its residual signal for two horizontal lines are read out during a horizontal blanking (HBLX) period and are stored in the storage capacitors in the readout circuits Rl to Rn. Transfer of one of the two horizontal lines is performed during a time interval Ta in response to the pulse Vr1. Transfer of the remaining horizontal line is performed during a time interval Tb in response to the pulse Vr2.

The transfer operations are substantially the same as those in FIG. 26, However, since transfer is performed during the HBLK period, the transfer time can be shortened as compared with a scheme for processing a signal of one horizontal line. Clearing of the residual signal storage capacitor and its charge accumulation are performed during substantially equal time intervals T3' and T3". Smear generated during signal transfer is proportional to the transfer time. In this sense, T2 (T2') and T3' (T3") are shortened to suppress the smearing phenomenon.

The capacitors Ct1 and Ct2 are cleared within a time interval T1 in the time interval Ta. During a time interval T2, a pulse φr1 is supplied to the first horizontal line in response to the pulse Vr1, and read signals of the photosensors on the first horizontal line are stored in the capacitors Ct1 in the readout circuits R1 to Rn. Subsequently, during a time interval T3', the photosensors of the first horizontal line are refreshed, and the residual signals upon completion of refreshing are stored in the capacitors Ct2.

During the next time interval Tb, the same transfer as in the first horizontal line is performed for the second horizontal line in response to the pulse φr2 generated in response to the pulse Vr2. The read and residual signal of each photosensor for the second horizontal line are respectively stored in the capacitors Ct3 and Ct4.

When the read and residual signals of the first and second horizontal lines are stored in the capacitors Ct1 to Ct4 of the readout circuits R1 to Rn, the pulses φ1 to φn from the horizontal scanning circuit SH are sequentially output to the readout circuits R1 to Rn, so that an R- and G-dot sequential signal OUT1 and a G- and B-dot sequential signal OUT2 which are free from the unnecessary components are output from the differential amplifiers 805A and 806A, respectively. It should be noted that the signal OUT1 is a G- and B-dot sequential signal and the signal OUT2 is an R- and G-dot sequential signal in the next field.

Figure 31:
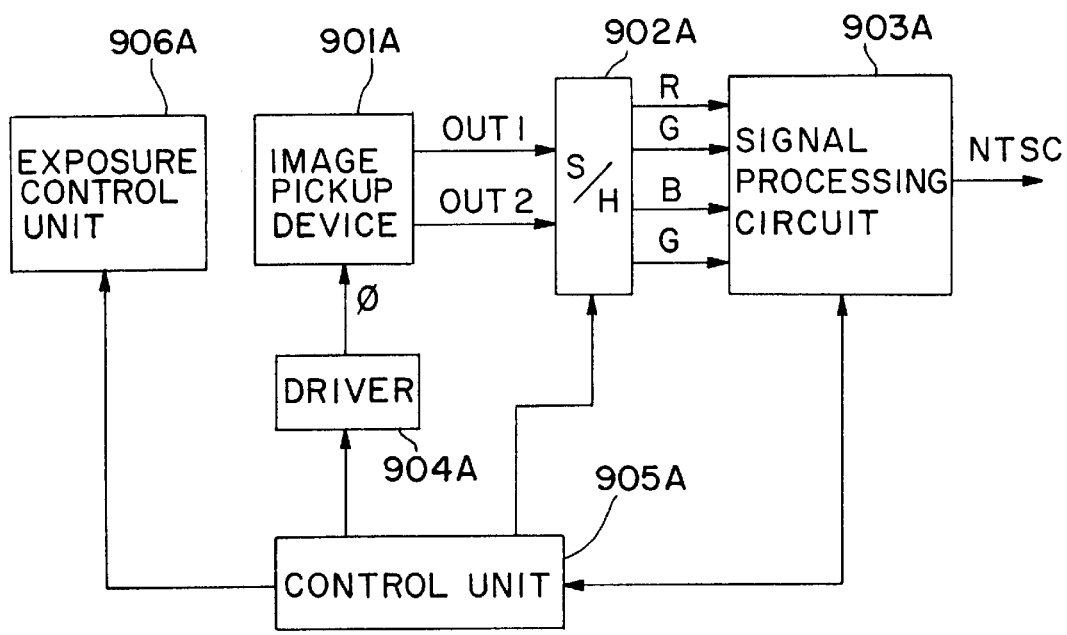
FIG. 31 is a block diagram showing an image pickup system using the apparatus (FIG. 24) as an image pickup device.

FIG. 31 is a schematic block diagram of an image pickup system using the solid state image pickup apparatus as an image pickup device.

An image pickup device 901A comprises an image pickup apparatus shown in FIGS. 28 and 29. The output signals OUT1 and OUT2 from the image pickup device 901A are processed by an image processing circuit 903A through a sample/hold (S/H) circuit 902A to produce a standard television signal such as an NTSC signal.

Pulses for driving the image pickup device 901A are supplied from a driver 904A. The driver 904A is controlled by a control unit 905A. The control unit 905A also controls an exposure control unit 906A to determine an intensity of light incident on the image pickup device 901A.

According to the image pickup apparatus according to this further embodiment of the present invention, as described above, the residual signal is subtracted from the read signal of the photoelectric transducer cell upon its refreshing to remove the unnecessary components (e.g., a dark signal and drive noise) of the photoelectric transducer element, thereby obtaining a video signal having a high S/N ratio. As a result, a low-cost, compact image pickup apparatus can be manufactured.

Figure 32:
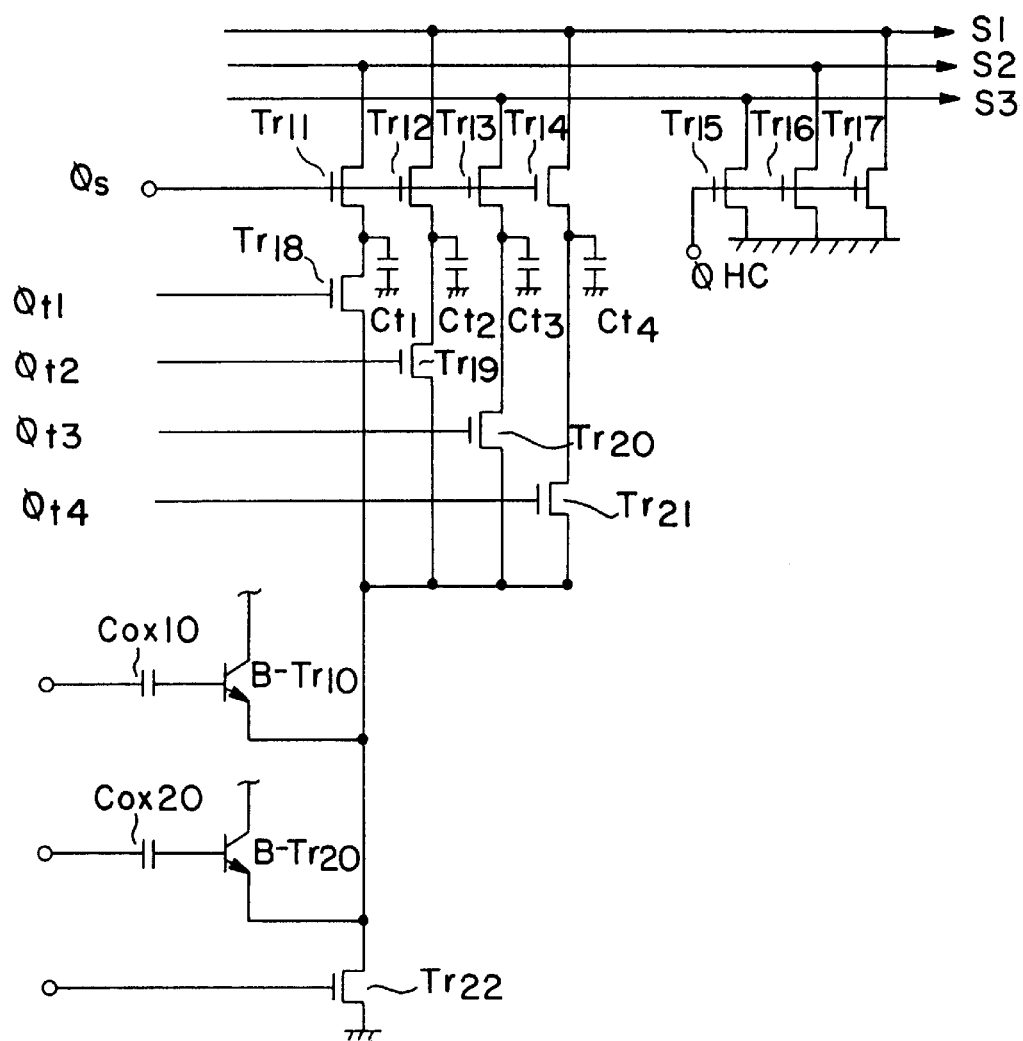
FIG. 32 is a circuit diagram showing an image pickup apparatus according to still another embodiment of the present invention.

FIG. 32 is a schematic view of an area sensor for simultaneously reading out signals of two horizontal lines. This circuit includes switching transistors Tr11 to Tr22, bipolar transistors B-Tr10 and B-Tr20, and capacitors Cox10 and Cox20. In this sensor, a photoelectric transducer signal and drive noise of the bipolar transistor B-Tr10 are respectively stored in the capacitors Ct1 and Ct2. A photoelectric transducer signal and drive noise of the bipolar transistor B-Tr20 are respectively stored in the capacitors Ct3 and Ct4. When these signals are to be read out, the photoelectric transducer signals are simultaneously and independently read out onto horizontal signal lines S2 and S3, and drive noise components are simultaneously output onto the horizontal signal line S1. Therefore, the drive noise components are output as a sum signal. R and G filters in an order of R, G. R, G, . . . are formed on photoelectric transducer elements of the even-numbered rows, and G and B filters in an order of G, B, G, B, . . . are arranged on photoelectric transducer elements of the odd-numbered rows.

Figure 33:
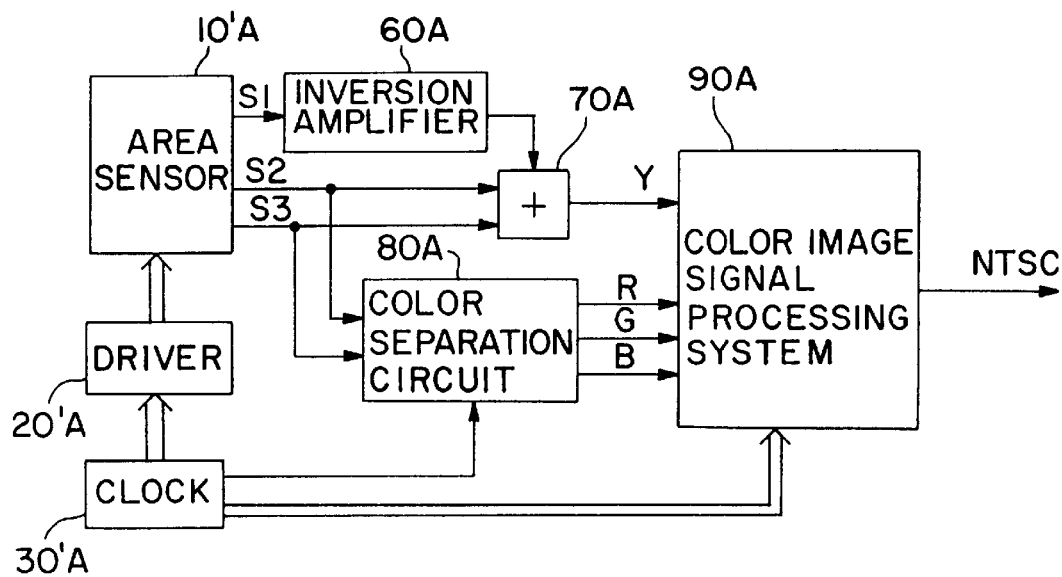
FIG. 33 is a block diagram showing an image pickup system using the image pickup apparatus (FIG. 32) as an area sensor.

FIG. 33 shows an image pickup system using the area sensor shown in FIG. 32.

The image pickup system includes an inversion amplifier 60A an adder 70A, color separation circuit 80A, a color image signal processing system 90A, an area sensor 10'A, a driver 20'A, and a clock generator 30'A.

Photoelectric transducer signals S2 and S3 read out from the area sensor 10'A are input to the adder 70A and are averaged, thereby obtaining a signal in the form of R+2G+B. The drive noise is inverted by the inversion amplifier 60A, and the inverted signal is input to the adder 70A. The adder 70A subtracts the drive noise from the photoelectric transducer signal, thereby producing a luminance signal Y consisting of only an information signal.

The color separation circuit 80A receives the photoelectric transducer signals S1 and S2 and separates them into chrominance signals R, G, and B. The resultant signals Y, R, G, and B are processed by the color image signal processing system 90A. The processing system 90A generates a standard television signal such as an NTSC signal.

In the above embodiment, the scheme for simultaneously reading out signals of two horizontal lines is used. However, the present invention is applicable to a scheme for simultaneously reading out signals of three horizontal signals.

The storage capacitors can be omitted if the image pickup apparatus includes a shutter.

A subtracter for removing the drive noise may be connected to the output terminal within the apparatus.

In the above embodiment, the drive noise can be output independently of the photoelectric transducer signal, so that an external large-capacity memory need not be arranged.

In the horizontal line readout scheme, since the noise components can be added and its sum can be output, the number of horizontal signal lines can be reduced. Therefore, a multi-horizontal line readout scheme can be easily achieved.

Figure 34:
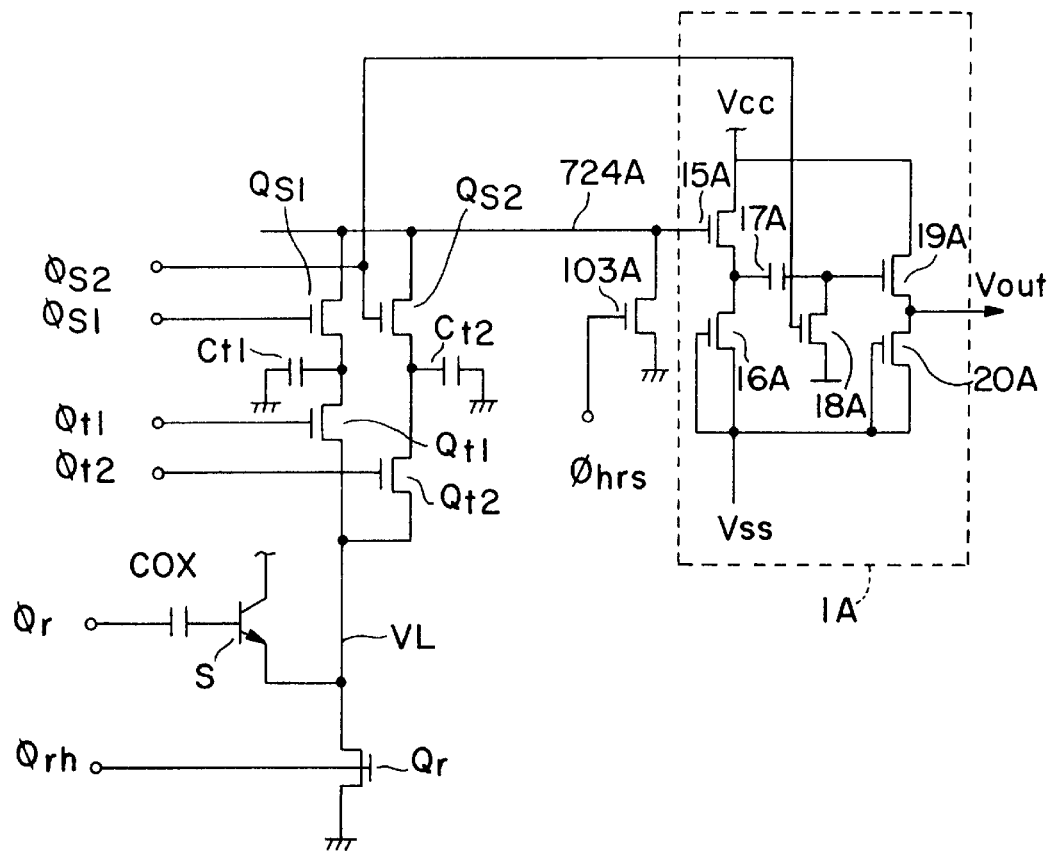
FIG. 34 is a circuit diagram of a solid state image pickup apparatus according to still another embodiment of the present invention.

FIG. 34 shows still another embodiment of the present invention. In this embodiment, the differential amplifier 723A in FIG. 24 is replaced with a clamp circuit. The same reference numerals as in FIGS. 15 to 33 denote the same parts in FIG. 34.

Figure 35:
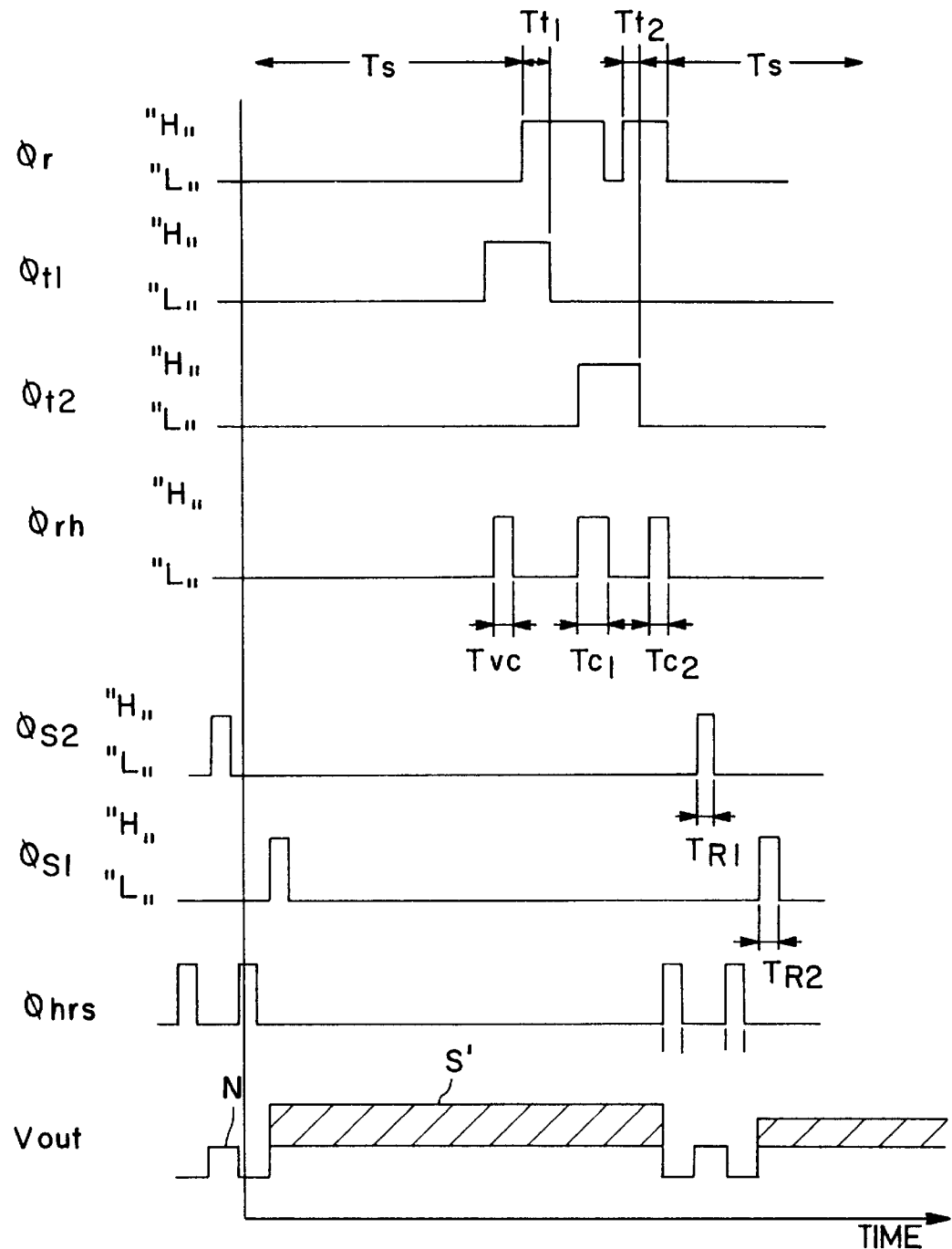
FIG. 35 is a timing chart for explaining the operation of the apparatus shown in FIG. 34.

FIG. 35 is a timing chart for explaining the operation of the circuit shown in FIG. 34.

Cells S are reverse-biased to perform charge accumulation during a time interval Ts. Upon completion of charge accumulation, the unnecessary charges on the vertical transfer lines VL and in the storage capacitors Ct1 are removed prior to transfer of photoelectric transducer signals within a time interval Tvc. The photoelectric transducer signal is transferred to a corresponding storage capacitor Ct1 during the time interval Tt1.

Refreshing is performed during a time interval Tc1, and drive noise is transferred to the storage capacitor Ct2 during a time interval Tc2. Thereafter, the cells S are refreshed during a time interval of Tc2, and the next charge accumulation cycle is initiated. The photoelectric transducer signals and the drive noise are independently obtained. The signals stored in the storage capacitors Ct1 and Ct2 are dot-sequentially transferred on a single signal line S in response to drive pulses φs1 and φs2. This operation occurs during time intervals TR1 and TR2. A drive pulse φhrs is used to reset the signal line to the reference potential. The signal obtained by the above-mentioned read operation represents a waveform of an output Vout. The drive noise and the photoelectric transducer signal are represented by W and S', respectively.

The dot sequential signal S is input to a clamp circuit 1A, and only the drive noise N is clamped in accordance with a drive pulse φs2. As a result, the drive noise N is eliminated, and a true information signal indicated by a hatched portion in FIG. 35 can be obtained.

Figure 36:
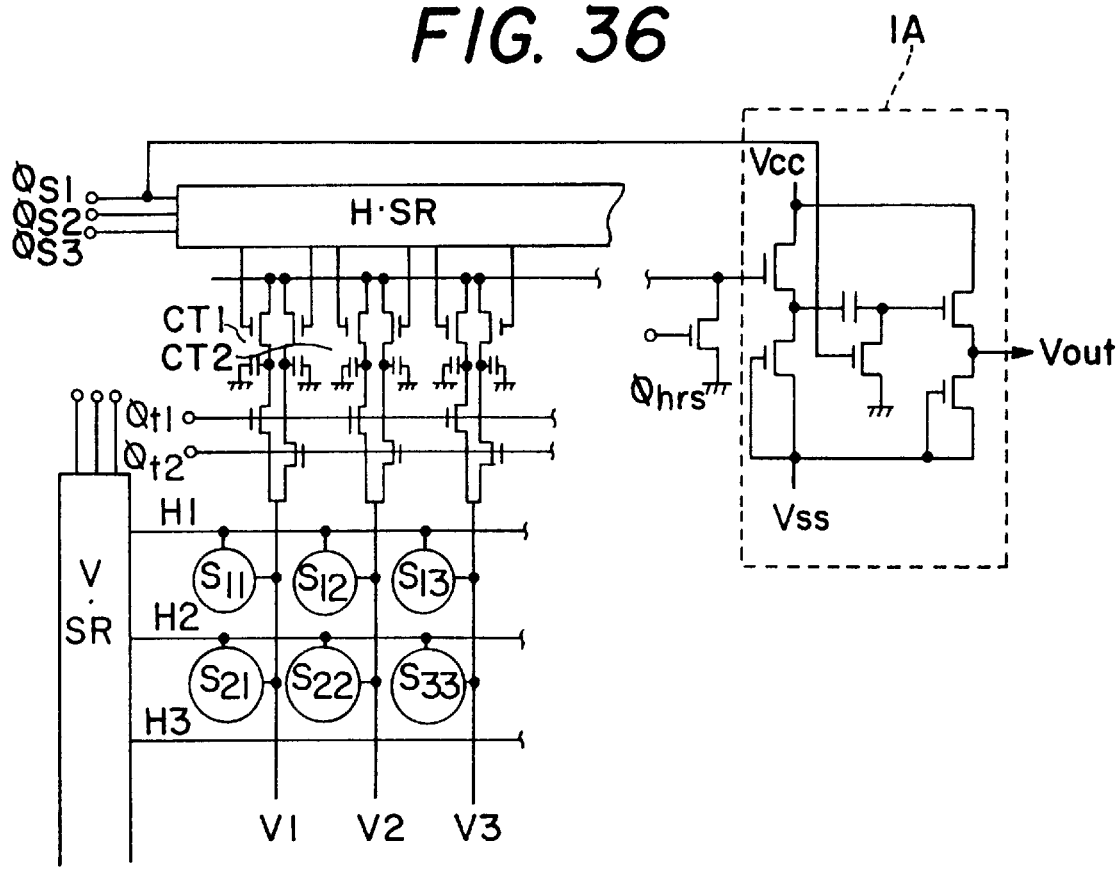
FIG. 36 is a schematic view showing an arrangement when the apparatus in FIG. 34 is applied to an area sensor.

FIG. 36 is a schematic circuit diagram of an area sensor constituted by the photoelectric transducer elements shown in FIG. 34. Referring to FIG. 36, the area sensor includes a vertical shift register V·SR, a horizontal shift register H·SR, and Smn, base accumulation type transistors arranged in an m×n matrix. The operation of the area sensor is basically the same as that of the photoelectric transducer element shown in FIG. 34, except that the area sensor performs horizontal scanning and vertical scanning, and a detailed description thereof will be omitted. Clamping of the read signal, which is the characteristic feature of this embodiment shown in FIG. 36, will be described in detail.

Figure 37:
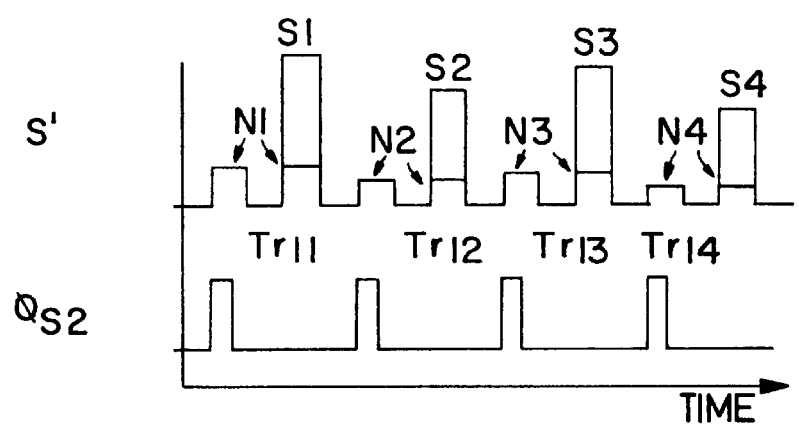
FIG. 37 is a timing chart for explaining the operation of the area sensor shown in FIG. 36.

A schematic waveform of the read signal is shown in FIG. 37. A signal S' appears on a read signal line S, and a pulse φs2 is a drive pulse. Referring to FIG. 37, drive noise and the photoelectric signal of a cell S11 correspond to N1 and S1, respectively. A cell S12 outputs signals N2 and S2, a cell S13 outputs signals N3 and S3, a cell S14 outputs signals N4 and S4, . . . The drive noise component of the dot sequential signal is clamped in response to the drive pulse φs2. As a result, the drive noise is removed, and only the true information signal can be obtained.

The above embodiment exemplifies a scheme for reading out a signal of one horizontal line. However, this embodiment may be applied to a scheme for reading out a signal of one horizontal line in a time-divisional manner or a scheme for simultaneously reading signals of a plurality of horizontal lines, as shown in FIG. 28.

The base accumulation type transistor is exemplified as the photoelectric transducer element. However, a MOS or SIT image pickup device may be used as the photoelectric transducer element.

In the above embodiment, the drive noise and the photoelectric tansducer signal are converted into a dot sequential signal, and clamping can be easily performed, thereby easily removing the drive noise.

What is claimed is:

1. A photoelectric transducer apparatus comprising:

a plurality of photoelectric transducer cells;

signal readout lines for reading out signals from said plurality of photoelectric transducer cells;

first and second switch means;

a plurality of first capacitors, each connected to one of said signal readout lines through said first switch means, for selectively storing first signals read out through said signal readout lines and said first switch means after a predetermined accumulation period;

a plurality of second capacitors, each connected to one of said signal readout lines through said second switch means, for selectively storing second signals corresponding to dark current signals readout through said signal readout lines and said second switch means; and output means for cancelling dark current signals included in the first signals by subtracting each second signal from a corresponding first signal, and for outputting the first signals from which the dark current signals are cancelled.

2. An apparatus according to claim 1, further comprising selecting means for selectively reading out signals of each of said first and second capacitors.

3. An apparatus according to claim 1, wherein said first capacitors comprise a plurality of capacitors for each photoelectric transducer cell.

4. An apparatus according to claim 1, wherein said dark current cancelling means comprises a differential amplifier.

5. Apparatus according to claim 1, wherein said dark signal includes a noise signal read out immediately after refreshing said photoelectric transducer cells.

6. Apparatus according to claim 1, wherein said dark signal includes a noise signal formed while said photoelectric transducer cells are shielded from light.

7. A photoelectric transducer apparatus having a plurality of photoelectric transducer elements each having a control electrode of a corresponding semiconductor transistor, said apparatus being adapted to sequentially select each element in units of lines, to control a potential of said control electrode of the selected photoelectric transducer element, to store charges in the control electrode region, and to read out a signal component corresponding to the amount of charge stored in each element, comprising:

first and second switch means;

optical information storing means for storing optical information read out from the plurality of photoelectric transducer elements through said first switch means; and dark current information storing means for storing information from the plurality of photoelectric transducer elements through said second switch means, wherein actual optical information stored in said optical information storing means has subtracted therefrom dark current information stored in said dark current information storing means to cancel the dark current information included in said optical information, for each one of the plurality of transducer elements.

8. An apparatus according to claim 7, further including information output lines, and subtracting means for determining the signals to be output on said information output lines.

9. An apparatus according to claim 8, wherein said subtracting means includes a differential amplifier.

10. Apparatus according to claim 7, wherein said dark current information includes a noise signal read out immediately after refreshing said photoelectric transducer elements.

11. Apparatus according to claim 7, wherein said dark current information includes a noise signal formed while said photoelectric transducer elements are shielded from light.

12. A photoelectric transducer apparatus for outputting readout signals which have been formed in a plurality of photoelectric transducer elements and supplied to a corresponding plurality of storing capacitors through first terminals of the storing capacitors, an output line being coupled to the first terminals of the storing capacitors, comprising:

biasing structure for applying a bias voltage to second terminals of each of said storing capacitors to boost a signal level on the output line while said readout signals are output from said storing capacitors to the output line.

13. An apparatus according to claim 12, further comprising an amplifier connected to said storing capacitors, wherein a reset potential of an input terminal of said amplifier is set to be substantially equal to a bias potential of said storing capacitors.

14. An apparatus according to claim 12, wherein said readout signals of said elements can be non-destructively readout.

15. An image pickup apparatus comprising:

(a) a plurality of photoelectric transducer elements for converting incident light into electrical signals, said photoelectric transducer elements each including an amplifier for amplifying the electric signals;

(b) control means having a first mode for reading out a first signal corresponding to the light incident on said photoelectric transducer elements and a noise signal, and a second mode for reading out only a second signal corresponding to the noise signal, said first and second signals being read out in the same manner from the same photoelectric transducer elements, respectively;

(c) first and second switch means, each connected to an output of said plurality of transducer elements;

(d) first storage means for storing said first signal through said first switch means; and (e) second storage means for storing said second signal through said second switch means.

16. An image pickup apparatus according to claim 15, wherein said second signal is obtained after said first signal is read out by said control means.

17. An image pickup apparatus according to claim 15, wherein said first and second storage means each includes a capacitor.

18. An image pickup apparatus according to claim 15, further comprising operating means for mutually processing signals stored in said first and second storage means.

19. An image pickup apparatus according to claim 18, wherein said operating means includes subtracting means.

20. An image pickup apparatus according to claim 15, wherein said noise signal is caused by fluctuation of each photoelectric transducer element.

21. An image pickup apparatus according to claim 15, wherein said control means resets the photoelectric transducer elements between said first mode and said second mode.

22. Apparatus according to claim 15, wherein said noise signals are read out immediately after refreshing said photoelectric transducer elements.

23. Apparatus according to claim 15, wherein said noise signals are formed while said photoelectric transducer elements are shielded from light.

* * * * *

UNITED STATES PATENT AND TRADEMARK OFFICE
CERTIFICATE OF CORRECTION

PATENT NO. : 5,771,070

DATED : June 23, 1998

INVENTOR(S) : HAYAO OHZU, ET AL.

Page 1 of 6

It is certified that error appears in the above-identified patent and that said Letters Patent is hereby corrected as shown below:

Column 1

Line 5, "This application is" should read --This application is a continuation of Application Ser. No. 237,046, filed June 15, 1994, which is --.
    Line 44, "genorated within the photoscensor" should read --generated within the photosensor--.
    Line 67, "strong," should read --strong--.

Column 2

Line 9, "imade" should read --image--.
    Line 11, "As" should read --is--.
    Line 17, "after image" should read --afterimage--.
    Line 25, "recurred" should read --required--.
    Line 35, "diagrair" should read --diagram--.
    Line 38, "and" should red --to--.
    Line 62, "elementsiso-" should read --element iso- --.

Column 3

Line 15, "is" should be deleted.
    Line 35, "rh" should read --$\phi$rh--

Column 4

Line 12, "of that" should be deleted.
    Line 60, "provide" should read --provided--.

UNITED STATES PATENT AND TRADEMARK OFFICE
CERTIFICATE OF CORRECTION

PATENT NO.   : 5,771,070
DATED        : June 23, 1998
INVENTOR(S)  : HAYAO OHZU, ET AL.

It is certified that error appears in the above-identified patent and that said Letters Patent is hereby corrected as shown below:

Column 5

```
    Line 25, "after image" should read --afterimage--.
    Line 38, "for," should read --for--.
    Line 45, "after image" should read --afterimage--.
    Line 56, "output" should read --out--.
    Line 63, "degradinc" should read --degrading--.
```

Column 8

```
    Line 44, "12765/1985." should read --12765/1985;--.
```

Column 9

```
    Line 17, "appliecd" should read --applied--.
```

UNITED STATES PATENT AND TRADEMARK OFFICE
CERTIFICATE OF CORRECTION

PATENT NO. : 5,771,070
DATED : June 23, 1998
INVENTOR(S) : HAYAO OHZU, ET AL.

It is certified that error appears in the above-identified patent and that said Letters Patent is hereby corrected as shown below:

Column 11

Line 44, "refrest" should read --refresh--.
       Line 49, "ecual" should read --equal--.
       Line 53, "cepacitors" should read -capacitors--.
       Line 65, "EO" should read --E0--.

Column 13

Line 18, "embocdment" should read --embodiment--.
       Line 21, "photoelectroc" should read --photoelectric--.
       Line 25, "photos-ensor" should read --photosensor--.
       Line 36, "$\phi T1$" should read --$\phi F$--.

Column 14

Line 9, "36-1', 36-1'," should read --36-1', 36-1"--.
       Line 40, "lihes" should read --lines--.
       Line 55, "Tne" should read --The--.

Column 17

Line 5, "after image" should read --afterimage--.
       Line 29, "voltace" should read --voltage--.

UNITED STATES PATENT AND TRADEMARK OFFICE
CERTIFICATE OF CORRECTION

PATENT NO. : 5,771,070
DATED : June 23, 1998
INVENTOR(S) : HAYAO OHZU, ET AL.

It is certified that error appears in the above-identified patent and that said Letters Patent is hereby corrected as shown below:

Column 21

Line 34, ",$\phi$t1" should read --$\phi$t1--.

Column 22

Line 41, "Qf1" should read --QF1--.

Column 23

Line 30, "Qf1" should read --QF1--.

Column 25

Line 31, "after" should read --afterimage.--
Line 32, "image." should be deleted.
Line 46, "after image" should read --afterimage--.
Line 59, "after image" should read --afterimage--.

Column 26

Line 35, "$\phi$t2while" should read --$\phi$t2 while--.
Line 48, "after image" should read --afterimage--.

Column 27

Line 12, "above;" should read --above,--.

UNITED STATES PATENT AND TRADEMARK OFFICE
CERTIFICATE OF CORRECTION

PATENT NO. : 5,771,070
DATED : June 23, 1998
INVENTOR(S) : Hayao Chzu, et al.

It is certified that error appears in the above-identified patent and that said Letters Patent is hereby corrected as shown below:

Column 28

Line 20, "cormmonly" should read --commonly--.
    Line 21, "$\phi$ to $\phi t$/to $\phi t4$" should read --t1 to t4--.
    Line 24, "A pulse hi" should read --A pulse $\phi i$--.
    Line 31, "806." should read --806A.--.
    Line 35, "(FIG. 28)" should read --(FIG. 28).--.

Column 29

Line 16, "806A)," should read --806A,--.
    Line 58, "G.: should read --G,--.

UNITED STATES PATENT AND TRADEMARK OFFICE
CERTIFICATE OF CORRECTION

PATENT NO. : 5,771,070
DATED : June 23, 1998
INVENTOR(S) : HAYAO OHZU, ET AL.

It is certified that error appears in the above-identified patent and that said Letters Patent is hereby corrected as shown below:

<u>Column 31</u>

Line 36, "tansducer" should read --transducer--.
    Line 54, "readout" should read --read out--.

<u>Column 32</u>

Line 63, "readout." should read --read out.--

Signed and Sealed this

Thirteenth Day of July, 1999

*Attest:*

Q. TODD DICKINSON

*Attesting Officer*     *Acting Commissioner of Patents and Trademarks*

UNITED STATES PATENT AND TRADEMARK OFFICE
CERTIFICATE OF CORRECTION

PATENT NO. : 5,771,070
DATED : June 23, 1998
INVENTOR(S) : Hayao Ohzu et al.

It is certified that error appears in the above-identified patent and that said Letters Patent is hereby corrected as shown below:

<u>Title page,</u>
Item [56], References Cited, FOREIGN PATENT DOCUMENTS,
"JP 59-023765  2/1984  Japan" should read -- JP 59-23675  2/1984  Japan --.

Signed and Sealed this

Twenty-fifth Day of March, 2003

JAMES E. ROGAN
*Director of the United States Patent and Trademark Office*